United States Patent
Harada

(10) Patent No.: US 8,339,713 B2
(45) Date of Patent: Dec. 25, 2012

(54) ZOOM OPTICAL SYSTEM, OPTICAL APPARATUS AND METHOD FOR MANUFACTURING ZOOM OPTICAL SYSTEM

(75) Inventor: Hiroki Harada, Zushi (JP)

(73) Assignee: Nikon Corporation, Tokyo (JP)

( * ) Notice: Subject to any disclaimer, the term of this patent is extended or adjusted under 35 U.S.C. 154(b) by 119 days.

(21) Appl. No.: 12/888,483

(22) Filed: Sep. 23, 2010

(65) Prior Publication Data

US 2011/0102905 A1     May 5, 2011

(30) Foreign Application Priority Data

Nov. 4, 2009  (JP) .................... 2009-253267
Nov. 4, 2009  (JP) .................... 2009-253273

(51) Int. Cl.
  *G02B 15/14*     (2006.01)
(52) U.S. Cl. ...................... 359/676; 359/684
(58) Field of Classification Search .............. 359/676, 359/680–682, 684, 687
  See application file for complete search history.

(56) References Cited

U.S. PATENT DOCUMENTS

| | | | |
|---|---|---|---|
| 7,221,511 B2 * | 5/2007 | Toyama | 359/557 |
| 7,471,462 B2 | 12/2008 | Hatada | |
| 2008/0112063 A1 | 5/2008 | Hatada | |

FOREIGN PATENT DOCUMENTS

| | | |
|---|---|---|
| JP | 2007-334215 A | 12/2007 |
| JP | 2007-334215 A | 12/2007 |
| JP | 2008-122775 A | 5/2008 |

* cited by examiner

*Primary Examiner* — James Greece
(74) *Attorney, Agent, or Firm* — Miles & Stockbridge P.C.

(57) ABSTRACT

A zoom optical system comprising, in order from an object side: a first lens group G1 having positive refractive power; a second lens group G2 having negative refractive power; and a rear lens group GR having positive refractive power; the rear lens group GR including at least a third lens group G3 that is disposed to the most object side and has positive refractive power, the third lens group G3 including at least four positive lenses L31-L33, L35 and at least one negative lens L34, at least a portion of a lens group disposed to an image side of the first lens group G1 being movable as a vibration reduction lens group in a direction including a component perpendicular to an optical axis, and a given conditional expression being satisfied, thereby providing a zoom optical system having excellent optical performance.

31 Claims, 31 Drawing Sheets

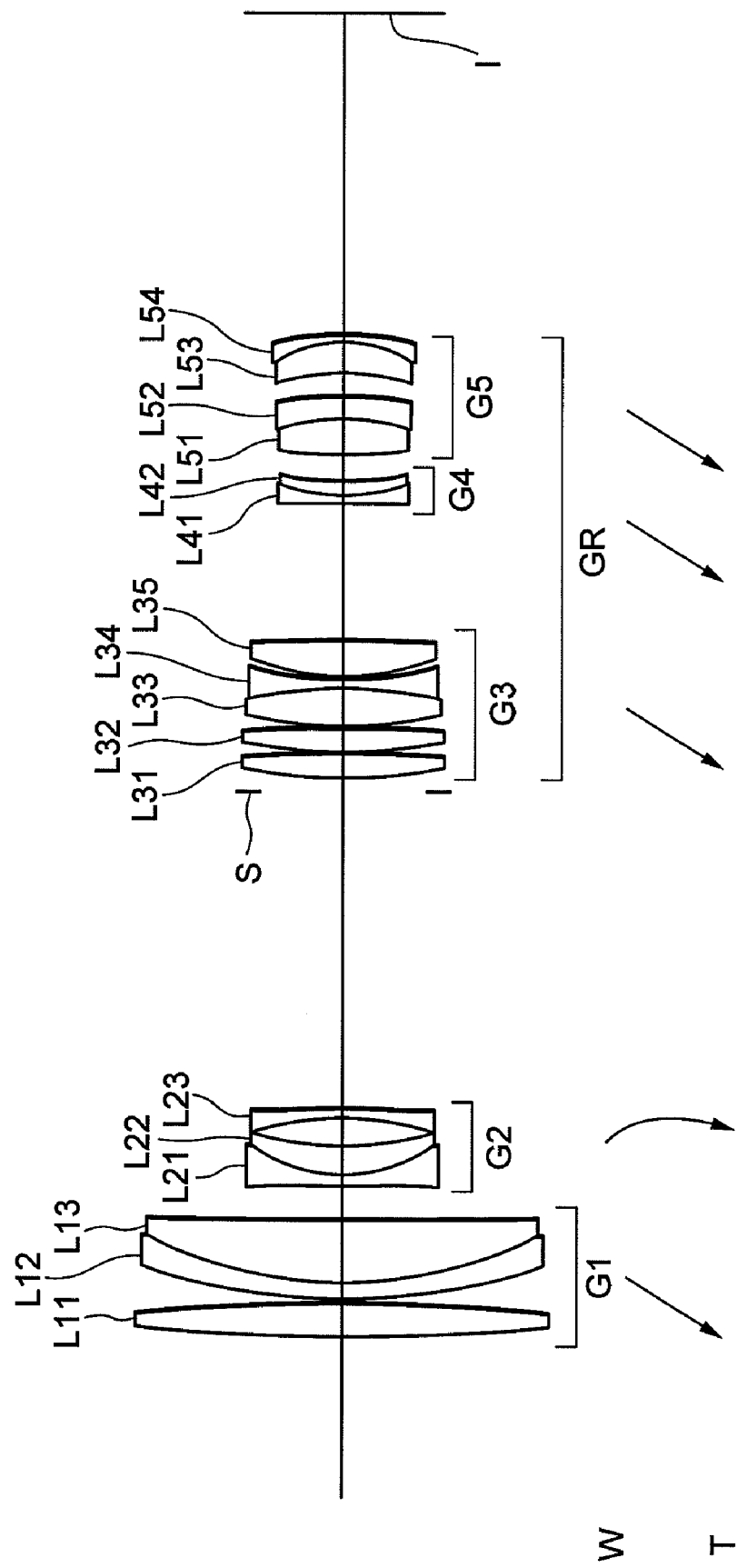

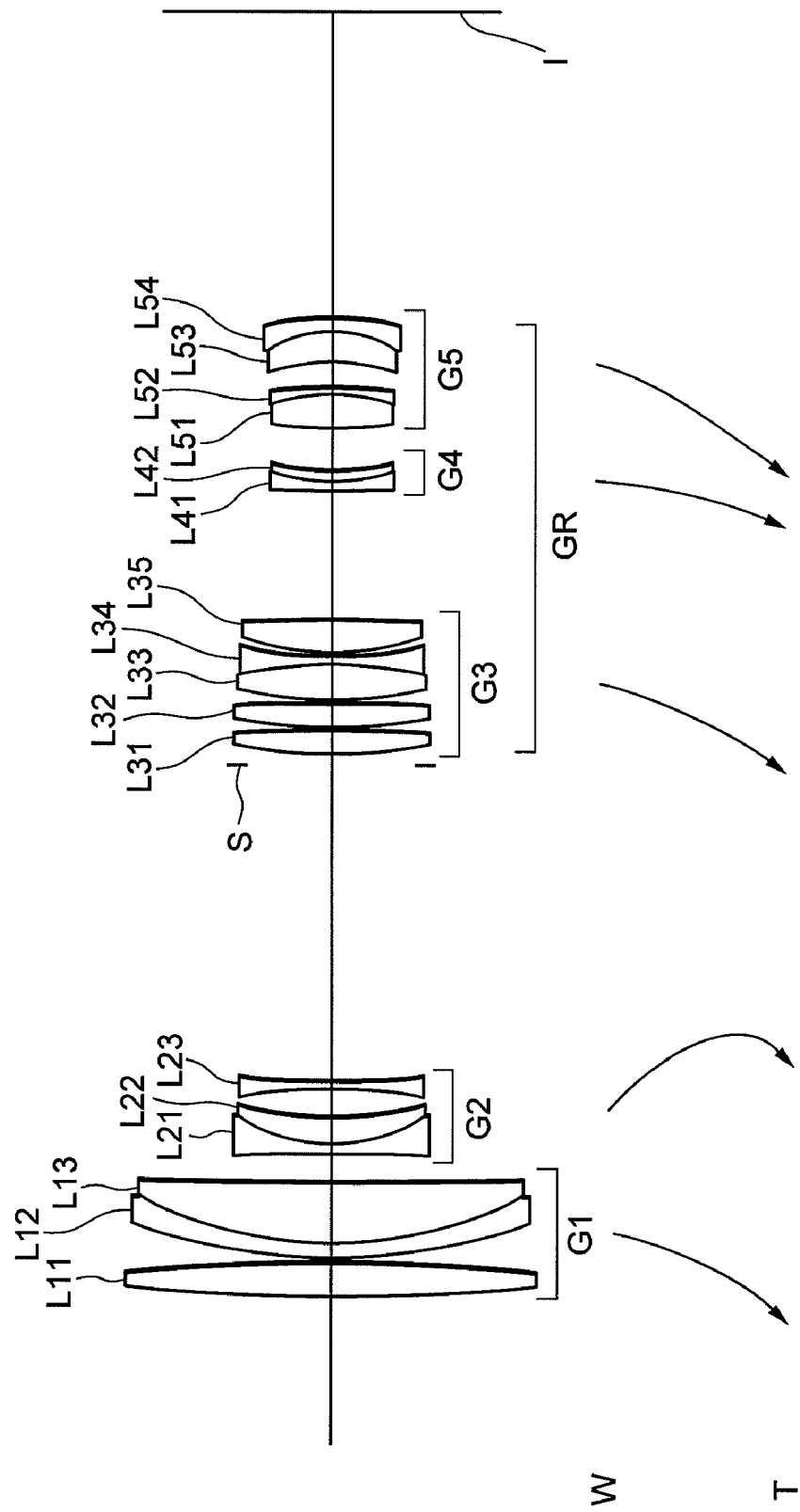

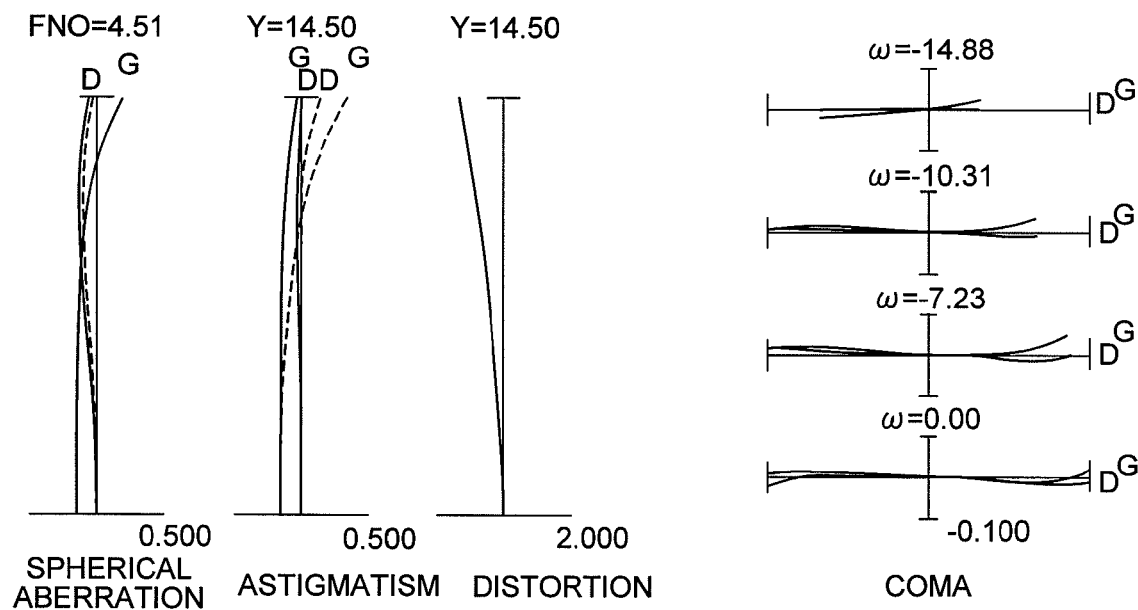
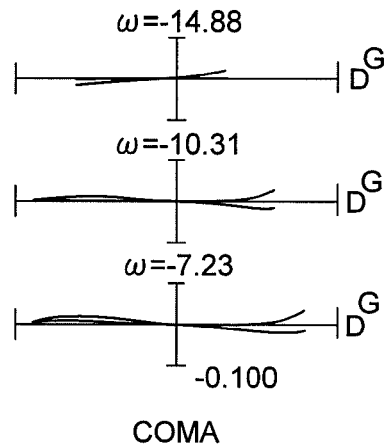

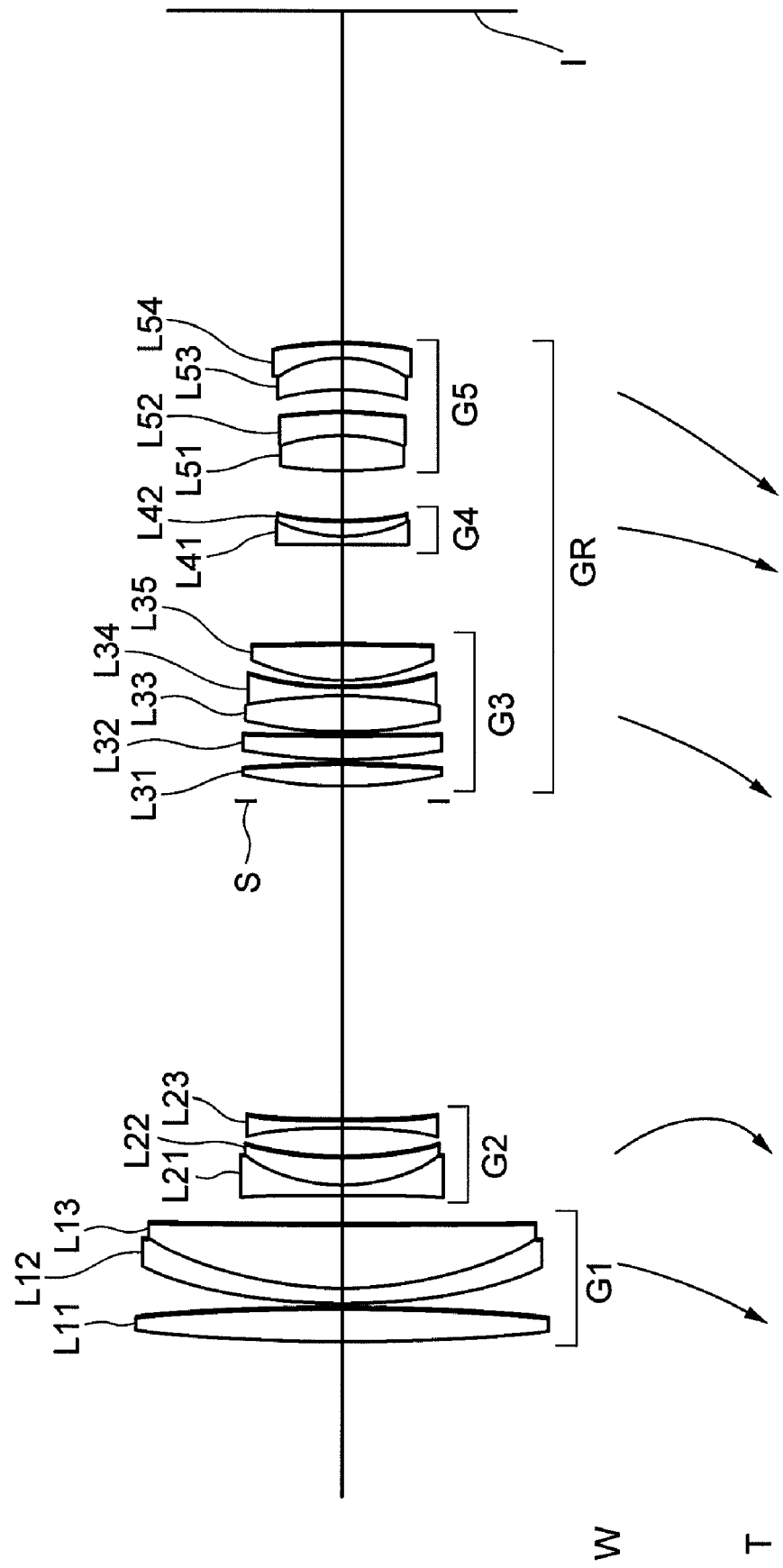

FIG.14A
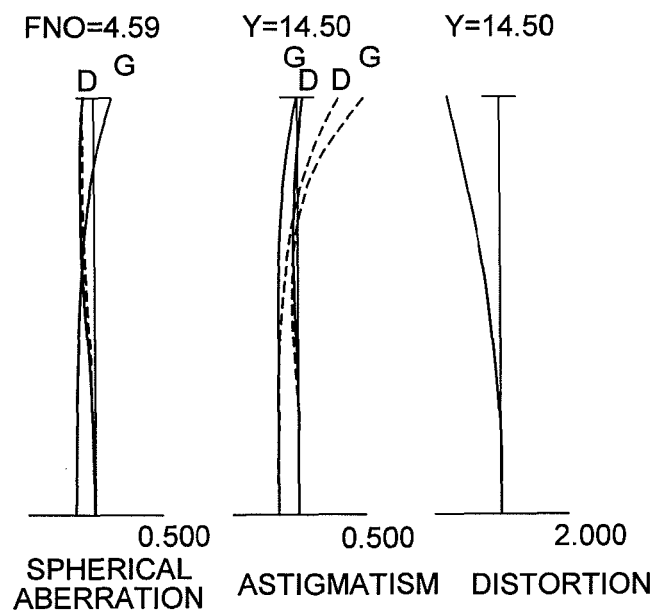
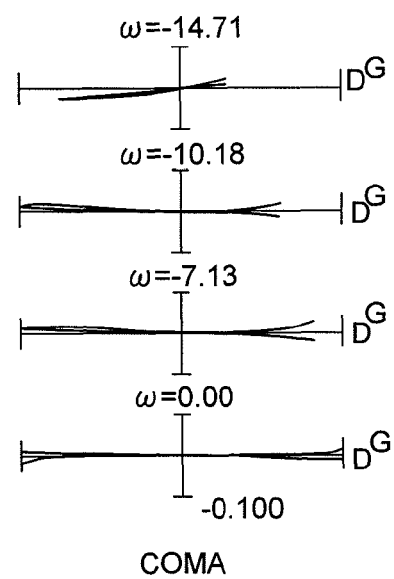
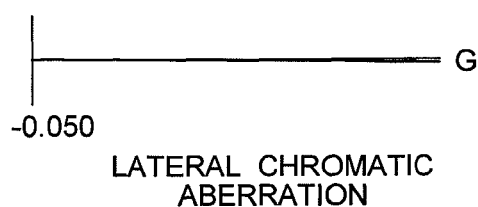
FIG.14B
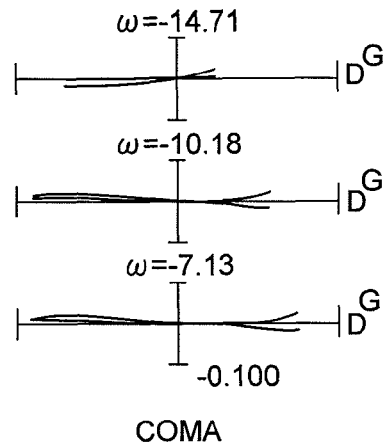

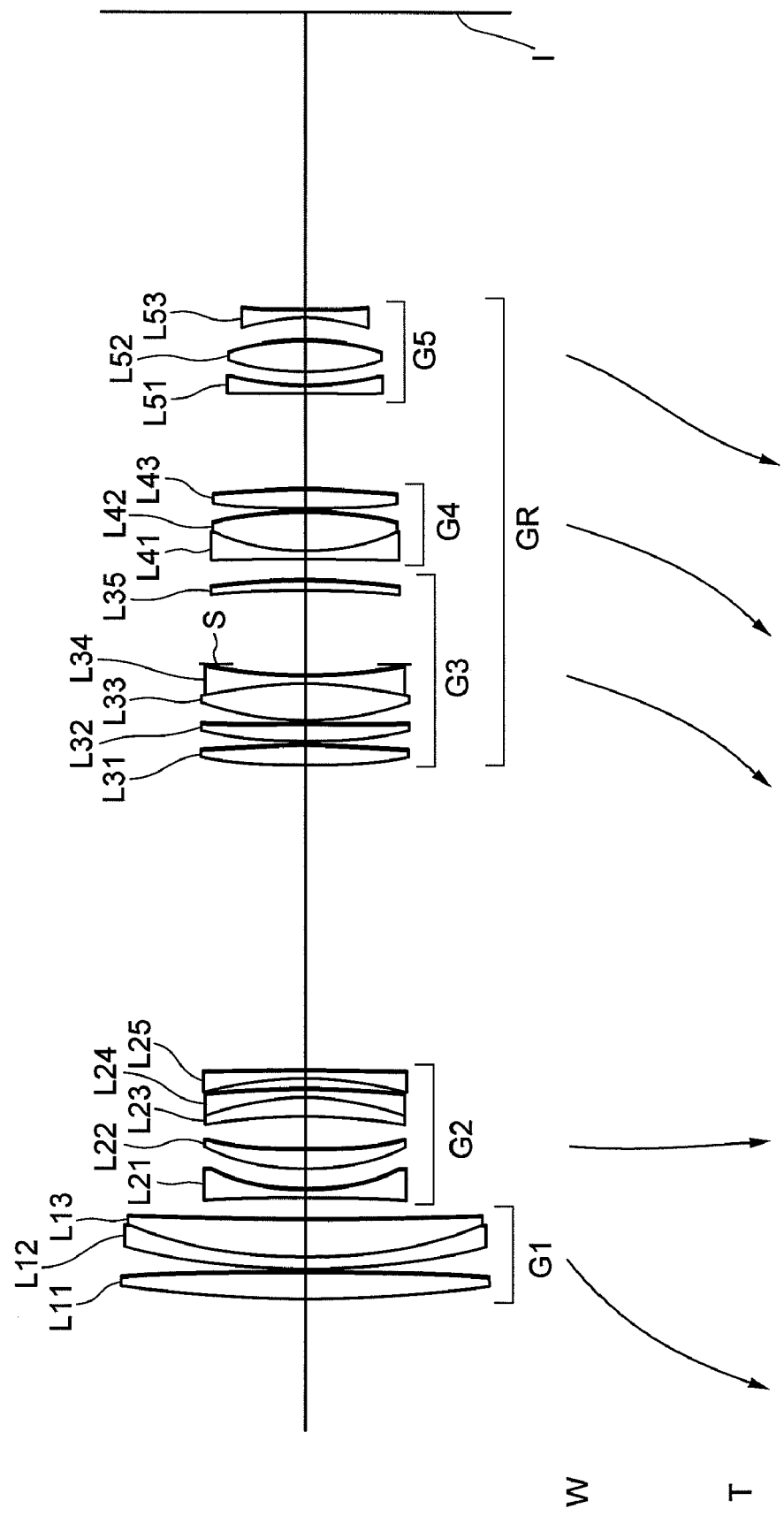

FIG.18A
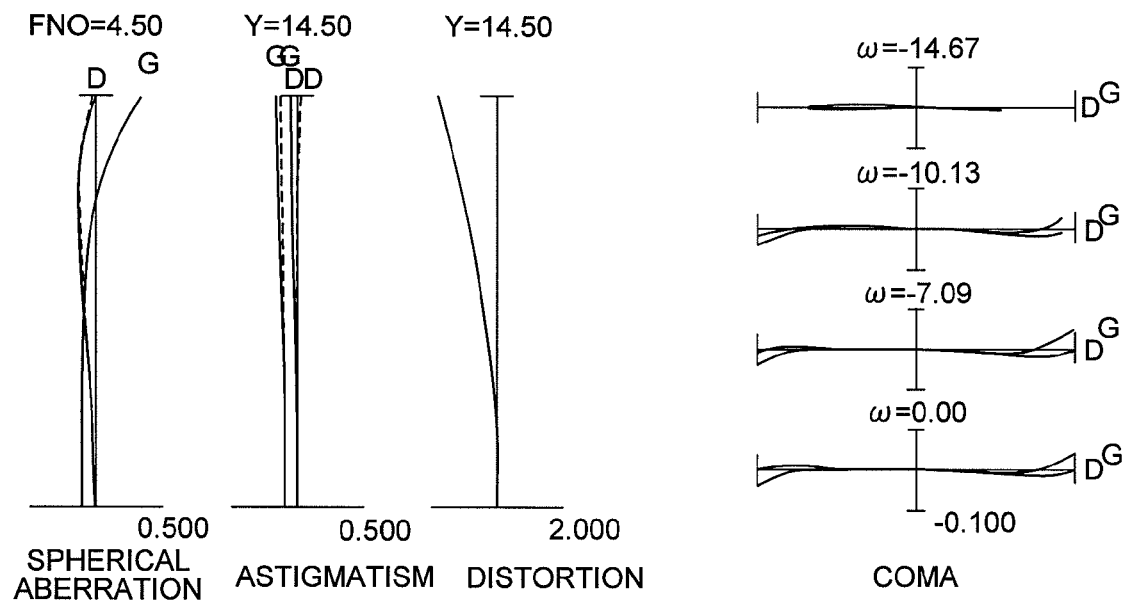
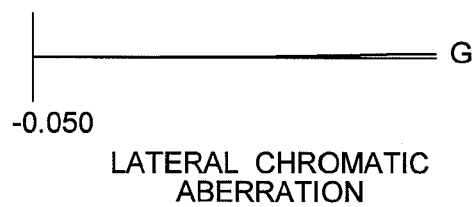
FIG.18B
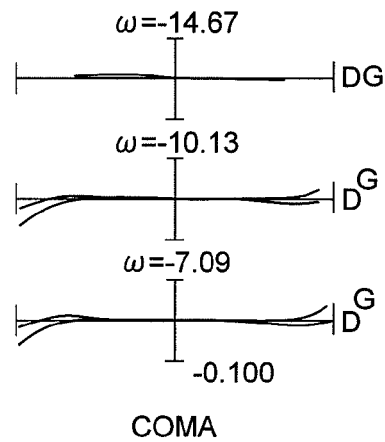

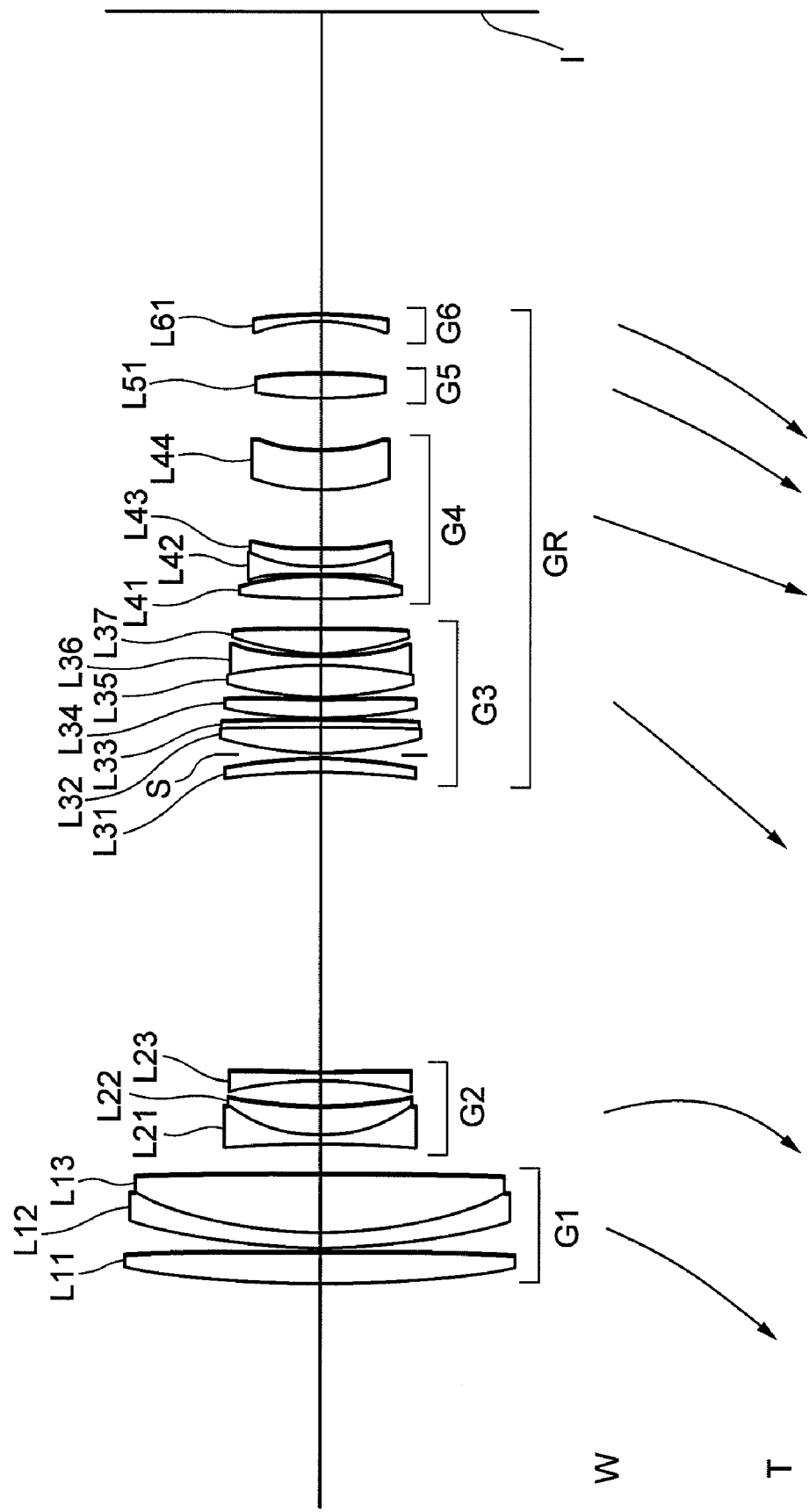

FIG.22A
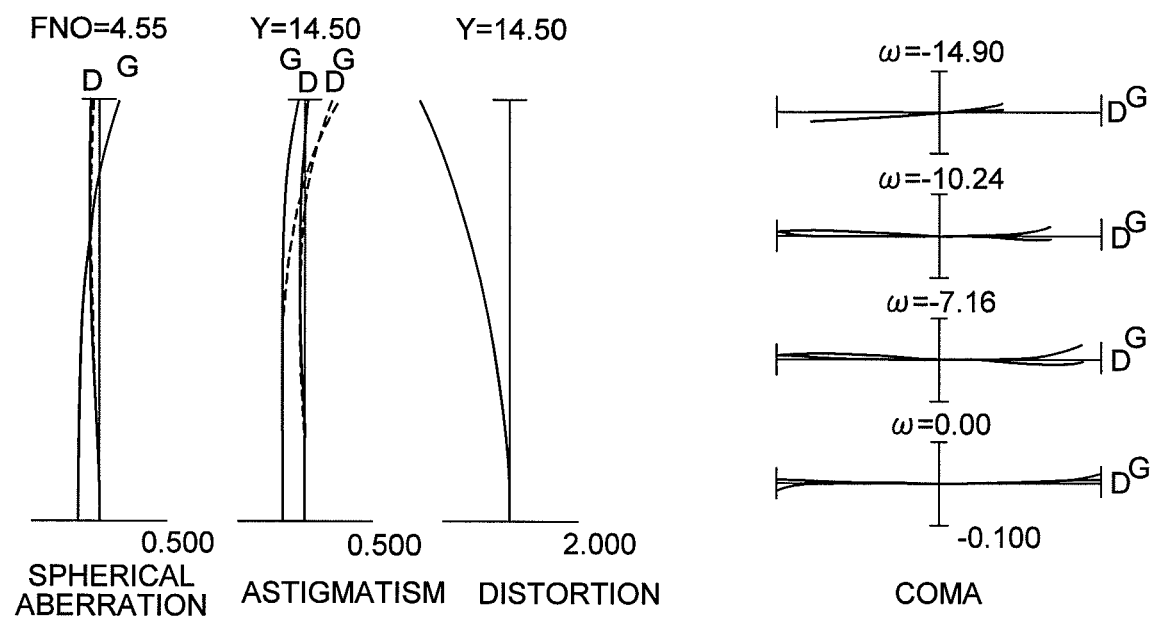
FIG.22B
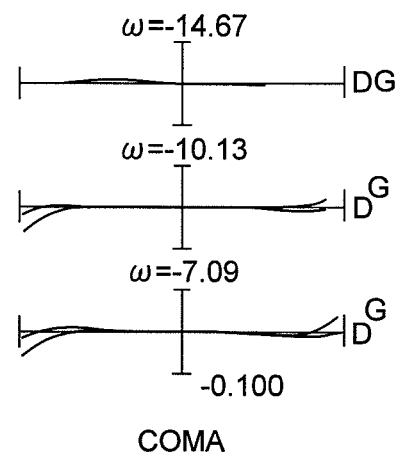

FIG.24A
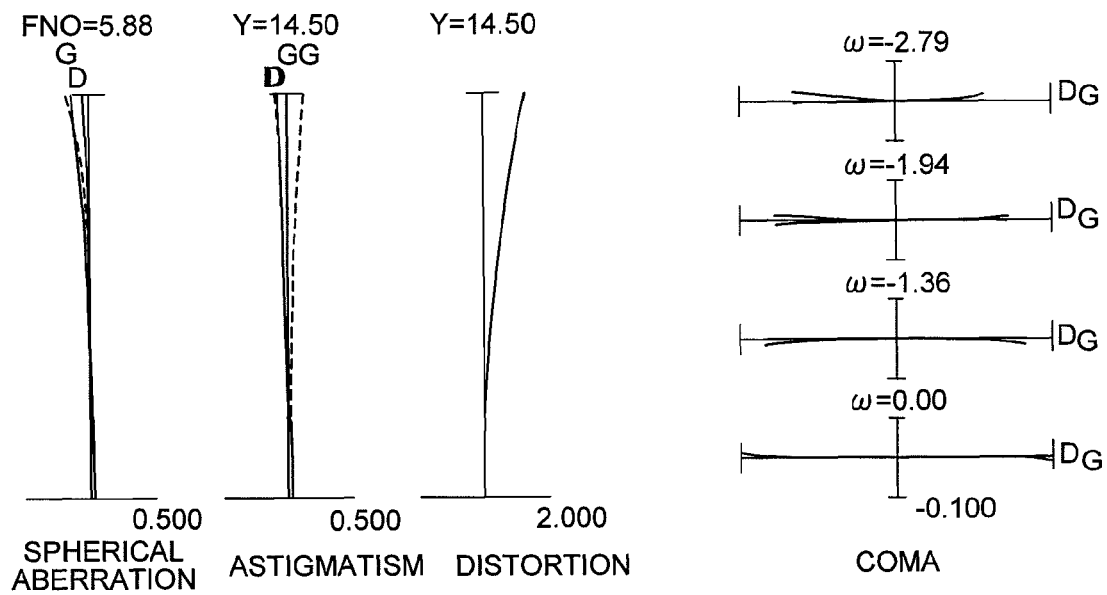
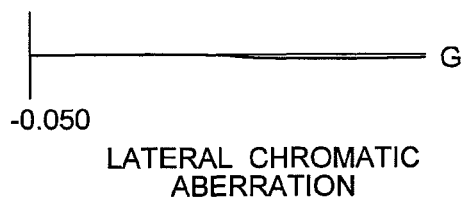
FIG.24B
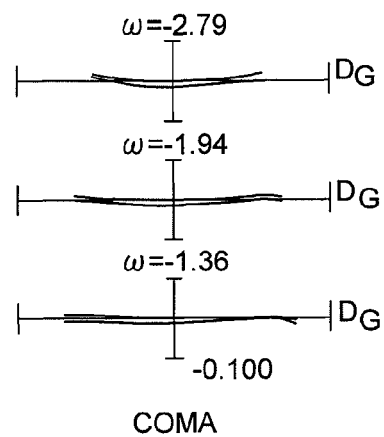

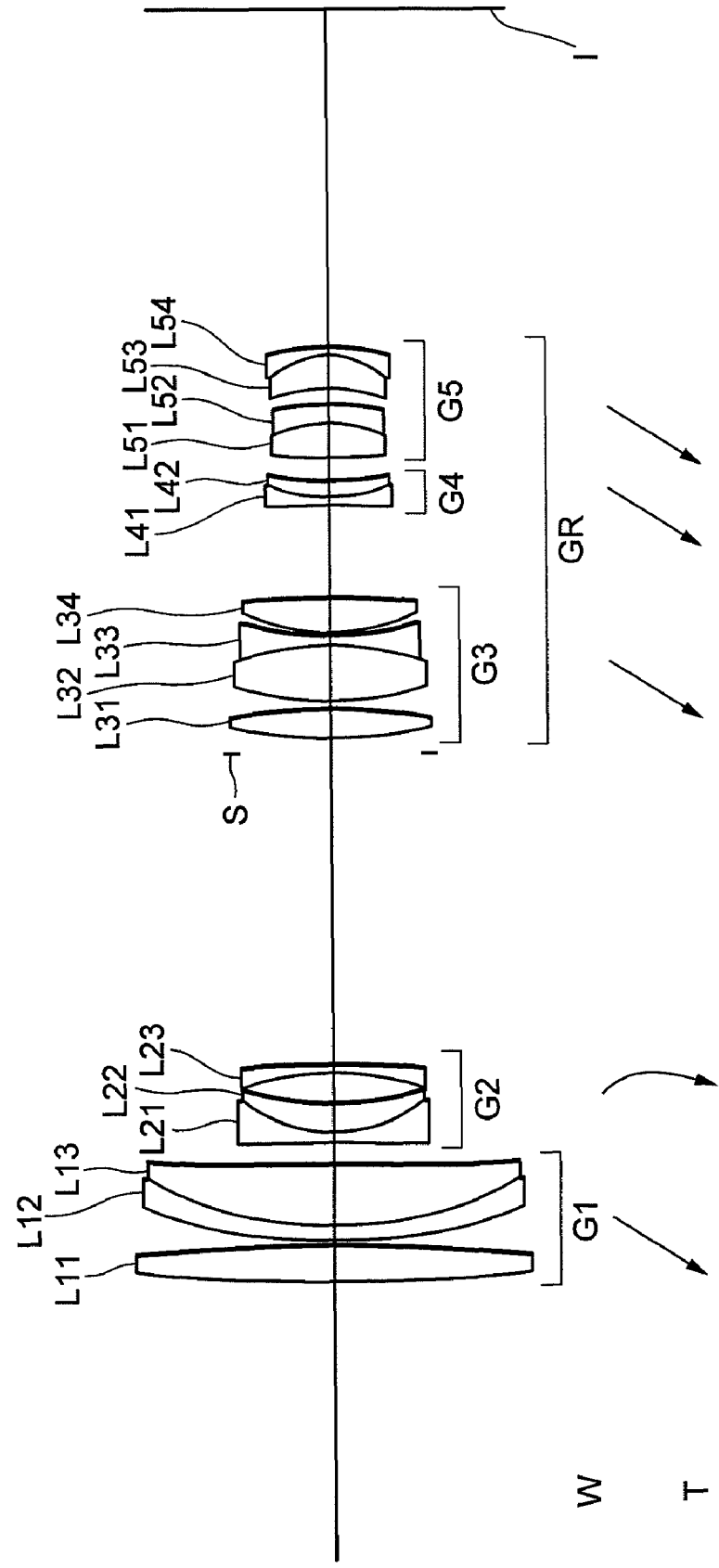

FIG.28A
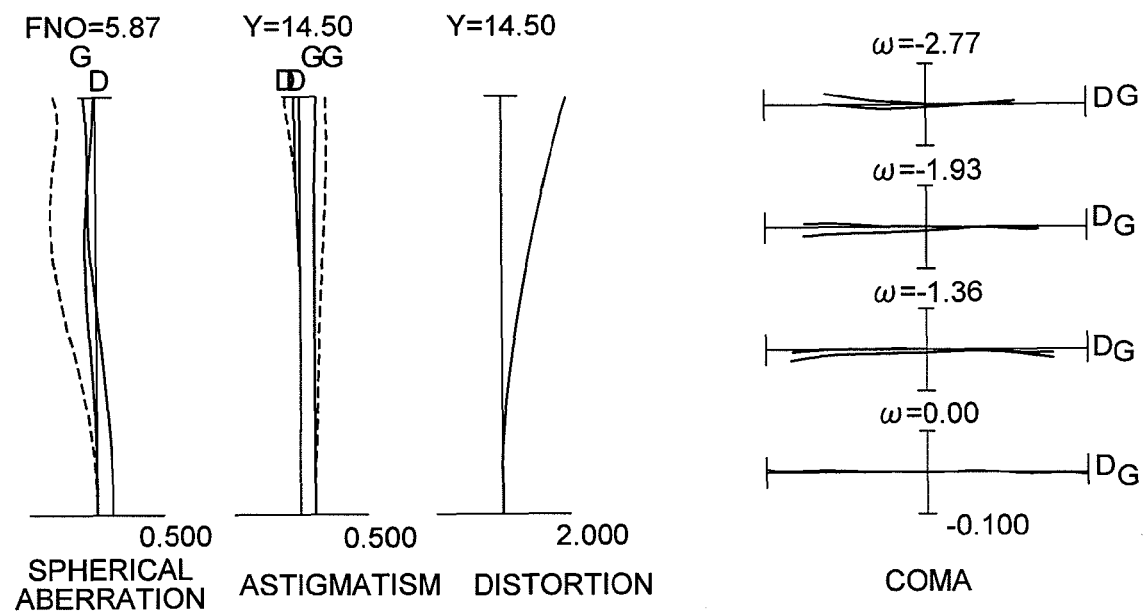
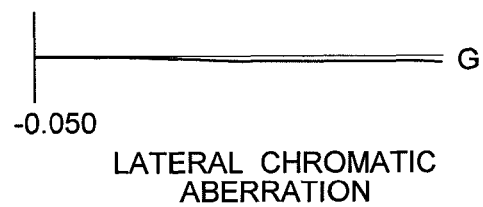
FIG.28B
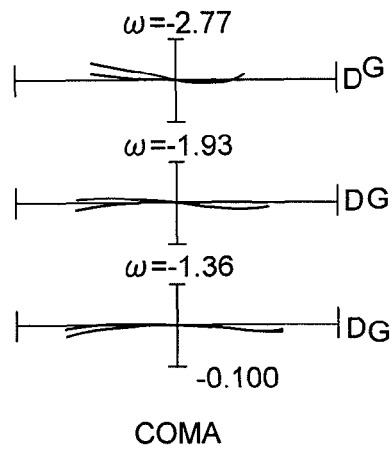

ZOOM OPTICAL SYSTEM, OPTICAL APPARATUS AND METHOD FOR MANUFACTURING ZOOM OPTICAL SYSTEM

The disclosure of the following priority applications are herein incorporated by reference:
Japanese Patent Application No. 2009-253267 filed on Nov. 4, 2009, and
Japanese Patent Application No. 2009-253273 filed on Nov. 4, 2009.

BACKGROUND OF THE INVENTION

1. Field of the Invention

The present invention relates to a zoom optical system, an optical apparatus and a method for manufacturing the optical system.

2. Related Background Art

There have been proposed a zoom optical system suitable for a film camera, an electronic still camera and a video camera in such as Japanese Patent Application Laid-Open No. 2007-334215.

However, a conventional zoom optical system has a problem that the zoom optical system has not achieved excellent optical performance yet.

SUMMARY OF THE INVENTION

The present invention is made in view of the above-described problem, and has an object to provide a zoom optical system having excellent optical performance, an imaging optical system, and a method for manufacturing the zoom optical system.

According to a first aspect of the present invention, there is provided a zoom optical system comprising, in order from an object side: a first lens group having positive refractive power; a second lens group having negative refractive power; and a rear lens group having positive refractive power; the rear lens group including at least a third lens group that is disposed to the most object side and has positive refractive power, the third lens group including at least four positive lenses and at least one negative lens, at least a portion of a lens group disposed to an image side of the first lens group being movable as a vibration reduction lens group in a direction including a component perpendicular to an optical axis, and the following conditional expression (1) being satisfied:

$$0.10 < Lf/Lr < 0.45 \tag{1}$$

where Lf denotes a total length of the third lens group, and Lr denotes a total length of the rear lens group in a wide-angle end state.

According to a second aspect of the present invention, there is provided an optical apparatus equipped with the zoom optical system according to the first aspect.

According to a third aspect of the present invention, there is provided a zoom optical system comprising, in order from an object side: a first lens group having positive refractive power; a second lens group having negative refractive power; and a rear lens group having positive refractive power; the rear lens group including at least a third lens group that is disposed to the most object side and has positive refractive power, at least a portion of a lens group disposed to an image side of the first lens group being movable as a vibration reduction lens group in a direction including a component perpendicular to an optical axis, the vibration reduction lens group including at least one negative lens and at least one positive lens, and the following conditional expressions (6) and (7) being satisfied:

$$1.90 < Np \tag{6}$$

$$0.10 < |RNs/fvr| < 0.95 \tag{7}$$

where Np denotes a refractive index of a positive lens having the highest refractive index at d-line (wavelength $\lambda = 587.6$ nm) in the vibration reduction lens group, RNs denotes a radius of curvature of one surface whose absolute value of the radius of curvature is smaller than that of the other surface of a positive lens satisfying $1.90 < Np$ in the vibration reduction lens group, and fvr denotes a focal length of the vibration reduction lens group.

According to a fourth aspect of the present invention, there is provided an optical apparatus equipped with the zoom optical system according to the third aspect.

According to a fifth aspect of the present invention, there is provided a method for manufacturing a zoom optical system including, in order from an object side, a first lens group having positive refractive power, a second lens group having negative refractive power, and a rear lens group having positive refractive power, the method comprising steps of: disposing at least a third lens group having positive refractive power to the most object side of the rear lens group; disposing at least four positive lenses and at least one negative lens in the third lens group; disposing the third lens group and the rear lens group with satisfying the following conditional expression (1):

$$0.10 < Lf/Lr < 0.45 \tag{1}$$

where Lf denotes a total length of the third lens group, and Lr denotes a total length of the rear lens group in a wide-angle end state; and decentering at least a portion of a lens group disposed to an image side of the first lens group as a vibration reduction lens group in a direction including a component perpendicular to an optical axis.

According to a sixth aspect of the present invention, there is provided a method for manufacturing a zoom optical system including, in order from an object side, a first lens group having positive refractive power, a second lens group having negative refractive power, and a rear lens group having positive refractive power, the method comprising steps of: disposing at least a third lens group having positive refractive power to the most object side in the rear lens group; decentering at least a portion of a lens group disposed to an image side of the first lens group as a vibration reduction lens group in a direction including a component perpendicular to an optical axis; disposing at least one negative lens and at least one positive lens in the vibration reduction lens with satisfying the following conditional expressions (6) and (7):

$$1.90 < Np \tag{6}$$

$$0.10 < |RNs/fvr| < 0.95 \tag{7}$$

where Np denotes a refractive index of a positive lens having the highest refractive index at d-line (wavelength $\lambda = 587.6$ nm) in the vibration reduction lens group, RNs denotes a radius of curvature of one surface whose absolute value of the radius of curvature is smaller than that of the other surface of a positive lens satisfying $1.90 < Np$ in the vibration reduction lens group, and fvr denotes a focal length of the vibration reduction lens group.

The present invention makes it possible to provide a zoom optical system having excellent optical performance, an optical apparatus and a method for manufacturing the zoom optical system.

BRIEF DESCRIPTION OF THE DRAWINGS

FIG. 1 is a sectional view showing a lens configuration of a zoom optical system in a wide-angle end state according to Example 1 of the present application.

FIGS. 2A, and 2B are graphs showing various aberrations of the zoom optical system according to Example 1 in the wide-angle end state focusing on infinity, in which FIG. 2A shows various aberrations without vibration reduction, and FIG. 2B shows coma upon carrying out vibration reduction with respect to a rotational camera shake of 0.70 degrees.

FIGS. 4A, and 4B are graphs showing various aberrations of the zoom optical system according to Example 1 in a telephoto end state focusing on infinity, in which FIG. 4A shows various aberrations without vibration reduction, and FIG. 4B shows coma upon carrying out vibration reduction with respect to a rotational camera shake of 0.30 degrees.

FIG. 5 is a sectional view showing a lens configuration of a zoom optical system in a wide-angle end state according to Example 2 of the present application.

FIGS. 6A, and 6B are graphs showing various aberrations of the zoom optical system according to Example 2 in the wide-angle end state focusing on infinity, in which FIG. 6A shows various aberrations without vibration reduction, and FIG. 6B shows coma upon carrying out vibration reduction with respect to a rotational camera shake of 0.70 degrees.

FIGS. 8A, and 8B are graphs showing various aberrations of the zoom optical system according to Example 2 in a telephoto end state focusing on infinity, in which FIG. 8A shows various aberrations without vibration reduction, and FIG. 8B shows coma upon carrying out vibration reduction with respect to a rotational camera shake of 0.30 degrees.

FIG. 9 is a sectional view showing a lens configuration of a zoom optical system according to Example 3 of the present application in a wide-angle end state.

FIGS. 10A, and 10B are graphs showing various aberrations of the zoom optical system according to Example 3 in the wide-angle end state focusing on infinity, in which FIG. 10A shows various aberrations without vibration reduction, and FIG. 10B shows coma upon carrying out vibration reduction with respect to a rotational camera shake of 0.70 degrees.

FIGS. 12A, and 12B are graphs showing various aberrations of the zoom optical system according to Example 3 in a telephoto end state focusing on infinity, in which FIG. 12A shows various aberrations without vibration reduction, and FIG. 12B shows coma upon carrying out vibration reduction with respect to a rotational camera shake of 0.30 degrees.

FIGS. 14A, and 14B are graphs showing various aberrations of the zoom optical system according to Example 4 in the wide-angle end state focusing on infinity, in which FIG. 14A shows various aberrations without vibration reduction, and FIG. 14B shows coma upon carrying out vibration reduction with respect to a rotational camera shake of 0.70 degrees.

FIGS. 16A, and 16B are graphs showing various aberrations of the zoom optical system according to Example 4 in a telephoto end state focusing on infinity, in which FIG. 16A shows various aberrations without vibration reduction, and FIG. 16B shows coma upon carrying out vibration reduction with respect to a rotational camera shake of 0.30 degrees.

FIG. 17 is a sectional view showing a lens configuration of a zoom optical system according to Example 5 of the present application in a wide-angle end state.

FIGS. 18A, and 18B are graphs showing various aberrations of the zoom optical system according to Example 5 in the wide-angle end state focusing on infinity, in which FIG. 18A shows various aberrations without vibration reduction, and FIG. 18B shows coma upon carrying out vibration reduction with respect to a rotational camera shake of 0.70 degrees.

FIGS. 20A, and 20B are graphs showing various aberrations of the zoom optical system according to Example 5 in a telephoto end state focusing on infinity, in which FIG. 20A shows various aberrations without vibration reduction, and FIG. 20B shows coma upon carrying out vibration reduction with respect to a rotational camera shake of 0.30 degrees.

FIG. 21 is a sectional view showing a lens configuration of a zoom optical system according to Example 6 in a wide-angle end state.

FIGS. 22A, and 22B are graphs showing various aberrations of the zoom optical system according to Example 6 in the wide-angle end state focusing on infinity, in which FIG. 22A shows various aberrations without vibration reduction, and FIG. 22B shows coma upon carrying out vibration reduction with respect to a rotational camera shake of 0.70 degrees.

FIGS. 24A, and 24B are graphs showing various aberrations of the zoom optical system according to Example 6 in a telephoto end state focusing on infinity, in which FIG. 24A shows various aberrations without vibration reduction, and FIG. 24B shows coma upon carrying out vibration reduction with respect to a rotational camera shake of 0.30 degrees.

FIG. 25 is a sectional view showing a lens configuration of a zoom optical system seen from another point of view in a wide-angle end state according to Example 7 of the present application.

FIGS. 26A, and 26B are graphs showing various aberrations of the zoom optical system seen from another point of view according to Example 7 in the wide-angle end state focusing on infinity, in which FIG. 26A shows various aberrations without vibration reduction, and FIG. 26B shows coma upon carrying out vibration reduction with respect to a rotational camera shake of 0.70 degrees.

FIGS. 28A, and 28B are graphs showing various aberrations of the zoom optical system seen from another point of view according to Example 7 in a telephoto end state focusing on infinity, in which FIG. 28A shows various aberrations without vibration reduction, and FIG. 28B shows coma upon carrying out vibration reduction with respect to a rotational camera shake of 0.30 degrees.

DESCRIPTION OF THE MOST PREFERRED EMBODIMENT

Figure 2A:
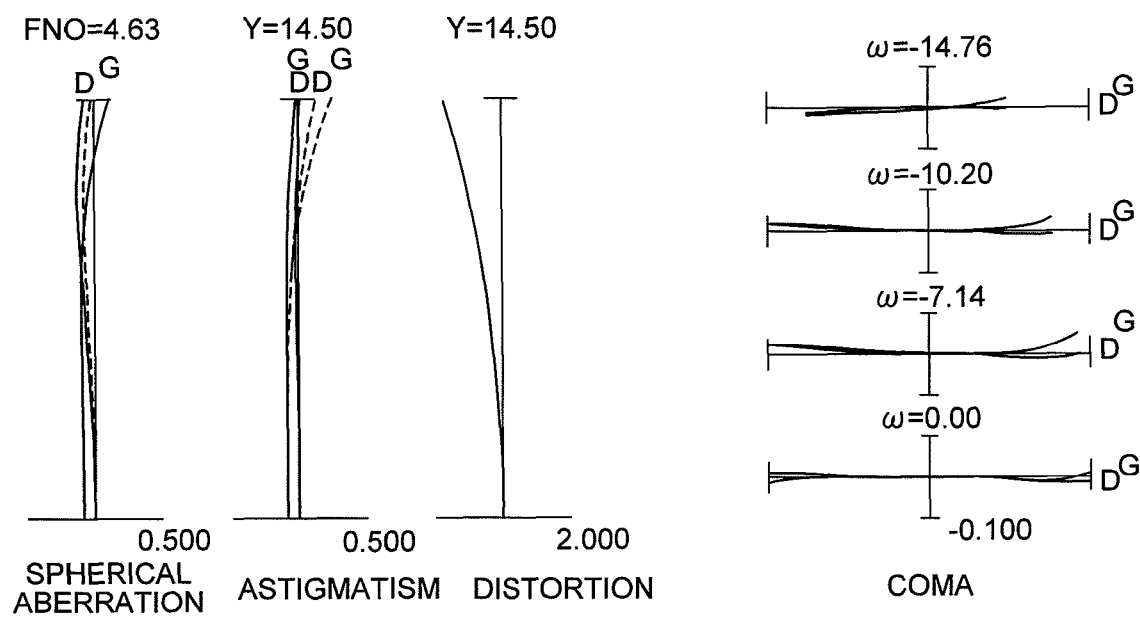

A zoom optical system, an optical apparatus, and a method for manufacturing the zoom optical system according to the present application are explained below.

A zoom optical system according to the present application is composed of, in order from an object side, a first lens group having positive refractive power, a second lens group having negative refractive power, and a rear lens group having positive refractive power. The rear lens group includes a third lens group having positive refractive power disposed to the most object side in the rear lens group. The third lens group includes at least four positive lenses and at least one negative lens. Upon zooming from a wide-angle end state to a telephoto end state, a distance between the first lens group and the second lens group increases, a distance between the second lens group and the rear lens group decreases, and distances between lenses composing the third lens group are constant. At least a portion of a lens group disposed to an image side of the first lens group is decentered as a vibration reduction lens group in a direction including a component perpendicular to an optical axis. The following conditional expression (1) is satisfied:

$$0.10 < Lf/Lr < 0.45 \quad (1)$$

where Lf denotes a total length of the third lens group, and Lr denotes a total length of the rear lens group in the wide-angle end state.

In a zoom optical system according to the present application, with decentering at least one portion of a lens group disposed to the image side of the first lens group as a vibration reduction lens group in a direction including a component perpendicular to the optical axis, it becomes possible to move an image. Accordingly, it becomes possible to carry out correcting an image blur caused by a camera shake or the like, that is, a vibration reduction.

In a zoom optical system according to the present application, a so-called marginal ray, which is the brightest light flux at the center of the image, and passes the third lens group away from the optical axis. Since an aperture stop is usually disposed in the third lens group or in the vicinity of the third lens group, as is apparent from an aberration theory, it becomes important to correct mainly spherical aberration and coma in the third lens group. Accordingly, the third lens group is necessary to suppress aberrations originated in positive refractive power of the third lens group.

Incidentally, in many of conventional zoom optical systems, since the third lens group is composed of, in order from the object side, at most two positive lenses and a negative lens, spherical aberration or coma cannot be corrected sufficiently. Therefore, it becomes necessary to correct aberrations of the third lens group by lens groups disposed to the image side of the third lens group. As a result, decentering susceptibility of the third lens group becomes high, and optical performance upon decentering the vibration reduction lens group is not sufficient.

In a zoom optical system according to the present application, the third lens group is composed of at least four positive lenses and a negative lens, the at least four positive lenses and the one negative lens are disposed such that each distance between respective lenses is constant upon zooming from the wide-angle end state and the telephoto end state, and the above described conditional expression (1) is satisfied. With this construction, it becomes possible to suppress aberrations upon decentering the vibration reduction lens group with good balance to aberrations without carrying out decentering the vibration reduction lens group, so that excellent optical performance can be obtained. Moreover, deterioration in optical performance caused by manufacturing error can be effectively prevented.

Conditional expression (1) defines the total length of the third lens group with respect to the total length of the rear lens group in the wide-angle end state.

When the ratio Lf/Lr is equal to or exceeds the upper limit of conditional expression (1), each distance between lenses composing the third lens group becomes too large. Accordingly, in order to let the third lens group have required power, refractive power of each lens composing the third lens group has to be large. As a result, it becomes difficult to correct spherical aberration and coma, and it also becomes difficult to correct curvature of field and distortion, so that it is undesirable. Otherwise, it becomes difficult to dispose a lot of lenses composing other than the third lens group to the image side of the third lens group. Moreover, when the rear lens group is divided into a plurality of lens groups, and each distance between the lens groups is changed upon zooming, it becomes difficult to secure a sufficient zooming distance that is a space for moving the plurality of lens groups. In order to secure the effect of the present application, it is preferable to set the upper limit of conditional expression (1) to 0.40.

On the other hand, when the ratio Lf/Lr is equal to or falls below the lower limit of conditional expression (1), it becomes difficult to secure a sufficient thickness of each lens composing the third lens group. As a result, it becomes difficult to correct curvature of field and chromatic aberration, so that it is undesirable. In order to secure the effect of the present application, it is preferable to set the lower limit of conditional expression (1) to 0.20.

With this lens construction, it becomes possible to realize a zoom optical system having excellent optical performance.

In a zoom optical system according to the present application, the vibration reduction lens group preferably has negative refractive power.

With this lens configuration, it becomes possible to suppress variation in aberrations, in particular, decentering coma upon decentering the vibration reduction lens group. Moreover, it becomes possible to make the zoom optical system according to the present application as a whole compact.

In a zoom optical system according to the present application, it is preferable that the vibration reduction lens group includes at least one negative lens and at least one positive lens, and an object side lens surface of a positive lens having the shortest focal length in the vibration reduction lens group is a convex shape facing the object side.

With this lens configuration, it becomes possible to obtain excellent optical performance with suppressing decentering aberration upon decentering the vibration reduction lens group and aberrations without carrying out decentering the vibration reduction lens group in a balanced manner.

Here, it is effective for correcting spherical aberration and coma to dispose each lens in the vibration lens group in such a manner that deflection angle of the marginal ray upon refracting by each lens composing the vibration lens group is made small as much as possible. This is effective for correcting decentering coma upon decentering the vibration reduction lens group. Moreover, the object side lens surface of the positive lens having the shortest focal length in the vibration reduction lens group is important for such as chromatic correction of the vibration reduction lens group by itself, control of Petzval sum of the whole optical system, correction of spherical aberration without carrying out decentering the vibration reduction lens group, and correction of decentering coma upon decentering the vibration reduction lens group. Among them, as for correction of coma upon decentering the vibration reduction lens group, it is effective to make the radius of curvature of the object side lens surface of the positive lens small, as well as to make the radius of curvature of the image side lens surface of the positive lens small at the same time.

However, in a conventional zoom optical system, when the radius of curvature of the positive lens in the vibration reduction lens group is made to be small, it becomes difficult to accomplish correction of spherical aberration without carrying out decentering the vibration reduction lens group and to establish both of achromatic condition and Petzval sum at the same time. On the other hand, in a zoom optical system according to the present application, with making the object side lens surface of the positive lens having shortest focal length in the vibration reduction lens group convex shape facing the object side, it becomes possible to realize lens configuration to make the deflection angle of the marginal ray small, so that the above-described problem can be solved.

In a zoom optical system according to the present application, the vibration reduction lens group is preferably disposed to the image side of the third lens group in the rear lens group.

With this lens configuration, the marginal ray is converged by the third lens group, so that the diameter of the lens can be smaller than a case the vibration reduction lens group is disposed to the object side of the third lens group. Accordingly, a zoom optical system according to the present application is suitable for installing a vibration reduction mechanism, and makes it possible to make the lens barrel compact and to excellently correct variation in aberrations upon carrying out vibration reduction.

Moreover, in a zoom optical system according to the present application, the following conditional expression (2) is preferably satisfied:

$$-7.00 < fr/fvr < -1.00 \quad (2)$$

where fr denotes a combined focal length of lens groups disposed between the vibration reduction lens group and the image plane in the telephoto end state, and fvr denotes a focal length of the vibration reduction lens group.

Conditional expression (2) defines the combined focal length of the lens groups disposed between the vibration reduction lens group and the image plane with respect to the focal length of the vibration reduction lens group. In a zoom optical system according to the present application, with satisfying conditional expression (2), it becomes possible to mitigate deterioration in optical performance caused by manufacturing error with securing excellent optical performance upon decentering the vibration reduction lens group.

When the ratio fr/fvr is equal to or exceeds the upper limit of conditional expression (2) of a zoom optical system according to the present application, refractive power of the lens groups disposed between the vibration reduction lens group and the image plane becomes too large. Accordingly, aberrations caused by the lens groups disposed to the object side of the vibration reduction lens group become small, though aberrations generated by the lens groups disposed between the vibration reduction lens group and the image plane become too large. As a result, it becomes difficult to correct curvature of field and coma. Moreover, deterioration in optical performance caused by manufacturing errors such as decentering between lens groups, in other words, deterioration in decentering coma becomes conspicuous, so that it is undesirable. In order to secure the effect of the present application, it is preferable to set the upper limit of conditional expression (2) to −1.50.

On the other hand, when the ratio fr/fvr is equal to or falls below the lower limit of conditional expression (2), refractive power of the lens groups disposed between the vibration reduction lens group and the image plane becomes small, so that it becomes easy to correct coma and curvature of field. However, an effect to suppress aberrations generated by the lens groups disposed to the object side of the vibration reduction lens group becomes small. As a result, spherical aberration and coma in the telephoto end state becomes worse, so that it is undesirable. In order to secure the effect of the present application, it is preferable to set the lower limit of conditional expression (2) to −5.50.

Moreover, in a zoom optical system according to the present application, the at least one negative lens in the third lens group preferably satisfies the following conditional expressions (3) and (4):

$$1.85 < N3n \quad (3)$$

$$22.00 < v3n < 40.00 \quad (4)$$

where N3n denotes a refractive index of the at least one negative lens in the third lens group at d-line (wavelength λ=587.6 nm), and v3n denotes an Abbe number of the at least one negative lens in the third lens group at d-line (wavelength λ=587.6 nm).

As described above, in a zoom optical system according to the present application, it is important to correct spherical aberration and coma in the third lens group. Then, with adopting a glass material having a higher refractive index than that of the positive lens in the third lens group into the negative lens in the third lens group, it becomes easy to correct spherical aberration and coma, so that this is defined by conditional expression (3).

When refractive index of the negative lens in the third lens group is equal to or falls below the lower limit of conditional expression (3), it becomes difficult to correct spherical aberration and coma, so that it is undesirable. In order to secure the effect of the present application, it is preferable to set the lower limit of conditional expression (3) to 1.90.

Moreover, in a zoom optical system according to the present application, an Abbe number of the glass material adopted into the negative lens in the third lens group is defined by conditional expression (4) in consideration of achromatic condition. When the Abbe number of the negative lens in the third lens group is equal to or falls below the lower limit of conditional expression (4), radius of curvature of the lens surface of the negative lens becomes too large with respect to a required value for correcting spherical aberration and coma. Accordingly, correction of spherical aberration and coma becomes insufficient, so that it is undesirable. In order to secure the effect of the present application, it is preferable to set the lower limit of conditional expression (4) to 24.00.

On the other hand, when the Abbe number of the negative lens in the third lens group is equal to or exceeds the upper limit of conditional expression (4), radius of curvature of the lens surface of the negative lens becomes too small with respect to a required value for correcting spherical aberration and coma. Accordingly, correction of spherical aberration and coma becomes excessive, so that it is undesirable. In order to secure the effect of the present application, it is preferable to set the upper limit of conditional expression (4) to 37.00.

Moreover, in a zoom optical system according to the present application, the following conditional expression (5) is preferably satisfied:

$$0.30 < Rs/RL < 1.00 \tag{5}$$

where Rs denotes a radius of curvature of one surface whose absolute value is smaller than that of the other surface of a positive lens having the shortest focal length in the vibration reduction lens group, and RL denotes a radius of curvature of said other surface of said positive lens having the shortest focal length in the vibration reduction lens group.

In a zoom optical system according to the present application, in order to excellently correct coma upon decentering the vibration reduction lens group, difference between a deflection angle of the object side of the positive lens and a deflection angle of the image side of the positive lens of a ray incident on the positive lens in the vibration reduction lens group from the object side is preferably small as much as possible. This is because aberrations generated on the object side lens surface of the positive lens are easily offset by aberrations generated on the image side lens surface. Conditional expression (5) defines radii of curvature of both lens surfaces of the positive lens having the shortest focal length in the vibration reduction lens group. With satisfying conditional expression (5), the difference in deflection angles becomes small, and it becomes possible to excellently correct coma upon decentering the vibration reduction lens group.

Here, since conditional expression (5) defines radii of curvature of lens surfaces of a positive lens, the upper limit is 1.00. In order to secure the effect of the present application, it is preferable to set the upper limit of conditional expression (5) to 0.90.

On the other hand, when the ratio Rs/RL is equal to or falls below the lower limit of conditional expression (5), the difference in deflection angles becomes large. As a result, it becomes difficult to correct coma upon decentering the vibration reduction lens group. In order to secure the effect of the present application, it is preferable to set the lower limit of conditional expression (5) to 0.50.

Moreover, in a zoom optical system according to the present application, an aperture stop is preferably disposed in the third lens group or in the vicinity of the third lens group. With this lens configuration, a zoom optical system according to the present application makes it possible to secure sufficient light amount in the periphery of the image, and to excellently correct curvature of field.

Moreover, in a zoom optical system according to the present application, it is preferable that the rear lens group includes a fourth lens group to the image side of the third lens group, and the vibration reduction lens group is composed of at least a portion of the fourth lens group. With this lens configuration, a zoom optical system according to the present application makes it possible to suppress variation in coma upon decentering the vibration reduction lens group.

Moreover, in a zoom optical system according to the present application, the rear lens group includes the fourth lens group disposed to the image side of the third lens group, and a distance between the third lens group and the fourth lens group preferably varies upon zooming from a wide-angle end state to a telephoto end state. With this lens configuration, a zoom optical system according to the present application makes it possible to secure a given zoom ratio with suppressing variation in aberrations such as spherical aberration upon zooming in a low level.

When each lens surface of a lens composing a zoom optical system according to the present application is a spherical surface or a plane surface, processing of the lens surface and assembly become easy, so that deterioration of optical performance caused by errors upon processing and assembling can be prevented. Even if the image plane is shifted, deterioration in optical performance is small, so that it is desirable.

An optical apparatus according to the present application is equipped with the above-described zoom optical system. With this construction, it becomes possible to realize an optical apparatus having excellent optical performance.

Then, an outline of a method for manufacturing a zoom optical system according to the present application is explained with reference to FIG. 30.

Figure 30:
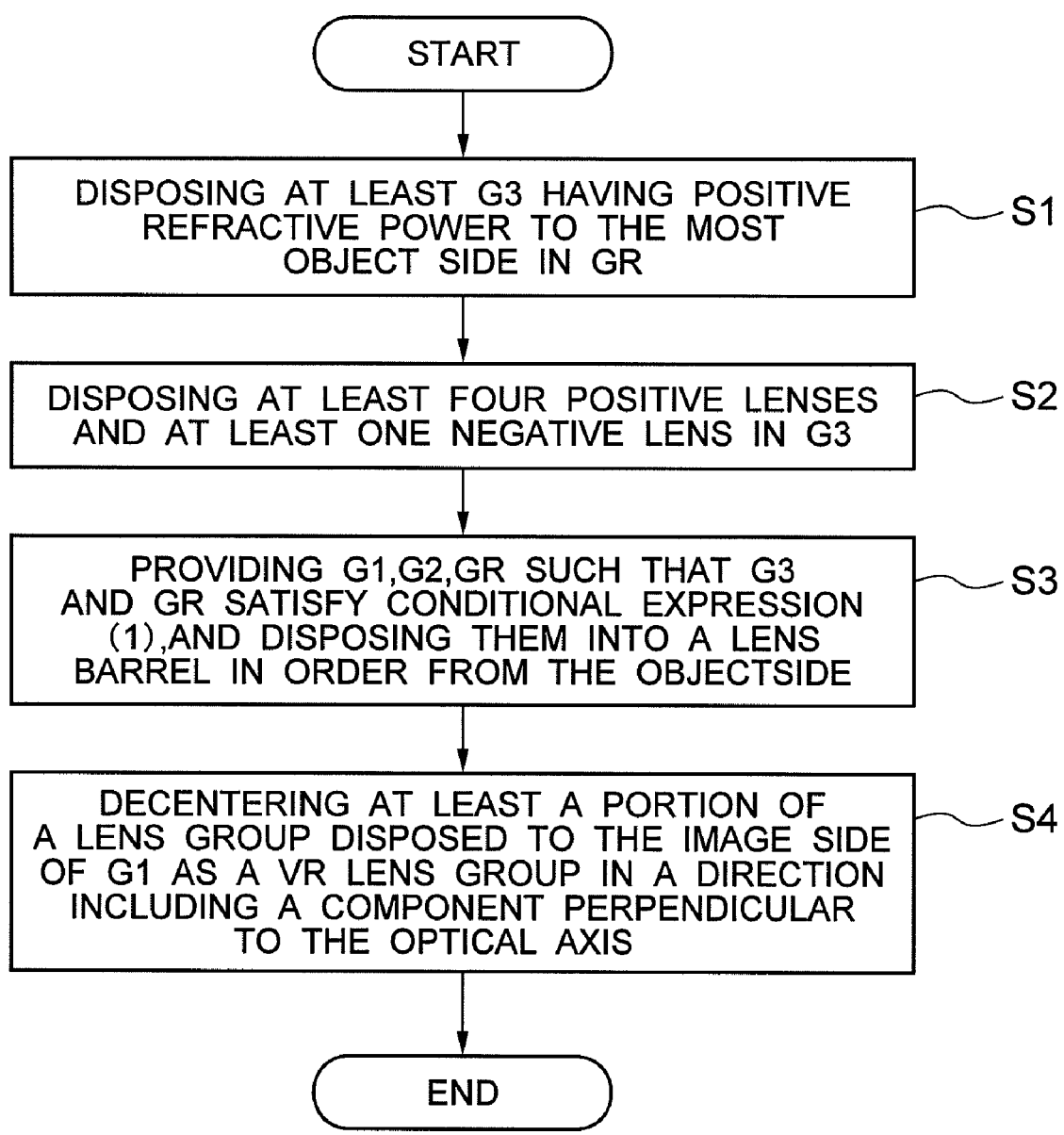
FIG. 30 is a flowchart schematically explaining a method for manufacturing the zoom optical system according to the present application.

FIG. 30 is a flowchart schematically explaining a method for manufacturing the zoom optical system according to the present application.

The method for manufacturing a zoom optical system according to the present application is a method for manufacturing a zoom optical system composed of, in order from an object side, a first lens group having positive refractive power, a second lens group having negative refractive power, and a rear lens group having positive refractive power, and includes the following step S1 through step S4.

Step S1: disposing at least a third lens group having positive refractive power to the most object side in the rear lens group.

Step S2: disposing at least four positive lenses and at least one negative lens in the third lens group.

Step S3: providing the first lens group, the second lens group, and the rear lens group in such a manner that the third lens group and the rear lens group satisfy the following conditional expression (1), and disposing them into a lens barrel having cylindrical shape in order from the object side:

$$0.10 < Lf/Lr < 0.45 \tag{1}$$

where Lf denotes a total length of the third lens group, and Lr denotes a total length of the rear lens group in the wide-angle end state.

Step S4: decentering at least a portion of a lens group disposed to the image side of the first lens group as a vibration reduction lens group by means of a well-known moving mechanism in a direction including a component perpendicular to the optical axis.

The method for manufacturing a zoom optical system according to the present application makes it possible to manufacture a zoom optical system having excellent optical performance.

Then, a zoom optical system, an optical apparatus, and a method for manufacturing the zoom optical system seen from another point of view according to the present application are explained below.

A zoom optical system seen from another point of view according to the present application is composed of, in order from an object side, a first lens group having positive refractive power, a second lens group having negative refractive power, and a rear lens group having positive refractive power. The rear lens group includes at least a third lens group having positive refractive power disposed to the most object side in the rear lens group. Upon zooming from a wide-angle end state to a telephoto end state, a distance between the first lens group and the second lens group increases, a distance between the second lens group and the rear lens group decreases. At least a portion of a lens group disposed to an image side of the first lens group is decentered as a vibration reduction lens group in a direction including a component perpendicular to an optical axis. The vibration reduction lens group includes at least one negative lens and at least one positive lens. The following conditional expressions (6) and (7) are satisfied:

$$1.90 < Np \qquad (6)$$

$$0.10 < |RNs/fvr| < 0.95 \qquad (7)$$

where Np denotes a refractive index of a positive lens having the highest refractive index at d-line (wavelength λ=587.6 nm) in the vibration reduction lens group, RNs denotes a radius of curvature of one surface whose absolute value of the radius of curvature is smaller than that of the other surface of a positive lens satisfying conditional expression (6) in the vibration reduction lens group, and fvr denotes a focal length of the vibration reduction lens group.

In a zoom optical system seen from another point of view according to the present application, as described above, with decentering at least a portion of a lens group disposed to the image side of the first lens group as a vibration reduction lens group in a direction including a component perpendicular to an optical axis, it becomes possible to correct an image blur caused by a camera shake, in other words, to carry out vibration reduction.

In a zoom optical system seen from another point of view according to the present application, since the vibration reduction lens group includes at least one negative lens and at least one positive lens, and satisfies the above-described conditional expressions (6) and (7), decentering aberration upon decentering the vibration reduction lens group can be suppressed, thereby obtaining excellent optical performance.

A function of one surface whose absolute value of a radius of curvature is smaller than that of the other surface of a positive lens in the vibration reduction lens group is achromatization of the vibration reduction lens group independently, control of Petzval sum of the whole optical system, correction of spherical aberration without carrying out decentering the vibration reduction lens group, and correction of coma upon decentering the vibration reduction lens group, so that it is important.

Among them, in order to correct coma upon decentering the vibration reduction lens group, it is effective that the radius of curvature of one surface whose absolute value of the radius of curvature is smaller than that of the other surface of a positive lens satisfying conditional expression (6) in the vibration reduction lens group is made small, and at the same time a radius of curvature of the other surface is also made small.

However, in a conventional zoom optical system, when a radius of curvature of a surface of a positive lens is made small, it becomes difficult to correct spherical aberration without carrying out decentering the vibration reduction lens group, and to control both of achromatization condition and Petzval sum. In a conventional zoom optical system, a high refractive index glass material satisfying conditional expression (6) is used in a negative lens in the vibration reduction lens group. Accordingly, Petzval sum, in particular, becomes large, so that it becomes difficult to correct curvature of field. On the other hand, in a zoom optical system seen from another point of view according to the present application, with satisfying conditional expression (6) by a positive lens having the largest refractive index in the vibration reduction lens group, correction of the above-described aberrations which is carried out by the lens surface having smaller absolute value of a radius of curvature of the positive lens can be carried out in a well-balanced manner.

Conditional expression (6) defines the refractive index of the positive lens having the highest refractive index among at least one positive lens in the vibration reduction lens group. As is known well, in order to make the Petzval sum small, it is effective that the radius of curvature of one surface whose absolute value of the radius of curvature is smaller than that of the other surface of a positive lens in the vibration reduction lens group is made small. However, in consideration of achromatization condition, when the refractive index of the positive lens having the largest refractive index in the vibration reduction lens group is equal to or falls below the lower limit of conditional expression (6), a refractive index of the other surface of the positive lens cannot be sufficiently small. Accordingly, it becomes difficult to sufficiently correct coma upon decentering the vibration reduction lens group. In order to secure the effect of the present application, it is preferable to set the lower limit of conditional expression (6) to 1.938. In order to further secure the effect of the present application, it is most preferable to set the lower limit of conditional expression (6) to 1.98.

Conditional expression (7) defines the radius of curvature of one surface having smaller absolute value of the radius of curvature of the positive lens satisfying conditional expression (6) in the vibration reduction lens group with respect to a focal length of the vibration reduction lens group.

When the value |RNs/fvr| is equal to or exceeds the upper limit of conditional expression (7) of a zoom optical system seen from another point of view according to the present application, correction of spherical aberration and coma becomes insufficient, and decentering aberration upon decentering the vibration reduction lens group becomes large. In order to secure the effect of the present application, it is preferable to set the upper limit of conditional expression (7) to 0.80. In order to further secure the effect of the present application, it is most preferable to set the upper limit of conditional expression (7) to 0.60.

On the other hand, when the value |RNs/fvr| is equal to or falls below the lower limit of conditional expression (7) of a zoom optical system seen from another point of view according to the present application, correction of spherical aberration and coma becomes excessive, and decentering aberration upon decentering the vibration reduction lens group becomes large. In order to secure the effect of the present application, it is preferable to set the lower limit of conditional expression (7) to 0.20. In order to further secure the effect of the present application, it is most preferable to set the lower limit of conditional expression (7) to 0.30.

With this configuration, it becomes possible to realize a zoom optical system having excellent optical performance.

In a zoom optical system seen from another point of view according to the present application, the vibration reduction lens group preferably has negative refractive power. With this configuration, it becomes possible to compose the vibration reduction lens group with less number of lenses in comparison with the other lens groups and to make the diameter of the vibration reduction lens group compact. Accordingly, a zoom optical system seen from another point of view according the present application is suitable for including a vibration reduction mechanism, and makes it possible to excellently correct variation in aberrations caused by vibration reduction.

In a zoom optical system seen from another point of view according to the present application, the following conditional expression (8) is preferably satisfied:

$$0.80 < (RNs + RNL)/(RNL - RNs) < 20.00 \qquad (8)$$

where RNs denotes a radius of curvature of one surface whose absolute value of the radius of curvature is smaller than that of the other surface of a positive lens satisfying conditional expression (6) in the vibration reduction lens group, and RNL denotes a radius of curvature of the other surface of the positive lens satisfying conditional expression (6) in the vibration reduction lens group.

In a zoom optical system seen from another point of view according to the present application, in order to excellently correct coma upon decentering the vibration reduction lens group, difference between a deflection angle on the object side surface of the positive lens and a deflection angle of the image side surface of the positive lens of a ray incident on the positive lens in the vibration reduction lens group from the object side is preferably small as much as possible. This is because aberrations generated on the object side lens surface of the positive lens is easily offset by aberrations generated on the image side lens surface. Accordingly, in order to excellently correct coma upon decentering the vibration reduction lens group, it is preferable that the degree of meniscus shape of the positive lens in the vibration lens group is large.

Conditional expression (8) is a so-called shape factor. When the value (RNs+RNL)/(RNL−RNs) is positive and is large as much as possible, degree of the meniscus shape of the positive lens satisfying 1.90<Np in the vibration reduction lens group becomes large. Accordingly, when a zoom optical system seen from another point of view according to the present application satisfies conditional expression (8), it becomes possible to excellently correct coma upon decentering the vibration reduction lens group.

When the value (RNs+RNL)/(RNL−RNs) is equal to or falls below the lower limit of conditional expression (8) of a zoom optical system seen from another point of view according to the present application, the above-described difference between deflection angles becomes too large, so that it is undesirable. In order to secure the effect of the present application, it is preferable to set the lower limit of conditional expression (8) to 1.20.

On the other hand, when the value (RNs+RNL)/(RNL−RNs) is equal to or exceeds the upper limit of conditional expression (8), the above-described difference between deflection angles becomes too small, and the positive lens does not contribute much to correction of aberration, so that it is undesirable. In order to secure the effect of the present application, it is preferable to set the upper limit of conditional expression (8) to 15.00.

In a zoom optical system seen from another point of view according to the present application, the following conditional expression (9) is preferably satisfied:

$$-40.00 < vn-vp < -15.00 \tag{9}$$

where vn denotes an Abbe number of a negative lens having the largest Abbe number at d-line (wavelength λ=587.6 nm) in the vibration reduction lens group, and vp denotes an Abbe number at d-line (wavelength λ=587.6 nm) of a positive lens satisfying conditional expression (6) in the vibration reduction lens group.

Conditional expression (9) defines an Abbe number of a negative lens having the largest Abbe number in the vibration reduction lens group and an Abbe number of a positive lens satisfying conditional expression (6) in the vibration reduction lens group.

When the value vn−vp is equal to or exceeds the upper limit of conditional expression (9), correction of longitudinal chromatic aberration and lateral chromatic aberration generated in the vibration reduction lens group tends to become insufficient. Moreover, when these chromatic aberrations are forced to be corrected, correction of spherical aberration and coma become excessive, so that it becomes difficult to correct aberrations upon decentering the vibration reduction lens group. In order to secure the effect of the present application, it is preferable to set the upper limit of conditional expression (9) to −20.00.

On the other hand, when the value vn−vp is equal to or falls below the lower limit of conditional expression (9), correction of longitudinal chromatic aberration and lateral chromatic aberration generated in the vibration reduction lens group tends to become excessive. Moreover, when these chromatic aberrations are forced to be corrected, correction of spherical aberration and coma become insufficient, so that it becomes difficult to correct aberrations upon decentering the vibration reduction lens group. In order to secure the effect of the present application, it is preferable to set the lower limit of conditional expression (9) to −30.00.

In a zoom optical system seen from another point of view according to the present application, the following conditional expression (2) is preferably satisfied:

$$-7.00 < fr/fvr < -1.00 \tag{2}$$

where fr denotes a combined focal length of lens groups disposed between the vibration reduction lens group and the image plane in the telephoto end state, and fvr denotes a focal length of the vibration reduction lens group.

Conditional expression (2) defines the combined focal length of the lens groups disposed between the vibration reduction lens group and the image plane with respect to the focal length of the vibration reduction lens group. However, conditional expression (2) has already been explained above so that duplicated explanations are omitted.

In a zoom optical system seen from another point of view according to the present application, it is preferable that the third lens group includes at least one negative lens and satisfies the following conditional expressions (3) and (4):

$$1.85 < N3n \tag{3}$$

$$22.00 < v3n < 40.00 \tag{4}$$

where N3n denotes a refractive index of the at least one negative lens in the third lens group at d-line (wavelength λ=587.6 nm), and v3n denotes an Abbe number of the at least one negative lens in the third lens group at d-line (wavelength λ=587.6 nm).

In a zoom optical system seen from another point of view according to the present application, with adopting a glass material having a higher refractive index than that of the positive lens in the third lens group into the negative lens in the third lens group, it becomes easy to correct spherical aberration and coma, so that this is defined by conditional expression (3). Moreover, the Abbe number of the glass material adopted into the negative lens in the third lens group is defined by conditional expression (4) in consideration of achromatic condition. However, conditional expressions (3) and (4) have already been explained above, so that duplicated explanations are omitted.

In a zoom optical system seen from another point of view according to the present application, the following conditional expression (10) is preferably satisfied:

$$0.30 < RNs/RNL < 1.00 \tag{10}$$

where RNs denotes a radius of curvature of one surface whose absolute value of the radius of curvature is smaller than that of the other surface of a positive lens satisfying conditional expression (6) in the vibration reduction lens group, and RNL denotes a radius of curvature of an opposite surface of the one surface whose absolute value of the radius of curvature is smaller than that of the other surface of a positive lens satisfying conditional expression (6) in the vibration reduction lens group.

In a zoom optical system seen from another point of view according to the present application, in order to excellently correct coma upon decentering the vibration reduction lens group, difference between a deflection angle on the object side surface of the positive lens and a deflection angle of the image side surface of the positive lens of a ray incident on the positive lens in the vibration reduction lens group from the object side is preferably small as much as possible. Conditional expression (10) defines radii of curvature of both sides of the positive lens satisfying conditional expression (6) in the vibration reduction lens group. With satisfying conditional expression (10), a zoom optical system seen from another point of view according to the present application makes it possible to make the difference between deflection angles small, so that coma upon decentering the vibration reduction lens group can be excellently corrected.

Here, since conditional expression (10) defines each radius of curvature of the positive lens, the upper limit becomes 1.00. In order to secure the effect of the present application, it is preferable to set the upper limit of conditional expression (10) to 0.90.

On the other hand, when the ratio RNs/RNL is equal to or falls below the lower limit of conditional expression (10) of a zoom optical system seen from another point of view according to the present application, the difference between deflection angles becomes large. As a result, it becomes difficult to correct coma upon decentering the vibration reduction lens group. In order to secure the effect of the present application, it is preferable to set the lower limit of conditional expression (10) to 0.50.

Moreover, in a zoom optical system seen from another point of view according to the present application, an aperture stop is preferably disposed in the third lens group or in the vicinity of the third lens group. With this lens configuration, a zoom optical system seen from another point of view according to the present application makes it possible to secure sufficient light amount in the periphery of the image, and to excellently correct curvature of field.

Moreover, in a zoom optical system seen from another point of view according to the present application, it is preferable that the rear lens group includes a fourth lens group to the image side of the third lens group, and the vibration reduction lens group is composed of at least a portion of the fourth lens group. With this lens configuration, a zoom optical system seen from another point of view according to the present application makes it possible to suppress variation in coma upon decentering the vibration reduction lens group.

Moreover, in a zoom optical system seen from another point of view according to the present application, the rear lens group includes the fourth lens group disposed to the image side of the third lens group, and a distance between the third lens group and the fourth lens group preferably varies upon zooming from a wide-angle end state to a telephoto end state. With this lens configuration, a zoom optical system seen from another point of view according to the present application makes it possible to secure a given zoom ratio with suppressing variation in aberrations such as spherical aberration upon zooming in a low level.

When each lens surface of a lens composing a zoom optical system seen from another point of view according to the present application is a spherical surface or a plane surface, processing of the lens surface and assembly become easy, so that deterioration of optical performance caused by errors upon processing and assembling can be prevented. Even if the lens surface is shifted, deterioration in optical performance is small, so that it is desirable.

An optical apparatus seen from another point of view according to the present application is equipped with the above-described zoom optical system seen from another point of view. With this construction, it becomes possible to realize an optical apparatus having excellent optical performance.

Then, an outline of a method for manufacturing a zoom optical system seen from another point of view according to the present application is explained with reference to FIG. 31.

Figure 31:
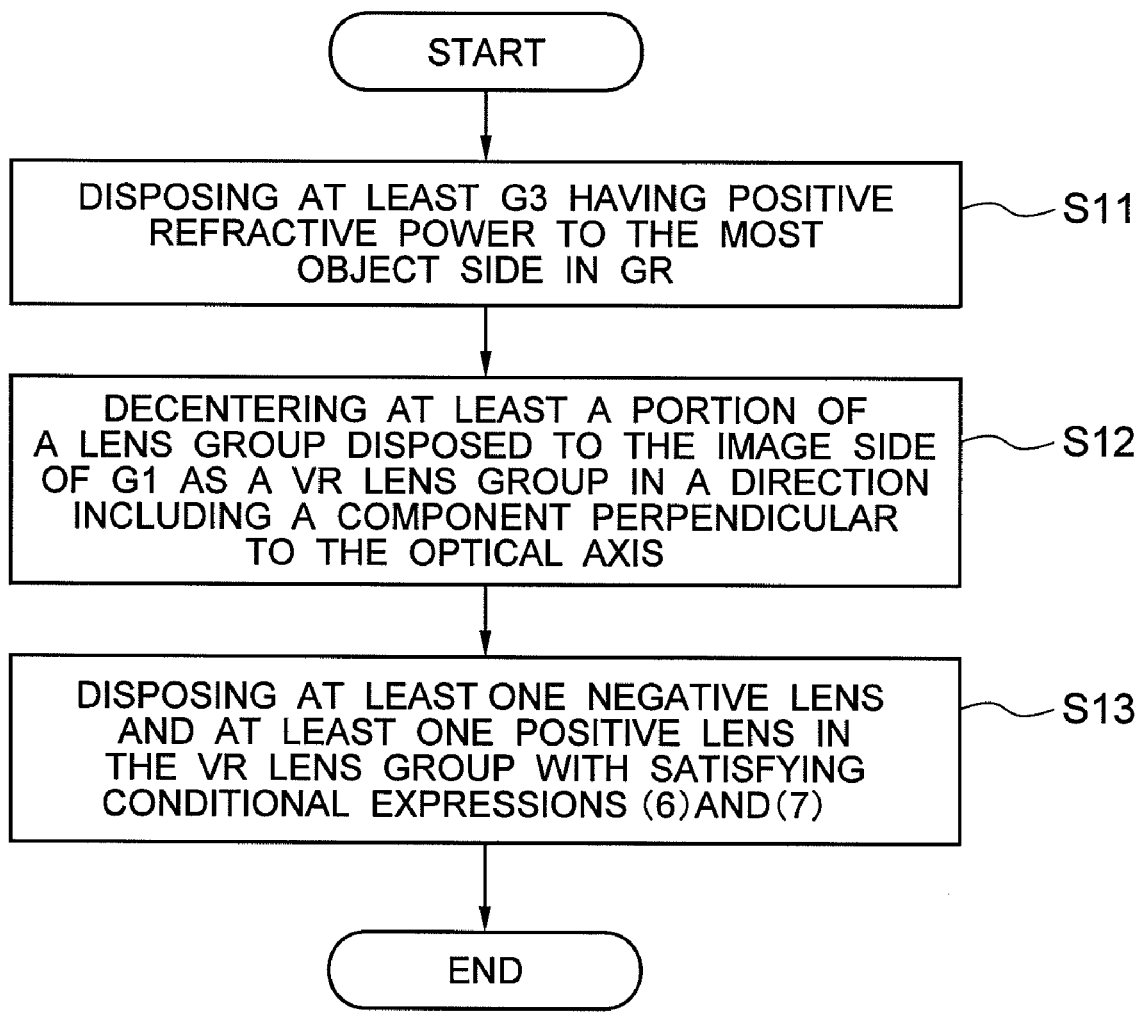
FIG. 31 is a flowchart schematically explaining a method for manufacturing the zoom optical system seen from another point of view according to of the present application.

FIG. 31 is a flowchart schematically explaining a method for manufacturing the zoom optical system seen from another point of view according to the present application.

The method for manufacturing a zoom optical system seen from another point of view according to the present application is a method for manufacturing a zoom optical system composed of, in order from an object side, a first lens group having positive refractive power, a second lens group having negative refractive power, and a rear lens group having positive refractive power, and includes the following step S11 through step S13.

Step S11: providing the first lens group, the second lens group and the rear lens group, disposing them in a lens barrel in order from the object side, and disposing at least a third lens group having positive refractive power to the most object side in the rear lens group.

Step S12: decentering at least a portion of a lens group disposed to the image side of the first lens group as a vibration reduction lens group by means of a well-known moving mechanism in a direction including a component perpendicular to the optical axis.

Step S13: disposing at least one negative lens and at least one positive lens in the vibration reduction lens group, and satisfying the following conditional expressions (6) and (7):

$$1.90 < Np \qquad (6)$$

$$0.10 < |RNs/fvr| < 0.95 \qquad (7)$$

where Np denotes a refractive index of a positive lens having the highest refractive index at d-line (wavelength λ=587.6 nm) in the vibration reduction lens group, RNs denotes a radius of curvature of one surface whose absolute value of the radius of curvature is smaller than that of the other surface of a positive lens satisfying conditional expression (6) in the vibration reduction lens group, and fvr denotes a focal length of the vibration reduction lens group.

The method for manufacturing a zoom optical system seen from another point of view according to the present application makes it possible to manufacture a zoom optical system having excellent optical performance.

A zoom optical system according to each numerical example of the present application is explained below with reference to accompanying drawings.

Example 1

FIG. 1 is a sectional view showing a lens configuration of a zoom optical system in a wide-angle end state according to Example 1 of the present application.

The zoom optical system according to Example 1 is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having negative refractive power, and a fifth lens group G5 having positive refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a cemented negative lens constructed by a double concave negative lens L21 cemented with a positive meniscus lens L22 having a convex surface facing the object side, and a negative meniscus lens L23 having a concave surface facing the object side.

The third lens group G3 is composed of, in order from the object side, a double convex positive lens L31, a double convex positive lens L32, a cemented negative lens constructed by a double convex positive lens L33 cemented with a double concave negative lens L34, and a double convex positive lens L35.

The fourth lens group G4 is composed of a cemented negative lens constructed by, in order from the object side, a negative meniscus lens L41 having a convex surface facing the object side cemented with a positive meniscus lens L42 having a convex surface facing the object side.

The fifth lens group G5 is composed of, in order from the object side, a cemented positive lens constructed by a double convex positive lens L51 cemented with a negative meniscus lens L52 having a concave surface facing the object side, and a cemented negative lens constructed by a positive meniscus lens L53 having a concave surface facing the object side cemented with a negative meniscus lens L54 having a concave surface facing the object side.

The aperture stop S is disposed to the object side of the third lens group G3 in the vicinity thereof, and moved together with the third lens group G3 upon zooming from the wide-angle end state to a telephoto end state.

In the zoom optical system according to Example 1, upon zooming from the wide-angle end state to the telephoto end state, each lens group G1 through G5 move along an optical axis such that the distance between the first lens group G1 and the second lens group G2 increases, a distance between the second lens group G2 and the third lens group G3 decreases, a distance between the third lens group G3 and the fourth lens group G4 is constant, and a distance between the fourth lens group G4 and the fifth lens group G5 is constant. In this instance, distances between lenses L31 through L35 composing the third lens group are constant.

In the zoom optical system according to Example 1, the whole of the fourth lens group G4 is decentered as a vibration reduction lens group in a direction including a component perpendicular to the optical axis, thereby carrying out vibration reduction.

Moreover, in the zoom optical system according to Example 1, the whole of the first lens group G1 is moved toward the object side, thereby carrying out focusing from infinity to a close object.

Various values associated with the zoom optical system according to Example 1 of the present application are listed below in Table 1.

In [Specifications], W denotes a wide-angle end state, M denotes an intermediate focal length state, T denotes a telephoto end state, f denotes a focal length of the zoom optical system, FNO denotes an f-number, ω denotes a half angle of view, Y denotes an image height, TL denotes a total length of the optical system, and Bf denotes a back focal length. In [Lens Data], the left most column "i" shows the lens surface number counted in order from the object side, the second column "r" shows a radius of curvature of the lens surface, the third column "d" shows a distance to the next lens surface, the fourth column "nd" shows a refractive index at d-line (wavelength λ=587.6 nm), and the fifth column "vd" shows an Abbe number at d-line (wavelength λ=587.6 nm). In the fifth column "nd" refractive index of the air nd=1.000000 is omitted. In the second column "r", r=∞ denotes a plane surface. In [Lens Group Data], "I" denotes a start surface number of a lens group.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

In a lens system having a focal length of f, and a vibration coefficient (a ratio of a moving amount of an image on the image plane I to a moving amount of the vibration reduction lens group upon carrying out vibration reduction) of K, in order to correct rotational camera shake of θ, the vibration reduction lens group is to be moved by an amount of (f·tan θ)/K in a direction perpendicular to the optical axis. Accordingly, in the zoom optical system according to Example 1 of the present application, in the wide-angle end state, the vibration reduction coefficient K is 1.13 and the focal length is 56.09 mm, so that in order to correct rotational camera shake of 0.70 degrees, the moving amount of the fourth lens group G4 becomes 0.60 mm. In the telephoto end state, the vibration reduction coefficient K is 1.73 and the focal length is 293.90 mm, so that in order to correct rotational camera shake of 0.30 degrees, the moving amount of the fourth lens group G4 becomes 0.89 mm.

TABLE 1

[Specifications]
zoom ratio = 5.240

| | W | M | T |
|---|---|---|---|
| f = | 56.09 | 129.95 | 293.90 |
| FNO = | 4.63 | 4.91 | 5.88 |
| ω = | 14.76 | 6.16 | 2.77 |
| Y = | 14.50 | 14.50 | 14.50 |
| TL = | 166.62 | 194.87 | 208.59 |
| BF = | 40.20 | 44.88 | 68.20 |

[Lens Data]

| i | r | d | nd | vd |
|---|---|---|---|---|
| 1 | 267.2708 | 4.40 | 1.51680 | 64.1 |
| 2 | −267.2701 | 0.20 | | |
| 3 | 76.5471 | 2.00 | 1.78472 | 25.68 |
| 4 | 52.6873 | 8.20 | 1.49700 | 81.54 |
| 5 | 1207.6009 | (d5) | | |
| 6 | −246.6847 | 1.20 | 1.74100 | 52.67 |
| 7 | 19.6258 | 3.80 | 1.84666 | 23.78 |
| 8 | 44.5733 | 3.40 | | |
| 9 | −41.2120 | 1.20 | 1.80400 | 46.57 |
| 10 | −357.8603 | (d10) | | |
| 11 | ∞ | 1.80 | Aperture Stop S | |
| 12 | 70.0435 | 3.10 | 1.69680 | 55.52 |
| 13 | −211.0000 | 0.20 | | |
| 14 | 69.6788 | 3.10 | 1.69680 | 55.52 |
| 15 | −230.0000 | 0.20 | | |
| 16 | 52.6910 | 4.80 | 1.49700 | 81.54 |
| 17 | −52.6889 | 1.20 | 1.90366 | 31.27 |
| 18 | 43.1764 | 0.20 | | |

TABLE 1-continued

| 19 | 29.0997 | 4.60 | 1.56384 | 60.67 |
| 20 | −547.7122 | (d20) | | |
| 21 | 522.7391 | 1.10 | 1.77250 | 49.61 |
| 22 | 17.9430 | 1.90 | 2.00069 | 25.46 |
| 23 | 28.0061 | (d23) | | |
| 24 | 49.1627 | 4.50 | 1.64769 | 33.8 |
| 25 | −28.8622 | 3.00 | 1.72000 | 50.23 |
| 26 | −52.2713 | 2.80 | | |
| 27 | −26.8616 | 4.00 | 1.48749 | 70.41 |
| 28 | −15.4005 | 1.00 | 1.80100 | 34.96 |
| 29 | −36.4531 | BF | | |

[Variable Distances]

| | W | M | T |
|---|---|---|---|
| d5 | 4.35 | 43.24 | 55.74 |
| d10 | 39.77 | 24.45 | 2.35 |
| d20 | 17.20 | 17.20 | 17.20 |
| d23 | 3.20 | 3.20 | 3.20 |
| BF | 40.20 | 44.88 | 68.20 |

[Lens Group Data]

| Group | I | focal length |
|---|---|---|
| 1 | 1 | 120.20 |
| 2 | 6 | −28.84 |
| 3 | 11 | 36.07 |
| 4 | 21 | −47.54 |
| 5 | 24 | 107.10 |

[Values for Conditional Expressions]

(1) Lf/Lr = 0.3102
(2) fr/fvr = −2.253
(3) N3n = 1.90366
(4) ν3n = 31.27
(5) Rs/RL = 0.641
(6) Np = 2.00069
(7) |RNs/fvr| = 0.377
(8) (RNs + RNL)/(RNL − RNs) = 4.566
(9) νn − νp = 24.15
(10) RNs/RNL = 0.641

Figure 2B:
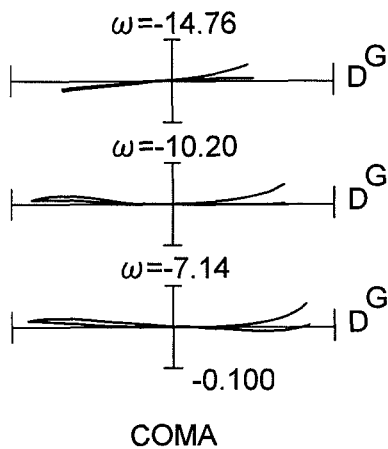
Figure 3:
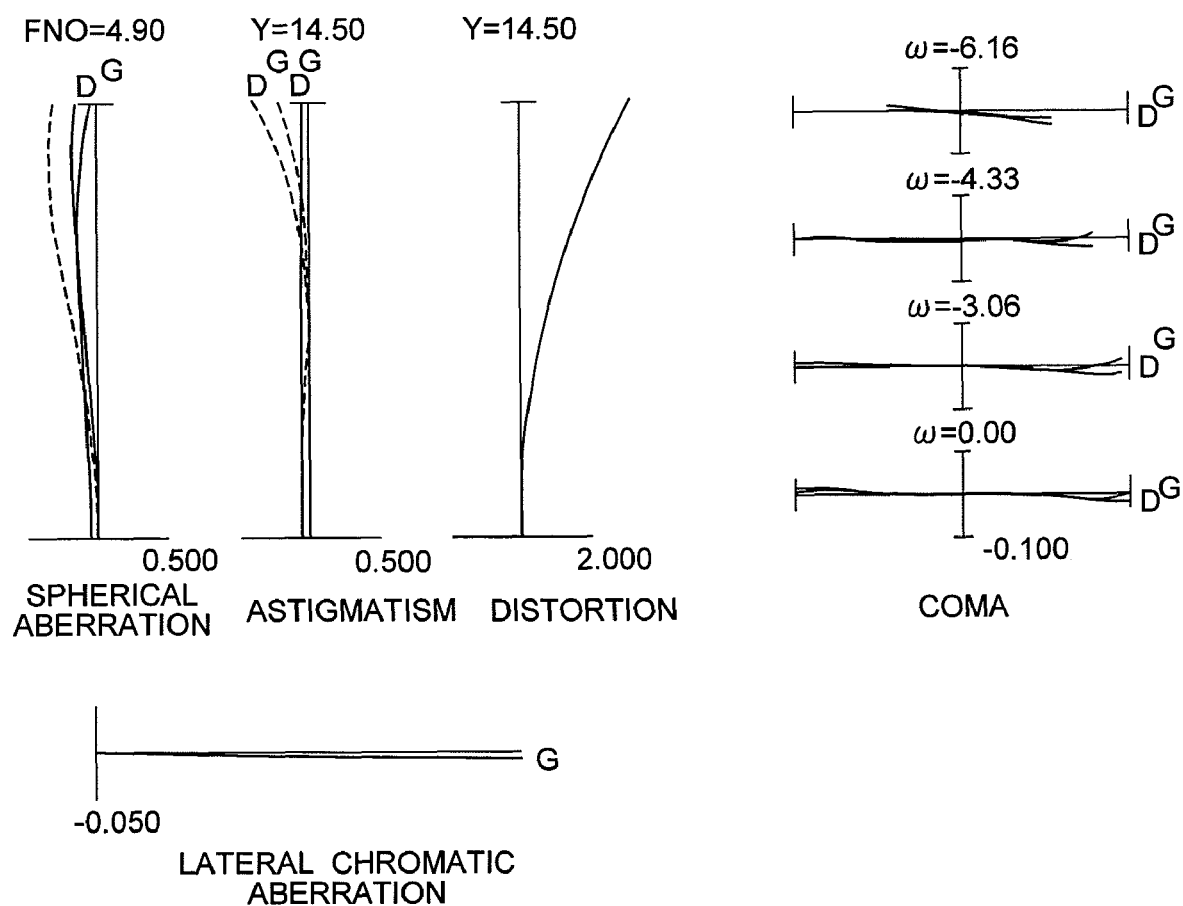
FIG. 3 is graphs showing various aberrations of the zoom optical system according to Example 1 in an intermediate focal length state focusing on infinity.
Figure 4A:
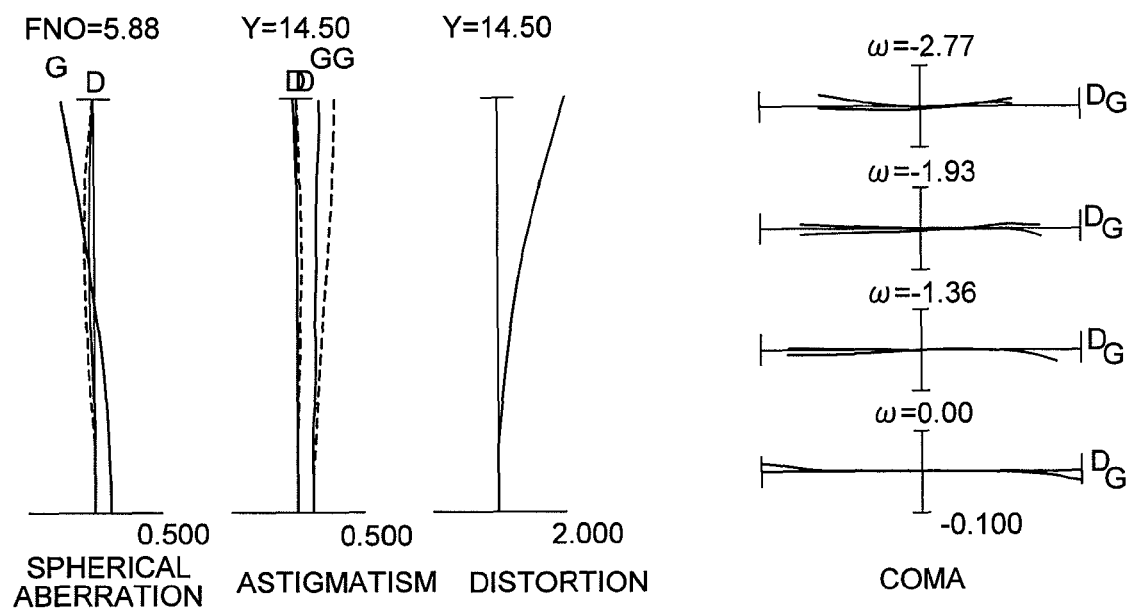
Figure 4B:
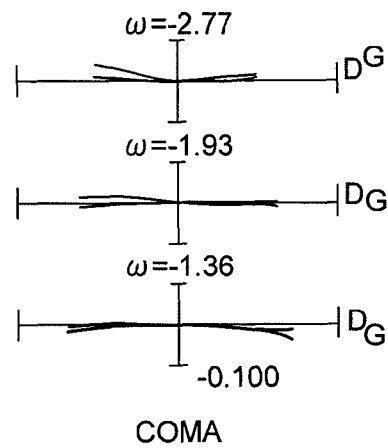

FIGS. 2A, and 2B are graphs showing various aberrations of the zoom optical system according to Example 1 in a wide-angle end state focusing on infinity, in which FIG. 2A shows various aberrations without carrying out vibration reduction, and FIG. 2B shows coma upon carrying out vibration reduction with respect to a rotational camera shake of 0.70 degrees. FIG. 3 is graphs showing various aberrations of the zoom optical system according to Example 1 in an intermediate focal length state focusing on infinity. FIGS. 4A, and 4B are graphs showing various aberrations of the zoom optical system according to Example 1 in a telephoto end state focusing on infinity, in which FIG. 4A shows various aberrations without carrying out vibration reduction, and FIG. 4B shows coma upon carrying out vibration reduction with respect to a rotational camera shake of 0.30 degrees.

In respective graphs, FNO denotes an f-number, Y denotes an image height, and ω denotes a half angle of view. In graphs showing spherical aberration, an f-number with respect to the maximum aperture is shown. In graphs showing astigmatism and distortion, the maximum image height is shown. In graphs showing coma, a half angle of view is shown. In respective graphs, D denotes d-line (wavelength λ=587.6 nm), and G denotes g-line (wavelength λ=435.6 nm). In graphs showing astigmatism, a solid line indicates a sagittal image plane, and a broken line indicates a meridional image plane. The above-described explanations regarding various aberration graphs are the same as the following Examples.

As is apparent from the respective graphs, the zoom optical system according to Example 1 shows superb optical performance as a result of good corrections to various aberrations from the wide-angle end state through the telephoto end state even upon carrying out vibration reduction.

Example 2

FIG. 5 is a sectional view showing a lens configuration of a zoom optical system according to Example 2 of the present application in a wide-angle end state.

The zoom optical system according to Example 2 of the present application is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having negative refractive power, and a fifth lens group G5 having positive refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a cemented negative lens constructed by a double concave negative lens L21 cemented with a positive meniscus lens L22 having a convex surface facing the object side, and a double concave negative lens L23.

The third lens group G3 is composed of, in order from the object side, a double convex positive lens L31, a double convex positive lens L32, a cemented negative lens constructed by a double convex positive lens L33 cemented with a double concave negative lens L34, and a double convex positive lens L35.

The fourth lens group G4 is composed of a cemented negative lens constructed by, in order from the object side, a negative meniscus lens L41 having a convex surface facing the object side cemented with a positive meniscus lens L42 having a convex surface facing the object side.

The fifth lens group G5 is composed of, in order from the object side, a cemented positive lens constructed by a double convex positive lens L51 cemented with a negative meniscus lens L52 having a concave surface facing the object side, and cemented negative lens constructed by a positive meniscus lens L53 having a concave surface facing the object side cemented with a negative meniscus lens L54 having a concave surface facing the object side.

The aperture stop S is disposed to the object side of the third lens group G3 in the vicinity thereof, and moved together with the third lens group G3 upon zooming from the wide-angle end state to a telephoto end state.

In the zoom optical system according to Example 2 of the present application, respective lens groups G1 through G5 are moved along an optical axis such that upon zooming from the wide-angle end state to the telephoto end state, a distance between the first lens group G1 and the second lend group G2 increases, a distance between the second lens group G2 and the third lens group G3 decreases, a distance between the third lens group G3 and the fourth lens group G4 increases, and a distance between the fourth lens group G4 and the fifth lens group G5 decreases. In this instance, distances between lenses L31 through L35 composing the third lens group G3 are constant In the zoom optical system according to Example 2, the whole of the fourth lens group G4 is decentered as a vibration reduction lens group in a direction including a component perpendicular to the optical axis, thereby carrying out vibration reduction.

Moreover, in the zoom optical system according to Example 2, the whole of the first lens group G1 is moved toward the object side, thereby carrying out focusing from infinity to a close object.

Various values associated with the zoom optical system according to Example 2 of the present application are listed below in Table 2.

Here, in the zoom optical system according to Example 2 of the present application, in the wide-angle end state, the vibration reduction coefficient K is 1.10 and the focal length is 55.36 mm, so that in order to correct rotational camera shake of 0.70 degrees, the moving amount of the fourth lens group G4 becomes 0.62 mm. In the telephoto end state, the vibration reduction coefficient K is 1.58 and the focal length is 293.95 mm, so that in order to correct rotational camera shake of 0.30 degrees, the moving amount of the fourth lens group G4 becomes 0.97 mm.

TABLE 2

[Specifications]
zoom ratio = 5.310

| | W | M | T |
|---|---|---|---|
| f = | 55.36 | 132.00 | 293.95 |
| FNO = | 4.52 | 4.89 | 5.94 |
| ω = | 14.88 | 6.09 | 2.77 |
| Y = | 14.50 | 14.50 | 14.50 |
| TL = | 167.33 | 195.55 | 205.44 |
| BF = | 39.53 | 45.47 | 65.15 |

[Lens Data]

| i | r | d | nd | νd |
|---|---|---|---|---|
| 1 | 276.3385 | 4.40 | 1.51680 | 64.11 |
| 2 | −276.3385 | 0.20 | | |
| 3 | 73.0686 | 2.00 | 1.78472 | 25.68 |
| 4 | 50.9075 | 8.20 | 1.49700 | 81.54 |
| 5 | 827.6476 | (d5) | | |
| 6 | −234.1051 | 1.20 | 1.74100 | 52.67 |
| 7 | 20.2788 | 3.86 | 1.84666 | 23.78 |
| 8 | 50.5632 | 3.40 | | |
| 9 | −63.6972 | 1.20 | 1.80400 | 46.57 |
| 10 | 118.8876 | (d10) | | |
| 11 | ∞ | 1.80 | Aperture Stop S | |
| 12 | 59.3138 | 3.10 | 1.69680 | 55.52 |
| 13 | −353.1505 | 0.20 | | |
| 14 | 79.2036 | 3.10 | 1.69680 | 55.52 |
| 15 | −448.3938 | 0.20 | | |
| 16 | 46.2667 | 4.80 | 1.49700 | 81.54 |
| 17 | −56.5477 | 1.20 | 1.90366 | 31.27 |
| 18 | 48.0065 | 0.20 | | |
| 19 | 30.0405 | 4.60 | 1.54675 | 64.19 |
| 20 | −358.2365 | (d20) | | |
| 21 | 370.5894 | 1.28 | 1.77250 | 49.61 |
| 22 | 23.6184 | 1.55 | 2.00272 | 18.16 |
| 23 | 30.8651 | (d23) | | |
| 24 | 49.1161 | 4.50 | 1.64769 | 33.80 |
| 25 | −23.2660 | 1.00 | 1.74397 | 44.85 |
| 26 | −60.2732 | 3.22 | | |
| 27 | −22.9694 | 4.00 | 1.48749 | 70.41 |
| 28 | −15.4368 | 2.00 | 1.80100 | 34.96 |
| 29 | −31.1919 | BF | | |

[Variable Distances]

| | W | M | T |
|---|---|---|---|
| d5 | 3.60 | 42.65 | 55.15 |
| d10 | 40.98 | 24.63 | 2.40 |
| d20 | 16.69 | 17.27 | 19.53 |
| d23 | 5.33 | 4.31 | 2.00 |
| BF | 39.53 | 45.47 | 65.15 |

[Lens Group Data]

| Group | I | focal length |
|---|---|---|
| 1 | 1 | 120.20 |
| 2 | 6 | −28.50 |
| 3 | 11 | 35.27 |
| 4 | 21 | −49.20 |
| 5 | 24 | 136.45 |

[Values for Conditional Expressions]

(1) Lf/Lr = 0.3054
(2) fr/fvr = −2.773
(3) N3n = 1.90366
(4) ν3n = 31.27
(5) Rs/RL = 0.765
(6) Np = 2.00272
(7) |RNs/fvr| = 0.480
(8) (RNs + RNL)/(RNL − RNs) = 7.518
(9) νn − νp = 31.45
(10) RNs/RNL = 0.765

Figure 7:
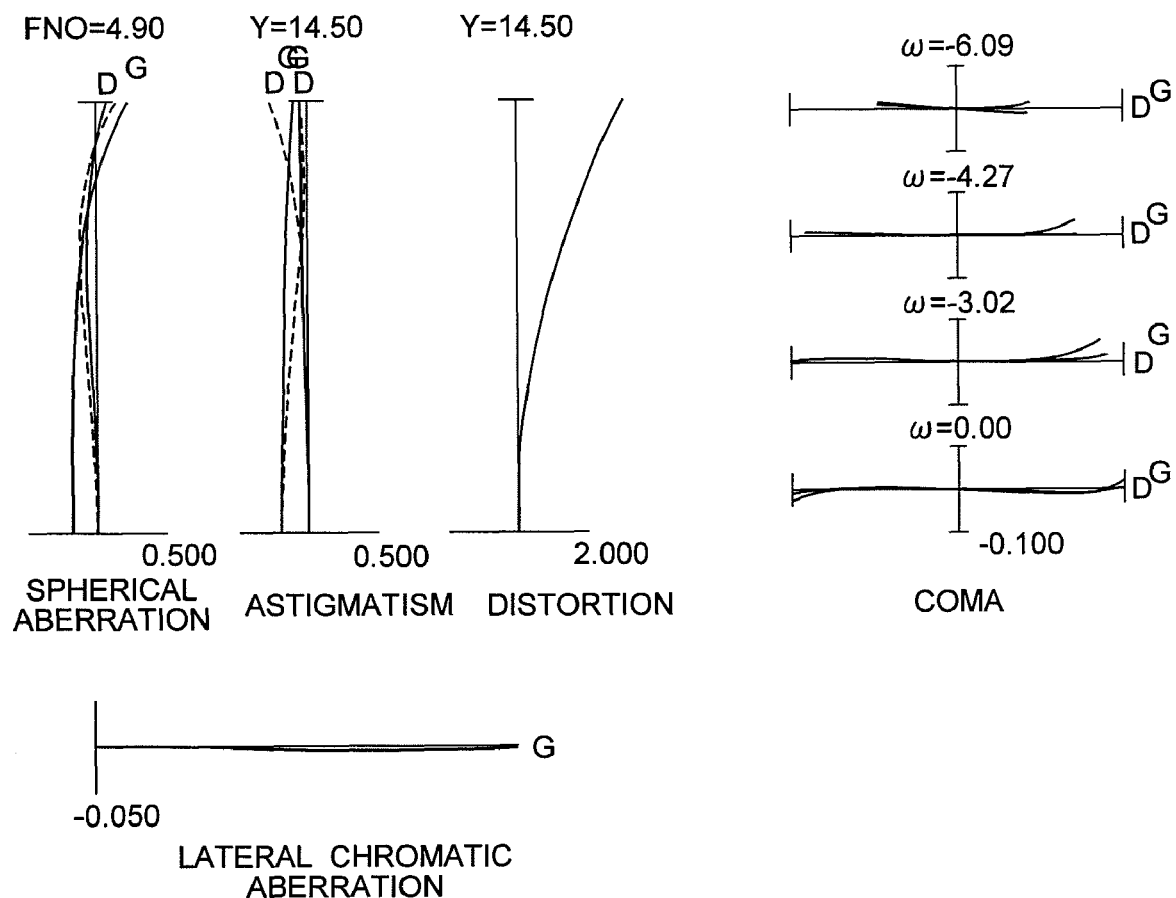
FIG. 7 is graphs showing various aberrations of the zoom optical system according to Example 2 in an intermediate focal length state focusing on infinity.
Figure 8A:
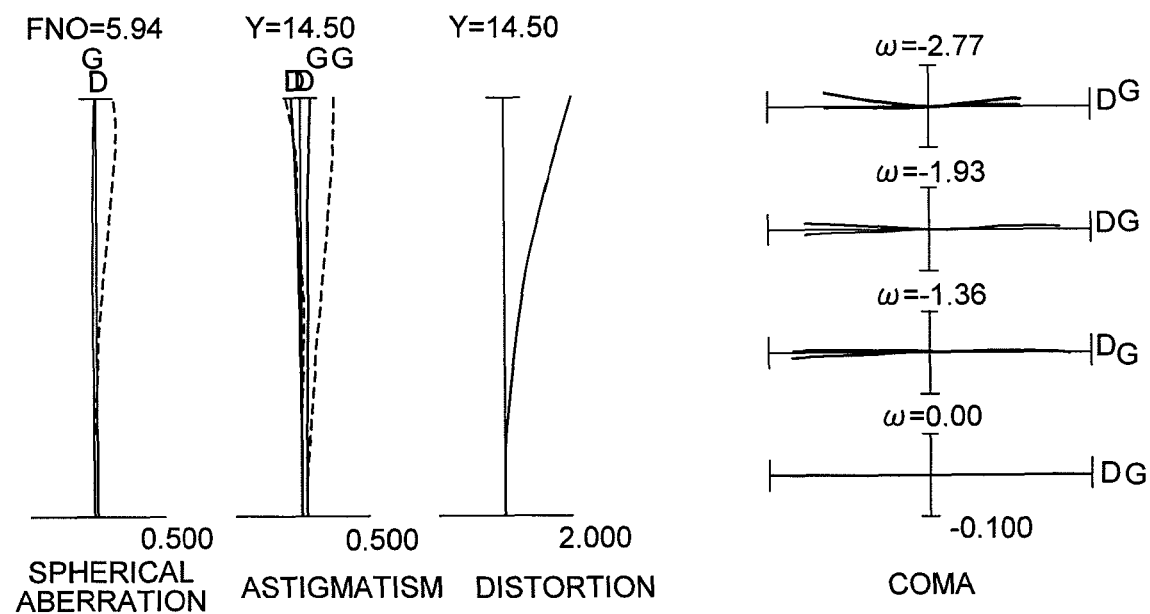
Figure 8B:
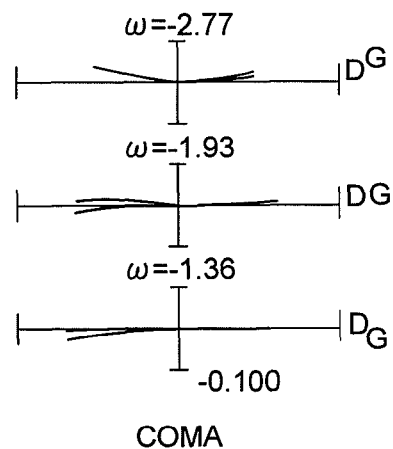

FIGS. 6A, and 6B are graphs showing various aberrations of the zoom optical system according to Example 2 of the present application in a wide-angle end state focusing on infinity, in which FIG. 6A shows various aberrations without carrying out vibration reduction, and FIG. 6B shows coma upon carrying out vibration reduction with respect to a rotational camera shake of 0.70 degrees. FIG. 7 is graphs showing various aberrations of the zoom optical system according to Example 2 of the present application in an intermediate focal length state focusing on infinity. FIGS. 8A, and 8B are graphs showing various aberrations of the zoom optical system according to Example 2 of the present application in a telephoto end state focusing on infinity, in which FIG. 8A shows various aberrations without carrying out vibration reduction, and FIG. 8B shows coma upon carrying out vibration reduction with respect to a rotational camera shake of 0.30 degrees.

As is apparent from the respective graphs, the zoom optical system according to Example 2 of the present application shows superb optical performance as a result of good corrections to various aberrations from the wide-angle end state through the telephoto end state even upon carrying out vibration reduction.

Example 3

FIG. 9 is a sectional view showing a lens configuration of a zoom optical system according to Example 3 of the present application in a wide-angle end state.

The zoom optical system according to Example 3 of the present application is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having negative refractive power, and a fifth lens group G5 having positive refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a cemented negative lens constructed by a double concave negative lens L21 cemented with a positive meniscus lens L22 having a convex surface facing the object side, and a double concave negative lens L23.

The third lens group G3 is composed of, in order from the object side, a double convex positive lens L31, a positive meniscus lens L32 having a convex surface facing the object side, a cemented negative lens constructed by a double convex positive lens L33 cemented with a double concave negative lens L34, and a double convex positive lens L35.

The fourth lens group G4 is composed of a cemented negative lens constructed by, in order from the object side, a negative meniscus lens L41 having a convex surface facing the object side cemented with a positive meniscus lens L42 having a convex surface facing the object side.

The fifth lens group G5 is composed of, in order from the object side, a cemented positive lens constructed by a double convex positive lens L51 cemented with a negative meniscus lens L52 having a concave surface facing the object side, and a cemented negative lens constructed by a positive meniscus lens L53 having a concave surface facing the object side cemented with a negative meniscus lens L54 having a concave surface facing the object side.

The aperture stop S is disposed to the object side of the third lens group G3 in the vicinity thereof, and moved together with the third lens group G3 upon zooming from the wide-angle end state to a telephoto end state.

In the zoom optical system according to Example 3 of the present application, respective lens groups G1 through G5 are moved along an optical axis such that upon zooming from the wide-angle end state to the telephoto end state, a distance between the first lens group G1 and the second lend group G2 increases, a distance between the second lens group G2 and the third lens group G3 decreases, a distance between the third lens group G3 and the fourth lens group G4 increases, and a distance between the fourth lens group G4 and the fifth lens group G5 decreases. In this instance, distances between lenses L31 through L35 composing the third lens group G3 are constant In the zoom optical system according to Example 3, the whole of the fourth lens group G4 is decentered as a vibration reduction lens group in a direction including a component perpendicular to the optical axis, thereby carrying out vibration reduction.

Moreover, in the zoom optical system according to Example 3, the whole of the first lens group G1 is moved toward the object side, thereby carrying out focusing from infinity to a close object.

Various values associated with the zoom optical system according to Example 3 of the present application are listed below in Table 3.

Here, in the zoom optical system according to Example 3 of the present application, in the wide-angle end state, the vibration reduction coefficient K is 1.07 and the focal length is 55.22 mm, so that in order to correct rotational camera shake of 0.70 degrees, the moving amount of the fourth lens group G4 becomes 0.63 mm. In the telephoto end state, the vibration reduction coefficient K is 1.59 and the focal length is 293.26 mm, so that in order to correct rotational camera shake of 0.30 degrees, the moving amount of the fourth lens group G4 becomes 0.96 mm.

TABLE 3

[Specifications]
zoom ratio = 5.311

|  | W | M | T |
|---|---|---|---|
| f = | 55.22 | 131.79 | 293.26 |
| FNO = | 4.44 | 4.85 | 5.88 |
| ω = | 14.95 | 6.11 | 2.78 |
| Y = | 14.50 | 14.50 | 14.50 |
| TL = | 167.24 | 195.81 | 208.71 |
| BF = | 41.36 | 48.41 | 70.45 |

[Lens Data]

| i | r | d | nd | νd |
|---|---|---|---|---|
| 1 | 258.8169 | 4.40 | 1.51680 | 64.11 |
| 2 | −258.8169 | 0.20 |  |  |
| 3 | 73.2475 | 2.00 | 1.78472 | 25.68 |
| 4 | 50.6603 | 8.20 | 1.49700 | 81.54 |
| 5 | 614.5655 | (d5) |  |  |
| 6 | −307.1604 | 1.20 | 1.74100 | 52.67 |
| 7 | 19.8433 | 3.86 | 1.84666 | 23.78 |
| 8 | 47.7637 | 3.40 |  |  |
| 9 | −53.5015 | 1.20 | 1.80400 | 46.57 |
| 10 | 184.3593 | (d10) |  |  |
| 11 | ∞ | 1.80 | Aperture Stop S |  |
| 12 | 55.7895 | 3.10 | 1.69680 | 55.52 |
| 13 | −124.3740 | 0.20 |  |  |
| 14 | 61.2057 | 3.10 | 1.69680 | 55.52 |
| 15 | 206.5890 | 0.20 |  |  |
| 16 | 42.8739 | 4.80 | 1.49700 | 81.54 |
| 17 | −58.0379 | 1.20 | 1.90366 | 31.27 |
| 18 | 37.2068 | 0.78 |  |  |
| 19 | 26.9337 | 4.60 | 1.55208 | 64.52 |
| 20 | −1082.9155 | (d20) |  |  |
| 21 | 322.5905 | 1.06 | 1.74100 | 52.67 |
| 22 | 18.0704 | 1.94 | 1.95030 | 29.37 |
| 23 | 29.0384 | (d23) |  |  |
| 24 | 54.0053 | 4.50 | 1.68893 | 31.07 |
| 25 | −27.0985 | 3.00 | 1.74047 | 45.12 |
| 26 | −54.1321 | 2.74 |  |  |
| 27 | −28.5027 | 4.00 | 1.48749 | 70.40 |
| 28 | −15.5068 | 2.00 | 1.80100 | 34.96 |
| 29 | −43.4369 | BF |  |  |

[Variable Distances]

|  | W | M | T |
|---|---|---|---|
| d5 | 3.60 | 42.02 | 54.52 |
| d10 | 40.01 | 23.72 | 2.40 |
| d20 | 12.42 | 12.75 | 14.02 |
| d23 | 6.36 | 5.42 | 3.84 |
| BF | 41.36 | 48.41 | 70.45 |

[Lens Group Data]

| Group | I | focal length |
|---|---|---|
| 1 | 1 | 120.11 |
| 2 | 6 | −28.50 |
| 3 | 11 | 35.50 |
| 4 | 21 | −54.45 |
| 5 | 24 | 134.29 |

[Values for Conditional Expressions]

(1) Lf/Lr = 0.3210
(2) fr/fvr = −2.466
(3) N3n = 1.90366
(4) ν3n = 31.27
(5) Rs/RL = 0.622
(6) Np = 1.9503
(7) |RNs/fvr| = 0.332
(8) (RNs + RNL)/(RNL − RNs) = 4.295
(9) νn − νp = 23.30
(10) RNs/RNL = 0.622

Figure 10A:
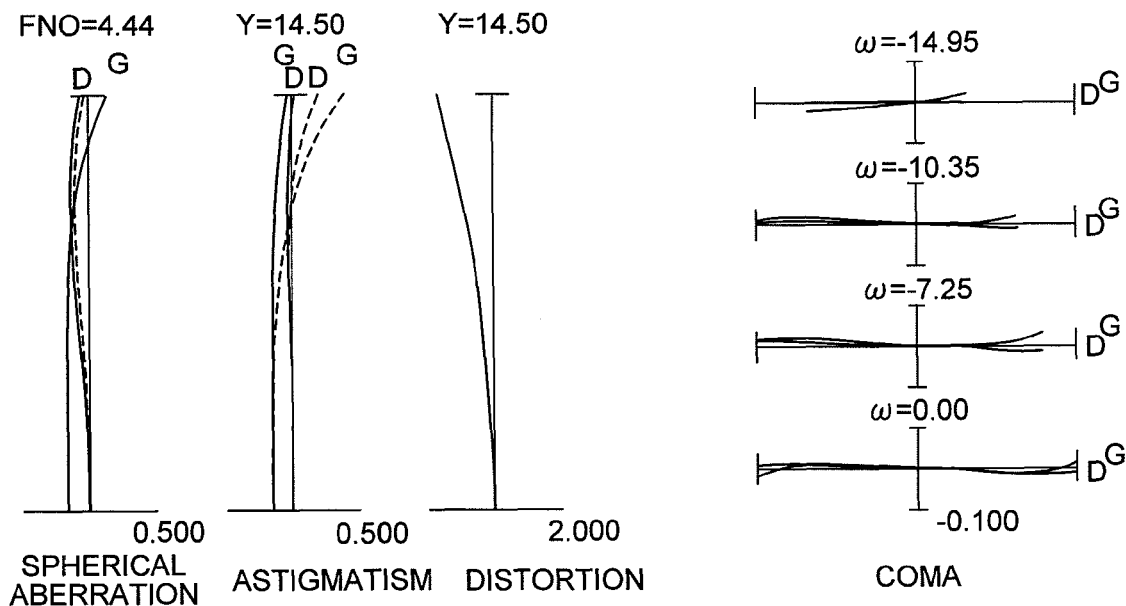
Figure 10B:
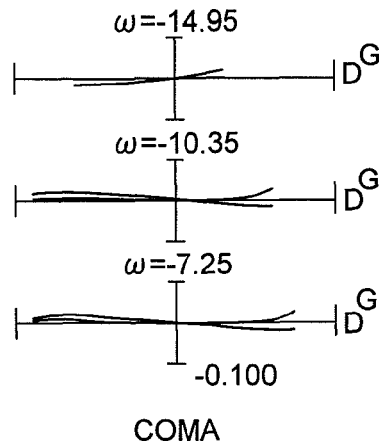
Figure 11:
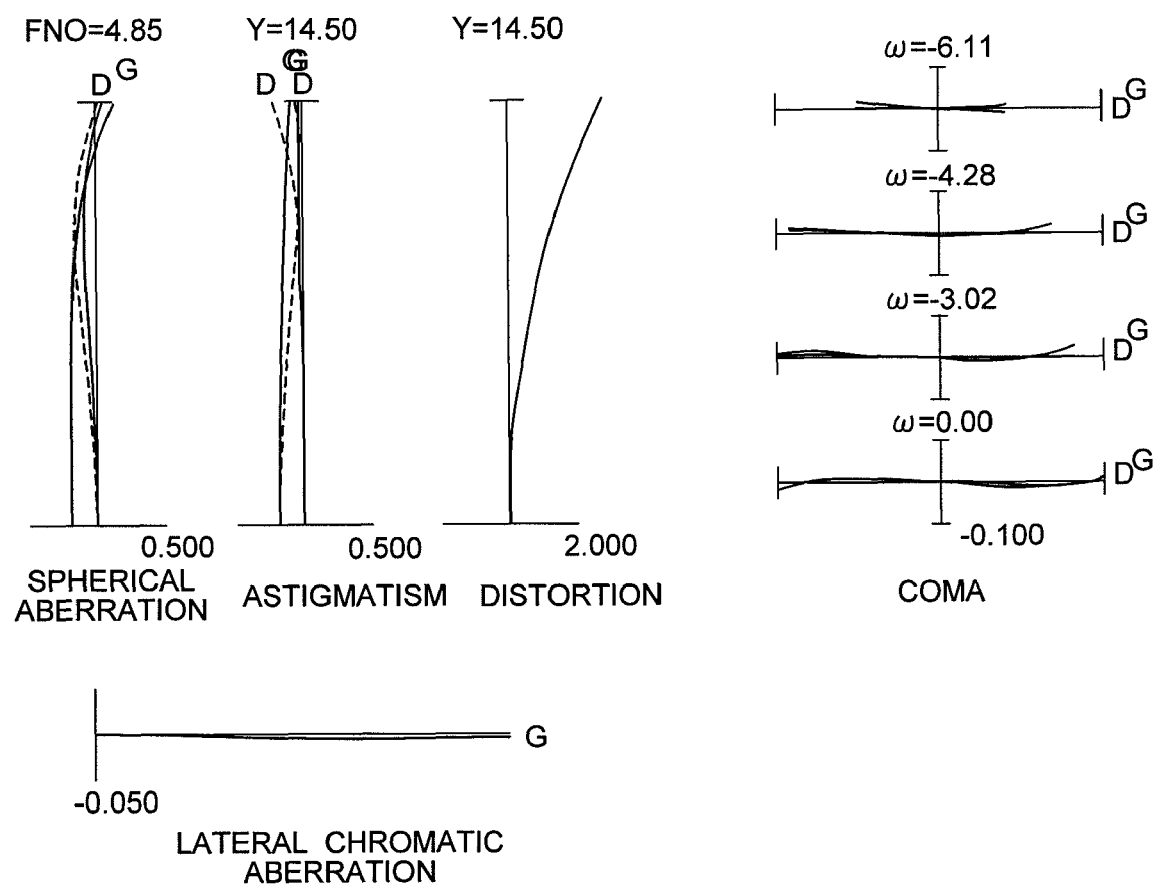
FIG. 11 is graphs showing various aberrations of the zoom optical system according to Example 3 in an intermediate focal length state focusing on infinity.
Figure 12A:
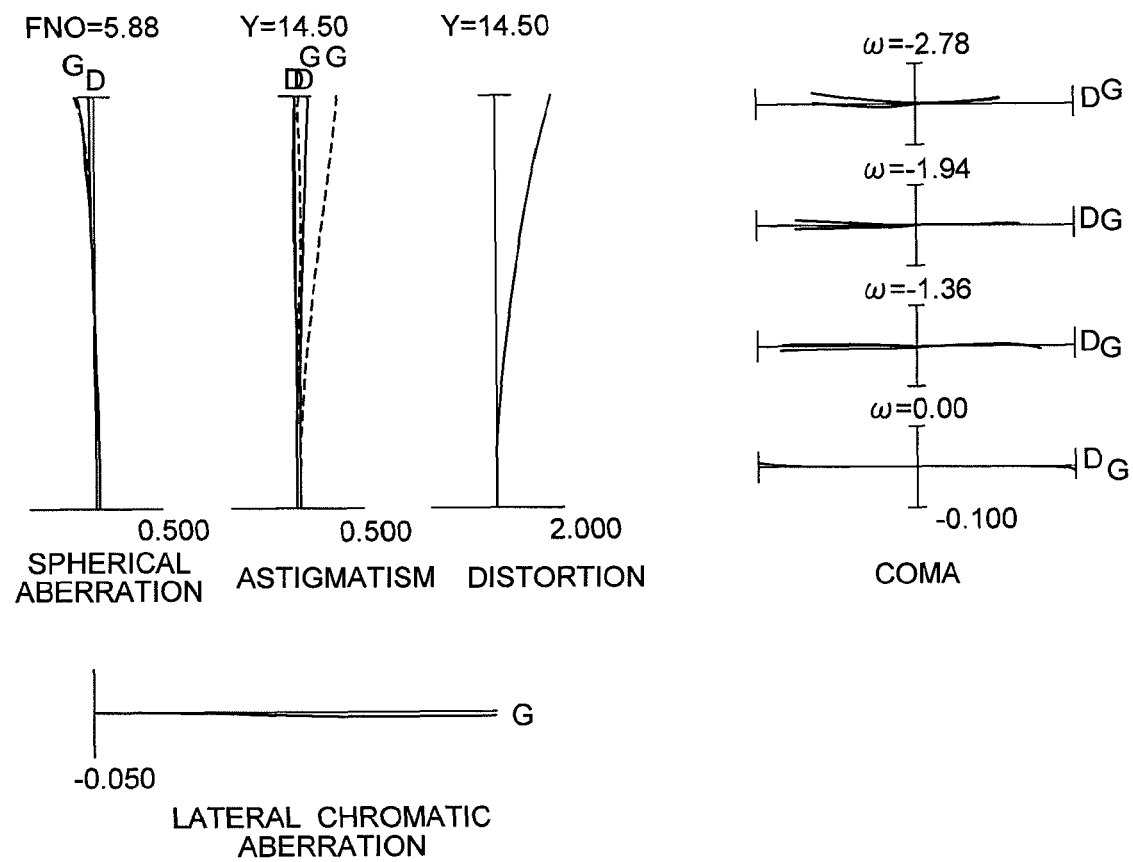
Figure 12B:
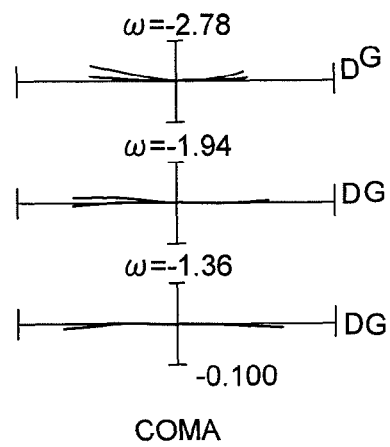

FIGS. 10A, and 10B are graphs showing various aberrations of the zoom optical system according to Example 3 of the present application in a wide-angle end state focusing on infinity, in which FIG. 10A shows various aberrations without carrying out vibration reduction, and FIG. 10B shows coma upon carrying out vibration reduction with respect to a rotational camera shake of 0.70 degrees. FIG. 11 is graphs showing various aberrations of the zoom optical system according to Example 3 of the present application in an intermediate focal length state focusing on infinity. FIGS. 12A, and 12B are graphs showing various aberrations of the zoom optical system according to Example 3 of the present application in a telephoto end state focusing on infinity, in which FIG. 12A shows various aberrations without carrying out vibration reduction, and FIG. 12B shows coma upon carrying out vibration reduction with respect to a rotational camera shake of 0.30 degrees.

As is apparent from the respective graphs, the zoom optical system according to Example 3 of the present application shows superb optical performance as a result of good corrections to various aberrations from the wide-angle end state through the telephoto end state even upon carrying out vibration reduction.

Example 4

Figure 13:
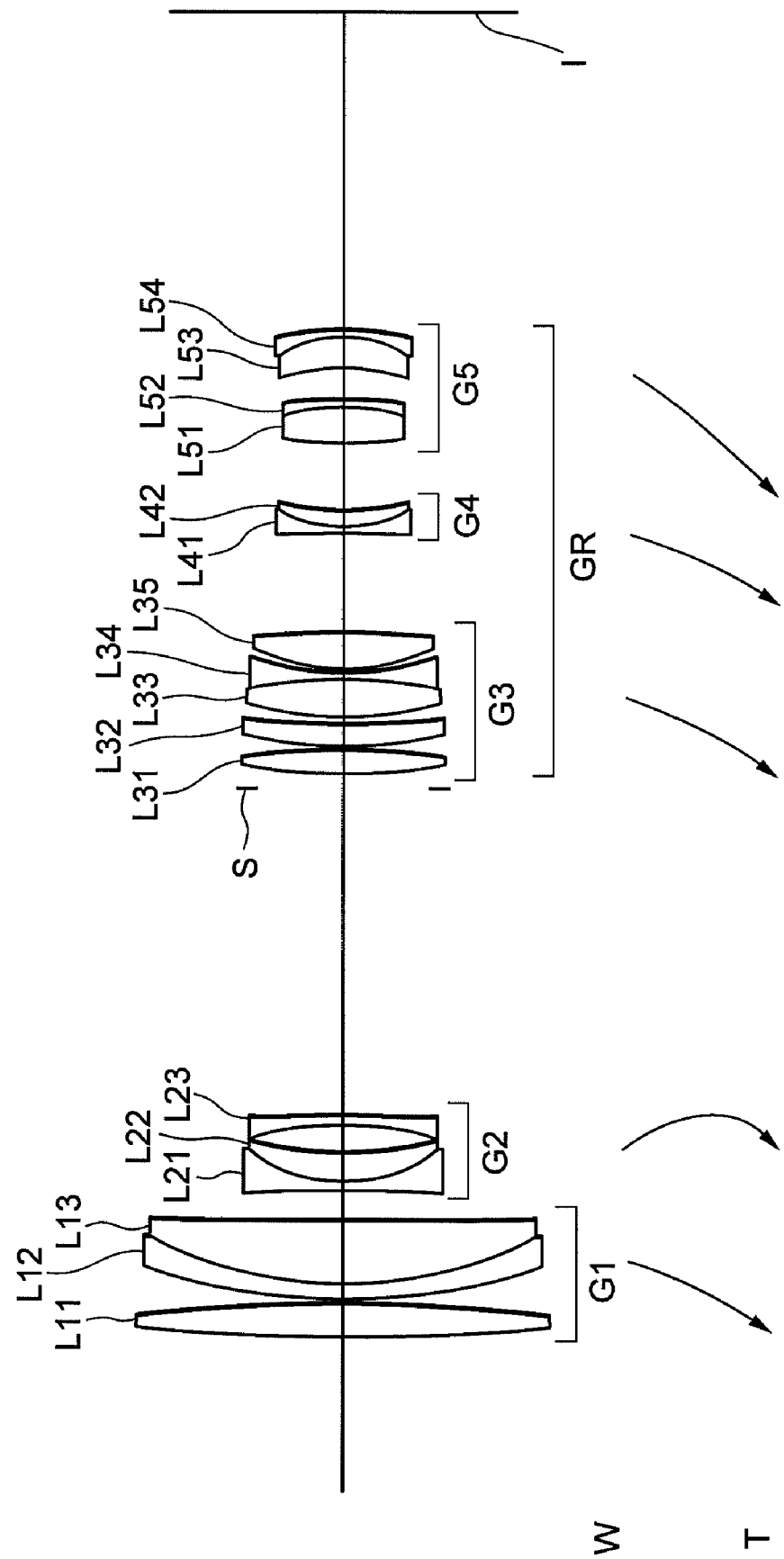
FIG. 13 is a sectional view showing a lens configuration of a zoom optical system according to Example 4 of the present application in a wide-angle end state.

FIG. 13 is a sectional view showing a lens configuration of a zoom optical system in a wide-angle end state according to Example 4 of the present application.

The zoom optical system according to Example 4 of the present application is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having negative refractive power, and a fifth lens group G5 having positive refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a cemented negative lens constructed by a double concave negative lens L21 cemented with a positive meniscus lens L22 having a convex surface facing the object side, and a double concave negative lens L23.

The third lens group G3 is composed of, in order from the object side, a double convex positive lens L31, a positive meniscus lens L32 having a convex surface facing the object side, a cemented negative lens constructed by a double convex positive lens L33 cemented with a double concave negative lens L34, and a double convex positive lens L35.

The fourth lens group G4 is composed of a cemented negative lens constructed by, in order from the object side, a negative meniscus lens L41 having a convex surface facing the object side cemented with a positive meniscus lens L42 having a convex surface facing the object side.

The fifth lens group G5 is composed of, in order from the object side, a cemented positive lens constructed by a double convex positive lens L51 cemented with a negative meniscus lens L52 having a concave surface facing the object side, and a cemented negative lens constructed by a positive meniscus lens L53 having a concave surface facing the object side cemented with a negative meniscus lens L54 having a concave surface facing the object side.

The aperture stop S is disposed to the object side of the third lens group G3 in the vicinity thereof, and moved together with the third lens group G3 upon zooming from the wide-angle end state to a telephoto end state.

In the zoom optical system according to Example 4 of the present application, respective lens groups G1 through G5 are moved along an optical axis such that upon zooming from the wide-angle end state to the telephoto end state, a distance between the first lens group G1 and the second lend group G2 increases, a distance between the second lens group G2 and the third lens group G3 decreases, a distance between the third lens group G3 and the fourth lens group G4 is constant, and a distance between the fourth lens group G4 and the fifth lens group G5 decreases. In this instance, distances between lenses L31 through L35 composing the third lens group G3 are constant.

In the zoom optical system according to Example 4, the whole of the fourth lens group G4 is decentered as a vibration reduction lens group in a direction including a component perpendicular to the optical axis, thereby carrying out vibration reduction.

Moreover, in the zoom optical system according to Example 4, the whole of the first lens group G1 is moved toward the object side, thereby carrying out focusing from infinity to a close object.

Various values associated with the zoom optical system according to Example 4 of the present application are listed below in Table 4.

Here, in the zoom optical system according to Example 4 of the present application, in the wide-angle end state, the vibration reduction coefficient K is 1.15 and the focal length is 56.14 mm, so that in order to correct rotational camera shake of 0.70 degrees, the moving amount of the fourth lens group G4 becomes 0.60 mm. In the telephoto end state, the vibration reduction coefficient K is 1.76 and the focal length is 294.25 mm, so that in order to correct rotational camera shake of 0.30 degrees, the moving amount of the fourth lens group G4 becomes 0.88 mm.

TABLE 4

[Specifications]
zoom ratio = 5.241

|  | W | M | T |
|---|---|---|---|
| f = | 56.14 | 132.11 | 294.25 |
| FNO = | 4.60 | 4.88 | 5.88 |
| ω = | 14.71 | 6.11 | 2.78 |
| Y = | 14.50 | 14.50 | 14.50 |
| TL = | 167.36 | 194.48 | 207.80 |
| BF = | 39.81 | 46.93 | 70.87 |

[Lens Data]

| i | r | d | nd | vd |
|---|---|---|---|---|
| 1 | 258.8905 | 4.40 | 1.51680 | 64.11 |
| 2 | −258.8904 | 0.20 |  |  |
| 3 | 72.4673 | 2.00 | 1.78472 | 25.68 |
| 4 | 50.2501 | 8.20 | 1.49700 | 81.54 |
| 5 | 562.3991 | (d5) |  |  |
| 6 | −509.8829 | 1.20 | 1.74100 | 52.67 |
| 7 | 19.4327 | 3.82 | 1.84666 | 23.78 |
| 8 | 42.4448 | 3.40 |  |  |
| 9 | −46.2794 | 1.20 | 1.80400 | 46.57 |
| 10 | 25460.0370 | (d10) |  |  |
| 11 | ∞ | 1.80 | Aperture Stop S |  |

TABLE 4-continued

| | | | | |
|---|---|---|---|---|
| 12 | 66.5953 | 3.10 | 1.69680 | 55.52 |
| 13 | −104.3847 | 0.20 | | |
| 14 | 49.3992 | 3.10 | 1.69680 | 55.52 |
| 15 | 113.9473 | 0.70 | | |
| 16 | 41.9307 | 4.80 | 1.49700 | 81.54 |
| 17 | −61.1741 | 1.20 | 1.90366 | 31.27 |
| 18 | 38.7947 | 0.20 | | |
| 19 | 26.2140 | 4.60 | 1.48749 | 70.40 |
| 20 | −284.9611 | (d20) | | |
| 21 | 454.0768 | 1.00 | 1.74100 | 52.67 |
| 22 | 16.3073 | 2.13 | 1.90366 | 31.27 |
| 23 | 28.3236 | (d23) | | |
| 24 | 47.4889 | 4.50 | 1.68893 | 31.07 |
| 25 | −33.4264 | 1.00 | 1.74397 | 44.85 |
| 26 | −75.4536 | 4.03 | | |
| 27 | −26.4241 | 4.00 | 1.48749 | 70.40 |
| 28 | −15.7370 | 1.00 | 1.80100 | 34.96 |
| 29 | −37.0102 | BF | | |

[Variable Distances]

| | W | M | T |
|---|---|---|---|
| d5 | 3.60 | 41.44 | 53.94 |
| d10 | 41.36 | 24.57 | 2.40 |
| d20 | 12.28 | 12.28 | 12.28 |
| d23 | 8.52 | 7.48 | 6.53 |
| BF | 39.81 | 46.93 | 70.87 |

[Lens Group Data]

| Group | I | focal length |
|---|---|---|
| 1 | 1 | 120.11 |
| 2 | 6 | −29.39 |
| 3 | 11 | 35.53 |
| 4 | 21 | −50.34 |
| 5 | 24 | 125.40 |

[Values for Conditional Expressions]

(1) Lf/Lr = 0.3176
(2) fr/fvr = −2.491
(3) N3n = 1.90366
(4) ν3n = 31.27
(5) Rs/RL = 0.576
(6) Np = 1.90366
(7) |RNs/fvr| = 0.324
(8) (RNs + RNL)/(RNL − RNs) = 3.714
(9) νn − νp = 21.40
(10) RNs/RNL = 0.576

Figure 15:
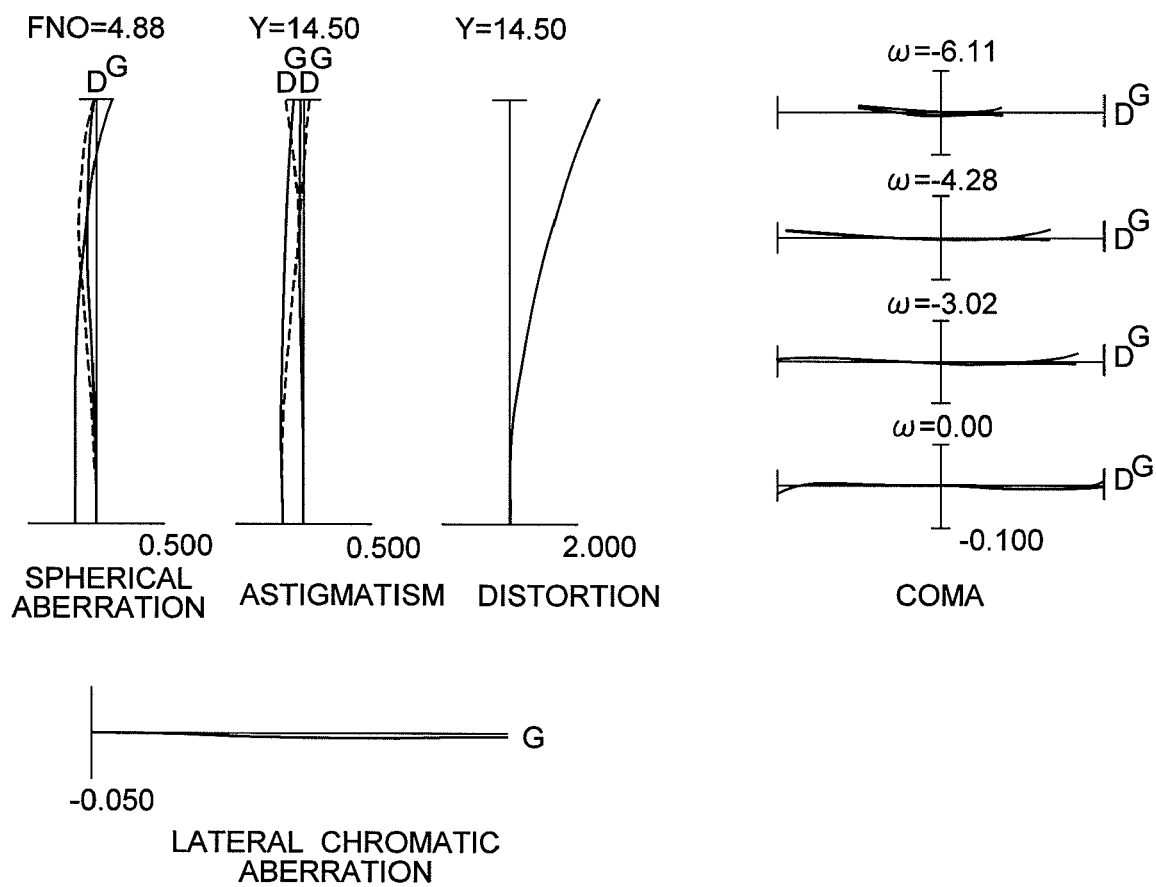
FIG. 15 is graphs showing various aberrations of the zoom optical system according to Example 4 in an intermediate focal length state focusing on infinity.
Figure 16A:
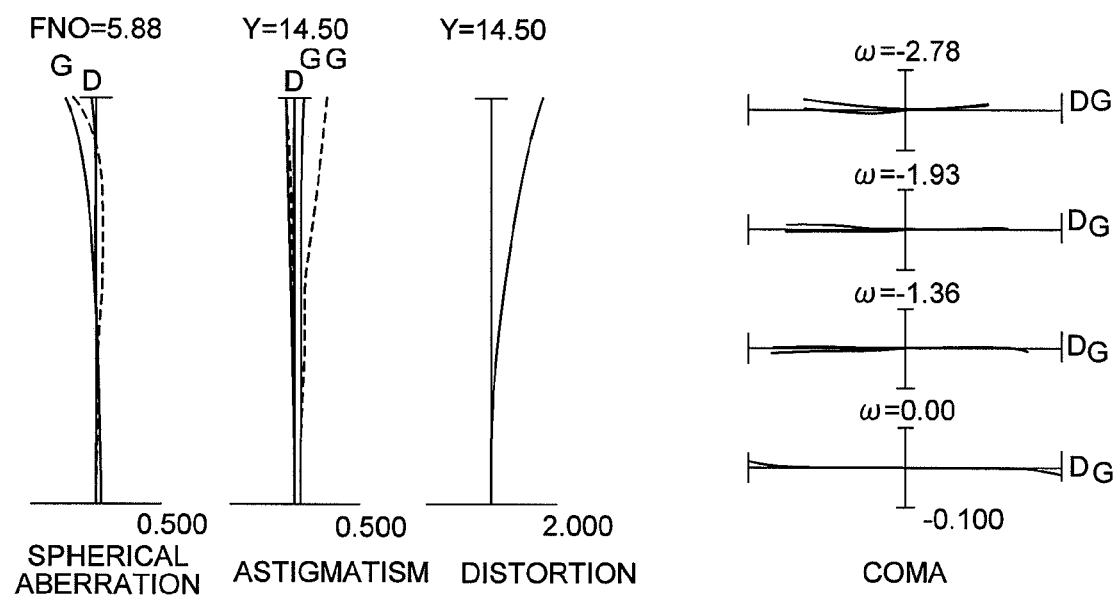
Figure 16B:
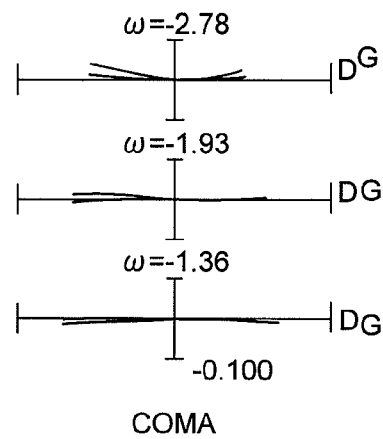

FIGS. 14A, and 14B are graphs showing various aberrations of the zoom optical system according to Example 4 of the present application in a wide-angle end state focusing on infinity, in which FIG. 14A shows various aberrations without carrying out vibration reduction, and FIG. 14B shows coma upon carrying out vibration reduction with respect to a rotational camera shake of 0.70 degrees. FIG. 15 is graphs showing various aberrations of the zoom optical system according to Example 4 of the present application in an intermediate focal length state focusing on infinity. FIGS. 16A, and 16B are graphs showing various aberrations of the zoom optical system according to Example 4 of the present application in a telephoto end state focusing on infinity, in which FIG. 16A shows various aberrations without carrying out vibration reduction, and FIG. 16B shows coma upon carrying out vibration reduction with respect to a rotational camera shake of 0.30 degrees.

As is apparent from the respective graphs, the zoom optical system according to Example 4 of the present application shows superb optical performance as a result of good corrections to various aberrations from the wide-angle end state through the telephoto end state even upon carrying out vibration reduction.

Example 5

FIG. 17 is a sectional view showing a lens configuration of a zoom optical system in a wide-angle end state according to Example 5 of the present application.

The zoom optical system according to Example 5 of the present application is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having positive refractive power, and a fifth lens group G5 having negative refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a double concave negative lens L21, a positive meniscus lens L22 having a convex surface facing the object side, a cemented positive lens constructed by a positive meniscus lens L23 having a concave surface facing the object side cemented with a negative meniscus lens L24 having a concave surface facing the object side, and a negative meniscus lens L25 having a concave surface facing the object side.

The third lens group G3 is composed of, in order from the object side, a double convex positive lens L31, a positive meniscus lens L32 having a convex surface facing the object side, a cemented negative lens constructed by a double convex positive lens L33 cemented with a double concave negative lens L34, an aperture stop S, and a positive meniscus lens L35 having a concave surface facing the object side.

The fourth lens group G4 is composed of, in order from the object side, a cemented positive lens constructed by a double concave negative lens L41 cemented with a double convex positive lens L42, and a double convex positive lens L43.

The fifth lens group G5 is composed of, in order from the object side, a negative meniscus lens L51 having a convex surface facing the object side, a double convex positive lens L52, and a double concave negative lens L53.

In the zoom optical system according to Example 5 of the present application, respective lens groups G1 through G5 are moved along an optical axis such that upon zooming from the wide-angle end state to a telephoto end state, a distance between the first lens group G1 and the second lend group G2 increases, a distance between the second lens group G2 and the third lens group G3 decreases, a distance between the third lens group G3 and the fourth lens group G4 decreases, and a distance between the fourth lens group G4 and the fifth lens group G5 decreases. In this instance, distances between lenses L31 through L35 composing the third lens group G3 are constant.

In the zoom optical system according to Example 5 of the present application, a sub-lens group having negative refractive power composed of the cemented positive lens constructed by the positive meniscus lens L23 cemented with the negative meniscus lens L24, and the negative meniscus lens L25 in the second lens group G2 is decentered as a vibration reduction lens group in a direction including a component perpendicular to the optical axis, thereby carrying out vibration reduction.

In the zoom optical system according to Example 5 of the present application, the whole of the first lens group G1 toward object side or the whole of the fifth lens group G5 is moved toward the image side, thereby carrying out focusing from infinity to a close object.

Various values associated with the zoom optical system according to Example 5 of the present application are listed below in Table 5.

Here, in the zoom optical system according to Example 5 of the present application, in the wide-angle end state, the vibration reduction coefficient K is 0.71 and the focal length is 56.50 mm, so that in order to correct rotational camera shake of 0.70 degrees, the moving amount of the vibration reduction lens group becomes 0.97 mm. In the telephoto end state, the vibration reduction coefficient K is 1.96 and the focal length is 293.99 mm, so that in order to correct rotational camera shake of 0.30 degrees, the moving amount of the vibration reduction lens group becomes 0.79 mm.

TABLE 5

[Specifications]
zoom ratio = 5.203

|   | W | M | T |
|---|---|---|---|
| f = | 56.50 | 132.00 | 293.99 |
| FNO = | 4.50 | 5.13 | 5.88 |
| ω = | 14.67 | 6.15 | 2.79 |
| Y = | 14.50 | 14.50 | 14.50 |
| TL = | 182.58 | 226.76 | 237.37 |
| BF = | 42.00 | 62.12 | 90.03 |

[Lens Data]

| i | r | d | nd | νd |
|---|---|---|---|---|
| 1 | 164.0915 | 4.00 | 1.58913 | 61.13 |
| 2 | −638.6860 | 0.20 | | |
| 3 | 94.8774 | 1.60 | 1.80518 | 25.42 |
| 4 | 64.8456 | 5.63 | 1.49782 | 82.56 |
| 5 | 516.7029 | (d5) | | |
| 6 | −330.2957 | 1.20 | 1.74400 | 44.79 |
| 7 | 29.7015 | 2.86 | | |
| 8 | 31.7988 | 2.85 | 1.84666 | 23.78 |
| 9 | 61.3115 | 4.64 | | |
| 10 | −86.2506 | 2.69 | 1.95030 | 29.37 |
| 11 | −38.7665 | 1.20 | 1.62041 | 60.32 |
| 12 | −204.5690 | 1.43 | | |
| 13 | −54.3223 | 1.20 | 1.74400 | 44.79 |
| 14 | −1429.4530 | (d14) | | |
| 15 | 91.9069 | 2.94 | 1.69680 | 55.53 |
| 16 | −192.3532 | 0.20 | | |
| 17 | 64.9048 | 2.64 | 1.58913 | 61.16 |
| 18 | 385.2001 | 0.20 | | |
| 19 | 41.6613 | 5.40 | 1.49782 | 82.56 |
| 20 | −54.4396 | 1.20 | 1.80440 | 39.58 |
| 21 | 71.3743 | 1.42 | | |
| 22 | ∞ | 10.44 | Aperture Stop S | |
| 23 | −167.2881 | 1.59 | 1.58913 | 61.16 |
| 24 | −113.9496 | (d24) | | |
| 25 | −1216.0789 | 1.20 | 1.74400 | 44.79 |
| 26 | 31.1523 | 5.72 | 1.50980 | 68.08 |
| 27 | −58.8789 | 0.20 | | |
| 28 | 84.5100 | 2.98 | 1.62041 | 60.32 |
| 29 | −131.5135 | (d29) | | |
| 30 | 784.2672 | 1.20 | 1.80217 | 43.78 |
| 31 | 34.0761 | 1.90 | | |
| 32 | 33.1208 | 4.61 | 1.62004 | 36.26 |
| 33 | −33.2986 | 2.94 | | |
| 34 | −28.7135 | 1.20 | 1.77250 | 49.60 |
| 35 | 118.6789 | BF | | |

TABLE 5-continued

[Variable Distances]

|   | W | M | T |
|---|---|---|---|
| d5 | 2.97 | 47.15 | 57.61 |
| d14 | 43.61 | 31.81 | 1.10 |
| d24 | 2.90 | 1.17 | 1.00 |
| d29 | 13.60 | 7.00 | 10.12 |
| BF | 42.00 | 62.12 | 90.03 |

[Lens Group Data]

| Group | I | focal length |
|---|---|---|
| 1 | 1 | 135.96 |
| 2 | 6 | −35.34 |
| 3 | 15 | 59.05 |
| 4 | 25 | 76.01 |
| 5 | 30 | −59.00 | fvr = −78.89

[Values for Conditional Expressions]

(1) Lf/Lr = 0.4037
(5) Rs/RL = 0.449
(6) Np = 1.95030
(7) |RNs/fvr| = 0.491
(8) (RNs + RNL)/(RNL − RNs) = 2.633
(9) νn − νp = 30.95
(10) RNs/RNL = 0.449

Figure 19:
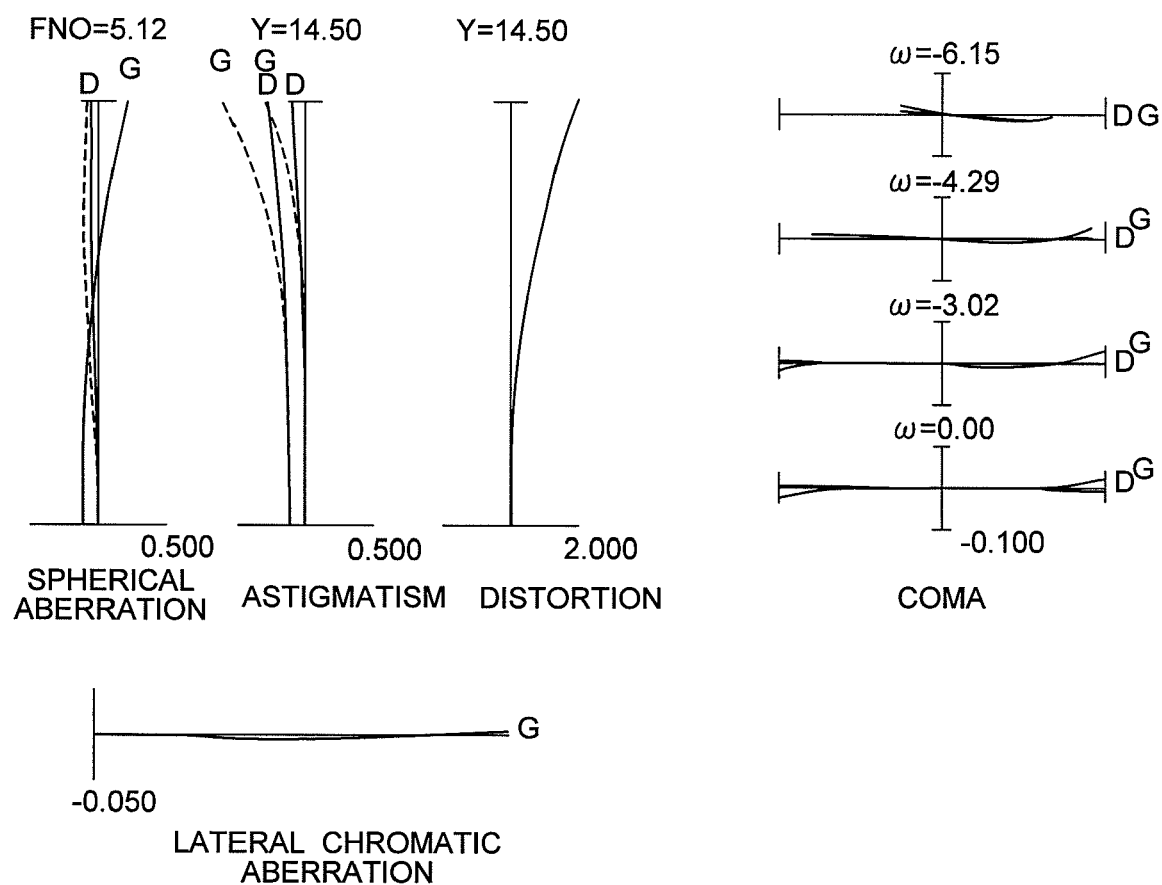
FIG. 19 is graphs showing various aberrations of the zoom optical system according to Example 5 in an intermediate focal length state focusing on infinity.
Figure 20A:
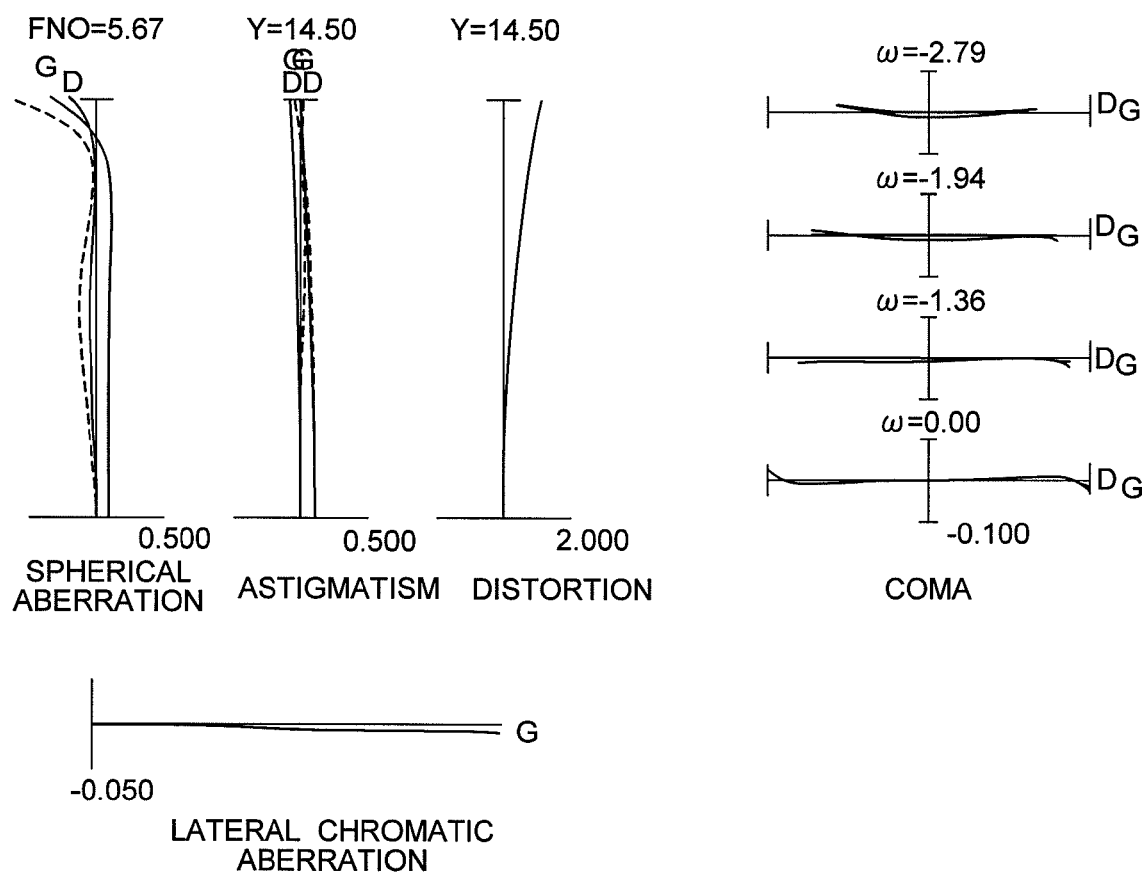
Figure 20B:
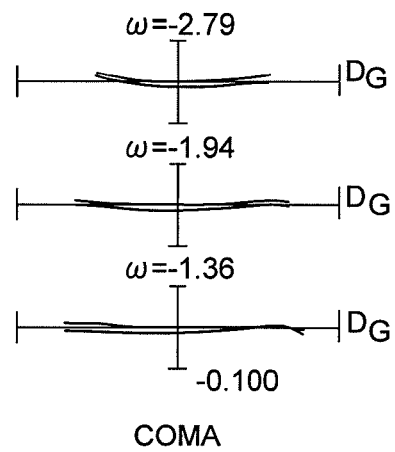

FIGS. 18A, and 18B are graphs showing various aberrations of the zoom optical system according to Example 5 of the present application in a wide-angle end state focusing on infinity, in which FIG. 18A shows various aberrations without carrying out vibration reduction, and FIG. 18B shows coma upon carrying out vibration reduction with respect to a rotational camera shake of 0.70 degrees. FIG. 19 is graphs showing various aberrations of the zoom optical system according to Example 5 of the present application in an intermediate focal length state focusing on infinity. FIGS. 20A, and 20B are graphs showing various aberrations of the zoom optical system according to Example 5 of the present application in a telephoto end state focusing on infinity, in which FIG. 20A shows various aberrations without carrying out vibration reduction, and FIG. 20B shows coma upon carrying out vibration reduction with respect to a rotational camera shake of 0.30 degrees.

As is apparent from the respective graphs, the zoom optical system according to Example 5 of the present application shows superb optical performance as a result of good corrections to various aberrations from the wide-angle end state through the telephoto end state even upon carrying out vibration reduction.

Example 6

FIG. 21 is a sectional view showing a lens configuration of a zoom optical system according to Example 6 of the present application in a wide-angle end state.

The zoom optical system according to Example 6 of the present application is composed of, in order from an object side, a first lens group G1 having positive refractive power, a second lens group G2 having negative refractive power, and a rear lens group GR having positive refractive power.

The rear lens group GR is composed of, in order from the object side, a third lens group G3 having positive refractive power, a fourth lens group G4 having negative refractive power, a fifth lens group G5 having positive refractive power, and a sixth lens group G6 having negative refractive power.

The first lens group G1 is composed of, in order from the object side, a double convex positive lens L11, and a cemented positive lens constructed by a negative meniscus lens L12 having a convex surface facing the object side cemented with a double convex positive lens L13.

The second lens group G2 is composed of, in order from the object side, a cemented negative lens constructed by a double concave negative lens L21 cemented with a positive meniscus lens L22 having a convex surface facing the object side, and a double concave negative lens L23.

The third lens group G3 is composed of, in order from the object side, a positive meniscus lens L31 having a concave surface facing the object side, an aperture stop S, a cemented positive lens constructed by a double convex positive lens L32 cemented with a negative meniscus lens L33 having a concave surface facing the object side, a positive meniscus lens L34 having a convex surface facing the object side, a cemented negative lens constructed by a double convex positive lens L35 cemented with a double concave negative lens L36, and a double convex positive lens L37.

The fourth lens group G4 is composed of, in order from the object side, a double convex positive lens L41, a cemented negative lens constructed by a double concave negative lens L42 cemented with a positive meniscus lens L43 having a convex surface facing the object side, and a positive meniscus lens L44 having a convex surface facing the object side.

The fifth lens group G5 is composed only of a double convex positive lens L51.

The sixth lens group G6 is composed only of a negative meniscus lens L61 having a concave surface facing the object side.

In the zoom optical system according to Example 6 of the present application, upon zooming from the wide-angle end state to a telephoto end state, respective lens groups G1 through G6 are moved along the optical axis such that a distance between the first lens group G1 and the second lens group G2 increases, a distance between the second lens group G2 and the third lens group G3 decreases, a distance between the third lens group G3 and the fourth lens group G4 increases, a distance between the fourth lens group G4 and the fifth lens group G5 decreases, and a distance between the fifth lens group G5 and the sixth lens group G6 at first increases and then decreases. In this instance, distances between lenses L31 through L37 composing the third lens group G3 are constant.

In the zoom optical system according to Example 6 of the present application, a sub-lens group having negative refractive power composed of the positive lens L41 and the cemented negative lens constructed by the negative lens L42 cemented with the positive meniscus lens L43 in the fourth lens group G4 is decentered as a vibration reduction lens group in a direction including a component perpendicular to the optical axis, thereby carrying out vibration reduction.

In the zoom optical system according to Example 6 of the present application, the whole of the first lens group G1 is moved toward the object side, thereby carrying out focusing from infinity to a close object.

Various values associated with the zoom optical system according to Example 6 of the present application are listed below in Table 6.

Here, in the zoom optical system according to Example 6 of the present application, in the wide-angle end state, the vibration reduction coefficient K is 0.95 and the focal length is 56.09 mm, so that in order to correct rotational camera shake of 0.70 degrees, the moving amount of the vibration reduction lens group becomes 0.72 mm. In the telephoto end state, the vibration reduction coefficient K is 1.40 and the focal length is 293.89 mm, so that in order to correct rotational camera shake of 0.30 degrees, the moving amount of the vibration reduction lens group becomes 1.10 mm.

TABLE 6

[Specifications]
zoom ratio = 5.240

|  | W | M | T |
|---|---|---|---|
| f = | 56.09 | 132.00 | 293.89 |
| FNO = | 4.56 | 5.05 | 5.88 |
| ω = | 14.9 | 6.17 | 2.79 |
| Y = | 14.50 | 14.50 | 14.50 |
| TL = | 171.32 | 198.61 | 214.62 |
| BF = | 40.57 | 49.42 | 72.61 |

[Lens Data]

| i | r | d | nd | νd |
|---|---|---|---|---|
| 1 | 146.7305 | 4.40 | 1.51680 | 64.1 |
| 2 | −1290.5280 | 0.20 | | |
| 3 | 85.1613 | 2.00 | 1.78472 | 25.68 |
| 4 | 56.8668 | 8.20 | 1.49700 | 81.54 |
| 5 | −2366.3385 | (d5) | | |
| 6 | −189.3057 | 1.20 | 1.74100 | 52.67 |
| 7 | 20.6513 | 4.02 | 1.84666 | 23.78 |
| 8 | 52.5648 | 3.40 | | |
| 9 | −55.8119 | 1.20 | 1.80400 | 46.57 |
| 10 | 222.3881 | (d10) | | |
| 11 | −104.2306 | 2.08 | 1.54339 | 65.18 |
| 12 | −64.0241 | 0.20 | | |
| 13 | ∞ | 0.20 | Aperture Stop S | |
| 14 | 44.2255 | 3.63 | 1.67260 | 51.95 |
| 15 | −369.7253 | 1.00 | 1.76182 | 26.56 |
| 16 | −517.6143 | 0.20 | | |
| 17 | 67.4152 | 2.53 | 1.48749 | 70.41 |
| 18 | 368.1426 | 0.20 | | |
| 19 | 41.1878 | 4.35 | 1.49700 | 81.54 |
| 20 | −65.7583 | 1.20 | 1.90366 | 31.27 |
| 21 | 40.4588 | 0.20 | | |
| 22 | 34.4006 | 3.62 | 1.48749 | 70.41 |
| 23 | −306.2846 | (d23) | | |
| 24 | 169.9117 | 2.87 | 1.48749 | 70.41 |
| 25 | −49.3144 | 0.20 | | |
| 26 | −58.5646 | 1.00 | 1.74100 | 52.67 |
| 27 | 23.8176 | 2.53 | 1.95030 | 29.37 |
| 28 | 41.3244 | 7.88 | | |
| 29 | 27.0000 | 5.49 | 1.79500 | 45.29 |
| 30 | 24.5831 | (d30) | | |
| 31 | 50.7215 | 3.42 | 1.67687 | 31.64 |
| 32 | −78.4370 | (d32) | | |
| 33 | −23.3861 | 1.00 | 1.80100 | 34.96 |
| 34 | −48.3317 | BF | | |

[Variable Distances]

|  | W | M | T |
|---|---|---|---|
| d5 | 3.83 | 40.60 | 53.09 |
| d10 | 40.36 | 23.25 | 2.40 |
| d23 | 4.20 | 4.21 | 7.80 |
| d30 | 7.03 | 5.69 | 4.85 |
| d32 | 6.91 | 7.02 | 5.45 |
| BF | 40.57 | 49.42 | 72.61 |

[Lens Group Data]

| Group | I | focal length |
|---|---|---|
| 1 | 1 | 120.53 |
| 2 | 6 | −29.50 |
| 3 | 11 | 38.18 |
| 4 | 24 | −66.62 |
| 5 | 31 | 46.00 |
| 6 | 33 | −57.59 |

TABLE 6-continued fvr = −73.11

[Values for Conditional Expressions]

(1) Lf/Lr = 0.3134
(2) fr/fvr = −2.234
(3) N3n = 1.90366
(4) ν3n = 31.27
(5) Rs/RL = 0.576
(6) Np = 1.95030
(7) |RNs/fvr| = 0.326
(8) (RNs + RNL)/(RNL − RNs) = 3.721
(9) νn − νp = 23.30
(10) RNs/RNL = 0.576

Figure 23:
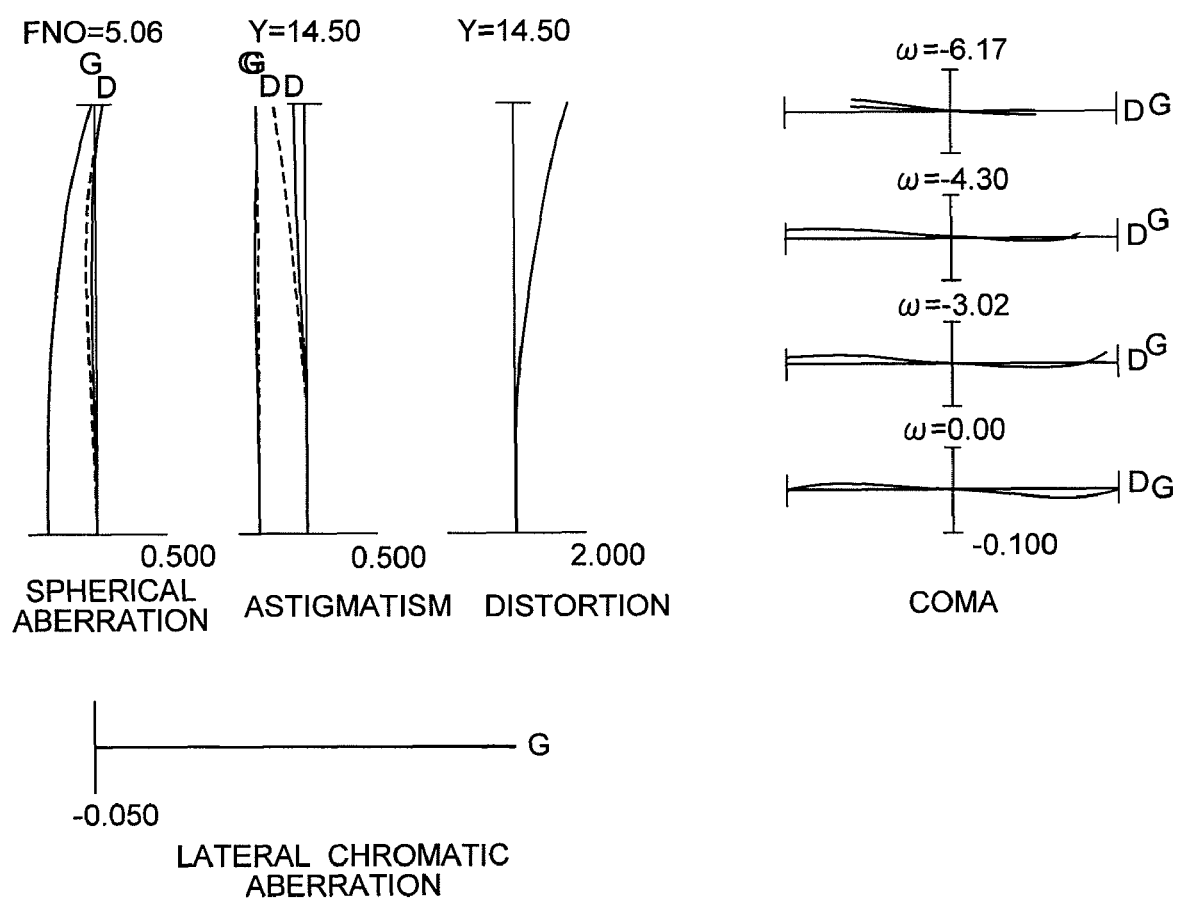
FIG. 23 is graphs showing various aberrations of the zoom optical system according to Example 6 in an intermediate focal length state focusing on infinity.

FIGS. 22A, and 22B are graphs showing various aberrations of the zoom optical system according to Example 6 of the present application in a wide-angle end state focusing on infinity, in which FIG. 22A shows various aberrations without carrying out vibration reduction, and FIG. 22B shows coma upon carrying out vibration reduction with respect to a rotational camera shake of 0.70 degrees. FIG. 23 is graphs showing various aberrations of the zoom optical system according to Example 6 of the present application in an intermediate focal length state focusing on infinity. FIGS. 24A, and 24B are graphs showing various aberrations of the zoom optical system according to Example 6 of the present application in a telephoto end state focusing on infinity, in which FIG. 24A shows various aberrations without carrying out vibration reduction, and FIG. 24B shows coma upon carrying out vibration reduction with respect to a rotational camera shake of 0.30 degrees.

As is apparent from the respective graphs, the zoom optical system according to Example 6 of the present application shows superb optical performance as a result of good corrections to various aberrations from the wide-angle end state through the telephoto end state even upon carrying out vibration reduction.

Example 7

FIG. 25 is a sectional view showing a lens configuration of a zoom optical system in a wide-angle end state according to Example 7 of the present application.

The zoom optical system according to Example 7 is composed of, in order from an object side, a first lens group G1 having positive refractive power, a second lens group G2 having negative refractive power, an aperture stop S, and a rear lens group GR having positive refractive power.

The rear lens group GR is composed of, in order from the object side, a third lens group G3 having positive refractive power, a fourth lens group G4 having negative refractive power, and a fifth lens group G5 having positive refractive power.

The first lens group G1 is composed of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 is composed of, in order from the object side, a cemented negative lens constructed by a double concave negative lens L21 cemented with a positive meniscus lens L22 having a convex surface facing the object side, and a negative meniscus lens L23 having a concave surface facing the object side.

The third lens group G3 is composed of, in order from the object side, a double convex positive lens L31, a cemented negative lens constructed by a double convex positive lens L32 cemented with a double concave negative lens L33, and a double convex positive lens L34.

The fourth lens group G4 is composed of a cemented negative lens constructed by, in order from the object side, a negative meniscus lens L41 having a convex surface facing the object side cemented with a positive meniscus lens L42 having a convex surface facing the object side.

The fifth lens group G5 is composed of, in order from the object side, a cemented positive lens constructed by a double convex positive lens L51 cemented with a negative meniscus lens L52 having a concave surface facing the object side, and a cemented negative lens constructed by a positive meniscus lens L53 having a concave surface facing the object side cemented with a negative meniscus lens L54 having a concave surface facing the object side.

The aperture stop S is disposed to the object side of the third lens group G3 in the vicinity thereof, and moved together with the third lens group G3 upon zooming from the wide-angle end state to a telephoto end state.

In the zoom optical system according to Example 7, upon zooming from the wide-angle end state to the telephoto end state, each lens group G1 through G5 move along an optical axis such that the distance between the first lens group G1 and the second lens group G2 increases, a distance between the second lens group G2 and the third lens group G3 decreases, a distance between the third lens group G3 and the fourth lens group G4 is constant, and a distance between the fourth lens group G4 and the fifth lens group G5 is constant.

In the zoom optical system according to Example 7, the whole of the fourth lens group G4 is decentered as a vibration reduction lens group in a direction including a component perpendicular to the optical axis, thereby carrying out vibration reduction.

Moreover, in the zoom optical system according to Example 7, the whole of the first lens group G1 is moved toward the object side, thereby carrying out focusing from infinity to a close object.

Various values associated with the zoom optical system according to Example 7 of the present application are listed below in Table 7.

Here, in the zoom optical system according to Example 7 of the present application, in the wide-angle end state, the vibration reduction coefficient K is 1.14 and the focal length is 55.89 mm, so that in order to correct rotational camera shake of 0.70 degrees, the moving amount of the fourth lens group G4 becomes 0.60 mm. In the telephoto end state, the vibration reduction coefficient K is 1.73 and the focal length is 294.00 mm, so that in order to correct rotational camera shake of 0.30 degrees, the moving amount of the fourth lens group G4 becomes 0.89 mm.

TABLE 7

[Specifications]
zoom ratio = 5.260

| | W | M | T |
| --- | --- | --- | --- |
| f = | 55.89 | 130.58 | 294.00 |
| FNO = | 4.12 | 4.52 | 5.88 |
| ω = | 14.83 | 6.14 | 2.77 |
| Y = | 14.50 | 14.50 | 14.50 |
| TL = | 165.22 | 193.73 | 207.62 |
| BF = | 43.87 | 48.93 | 72.66 |

TABLE 7-continued

[Lens Data]

| i | r | d | nd | vd |
|---|---|---|---|---|
| 1 | 309.2863 | 5.00 | 1.51680 | 64.19 |
| 2 | −230.6427 | 0.20 | | |
| 3 | 73.7181 | 2.00 | 1.80518 | 25.42 |
| 4 | 51.9573 | 8.10 | 1.49700 | 81.54 |
| 5 | 725.4831 | (d5) | | |
| 6 | −226.8215 | 1.20 | 1.74100 | 52.64 |
| 7 | 19.8012 | 3.94 | 1.84666 | 23.78 |
| 8 | 43.4322 | 3.67 | | |
| 9 | −39.2946 | 1.20 | 1.80400 | 46.57 |
| 10 | −174.1508 | (d10) | | |
| 11 | ∞ | 1.80 | Aperture Stop S | |
| 12 | 56.7621 | 3.88 | 1.80400 | 46.57 |
| 13 | −92.1472 | 0.90 | | |
| 14 | 37.7808 | 7.33 | 1.49700 | 81.54 |
| 15 | −37.9814 | 1.41 | 1.90366 | 31.27 |
| 16 | 37.9965 | 0.20 | | |
| 17 | 25.0724 | 4.70 | 1.60311 | 60.64 |
| 18 | −155.2762 | (d18) | | |
| 19 | 354.8716 | 1.00 | 1.77250 | 49.60 |
| 20 | 19.4822 | 2.13 | 2.00069 | 25.46 |
| 21 | 28.8252 | (d21) | | |
| 22 | 67.6926 | 4.50 | 1.62004 | 36.26 |
| 23 | −20.5128 | 2.50 | 1.74100 | 52.64 |
| 24 | −37.6961 | 2.07 | | |
| 25 | −22.3370 | 4.33 | 1.58913 | 61.13 |
| 26 | −11.7712 | 1.00 | 1.72000 | 50.23 |
| 27 | −39.6485 | BF | | |

[Variable Distances]

| | W | M | T |
|---|---|---|---|
| d5 | 2.80 | 42.17 | 54.61 |
| d10 | 40.62 | 24.70 | 2.41 |
| d18 | 11.85 | 11.85 | 11.85 |
| d21 | 3.00 | 3.00 | 3.00 |
| BF | 43.87 | 48.93 | 72.66 |

[Lens Group Data]

| Group | I | focal length |
|---|---|---|
| 1 | 1 | 120.20 |
| 2 | 6 | −29.35 |
| 3 | 11 | 33.81 |
| 4 | 19 | −49.30 |
| 5 | 22 | 208.70 |

[Values for Conditional Expressions]

(2) fr/fvr = −4.234
(3) N3n = 1.90366
(4) ν3n = 31.27
(6) Np = 2.000694
(7) |RNs/fvr| = 0.395
(8) (RNs + RNL)/(RNL − RNs) = 5.170
(9) νn − νp = 24.14
(10) RNs/RNL = 0.676

Figure 26A:
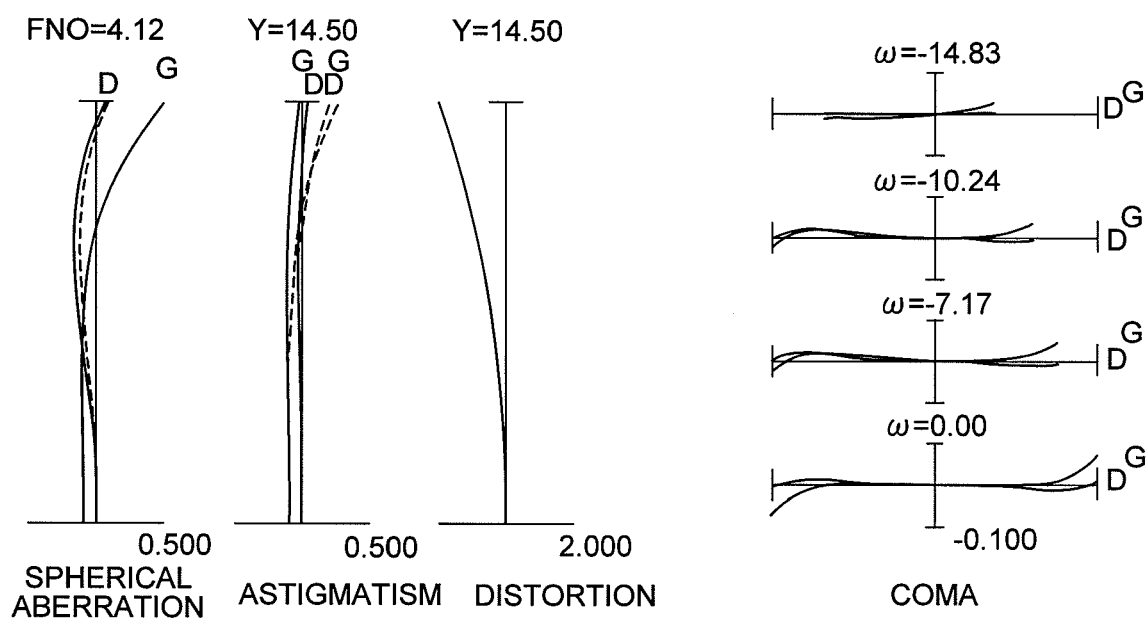
Figure 26B:
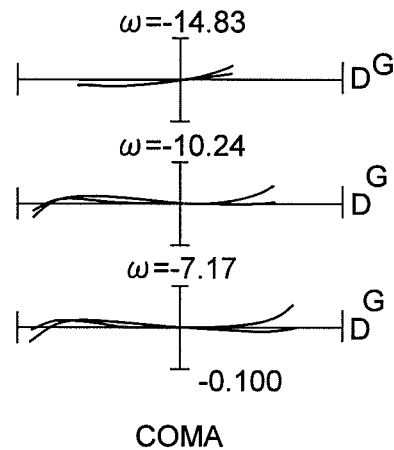
Figure 27:
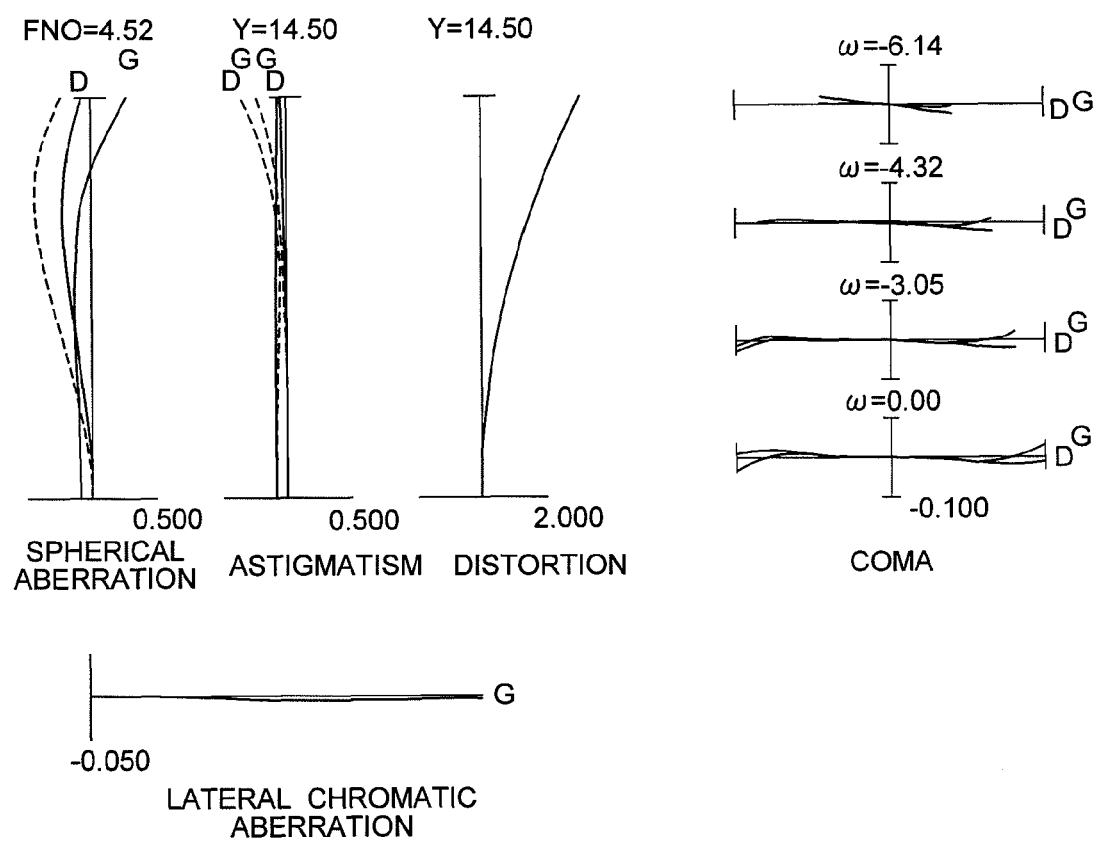
FIG. 27 is graphs showing various aberrations of the zoom optical system seen from another point of view according to Example 7 in an intermediate focal length state focusing on infinity.

FIGS. 26A, and 26B are graphs showing various aberrations of the zoom optical system according to Example 7 in the wide-angle end state focusing on infinity, in which FIG. 26A shows various aberrations without carrying out vibration reduction, and FIG. 26B shows coma upon carrying out vibration reduction with respect to a rotational camera shake of 0.70 degrees. FIG. 27 is graphs showing various aberrations of the zoom optical system according to Example 7 in an intermediate focal length state focusing on infinity. FIGS. 28A, and 28B are graphs showing various aberrations of the zoom optical system according to Example 7 in a telephoto end state focusing on infinity, in which FIG. 28A shows various aberrations without carrying out vibration reduction, and FIG. 28B shows coma upon carrying out vibration reduction with respect to a rotational camera shake of 0.30 degrees.

As is apparent from the respective graphs, the zoom optical system according to Example 7 of the present application shows superb optical performance as a result of good corrections to various aberrations from the wide-angle end state through the telephoto end state even upon carrying out vibration reduction.

According to the above described each Example, it becomes possible to realize a zoom optical system having excellent optical performance.

The above described each Example only shows a specific example for the purpose of better understanding of the present invention. Accordingly, it is needless to say that the present invention in its broader aspect is not limited to the specific details and representative devices.

Then, a camera equipped with a zoom optical system according to the present application is explained with reference to FIG. 29.

Figure 29:
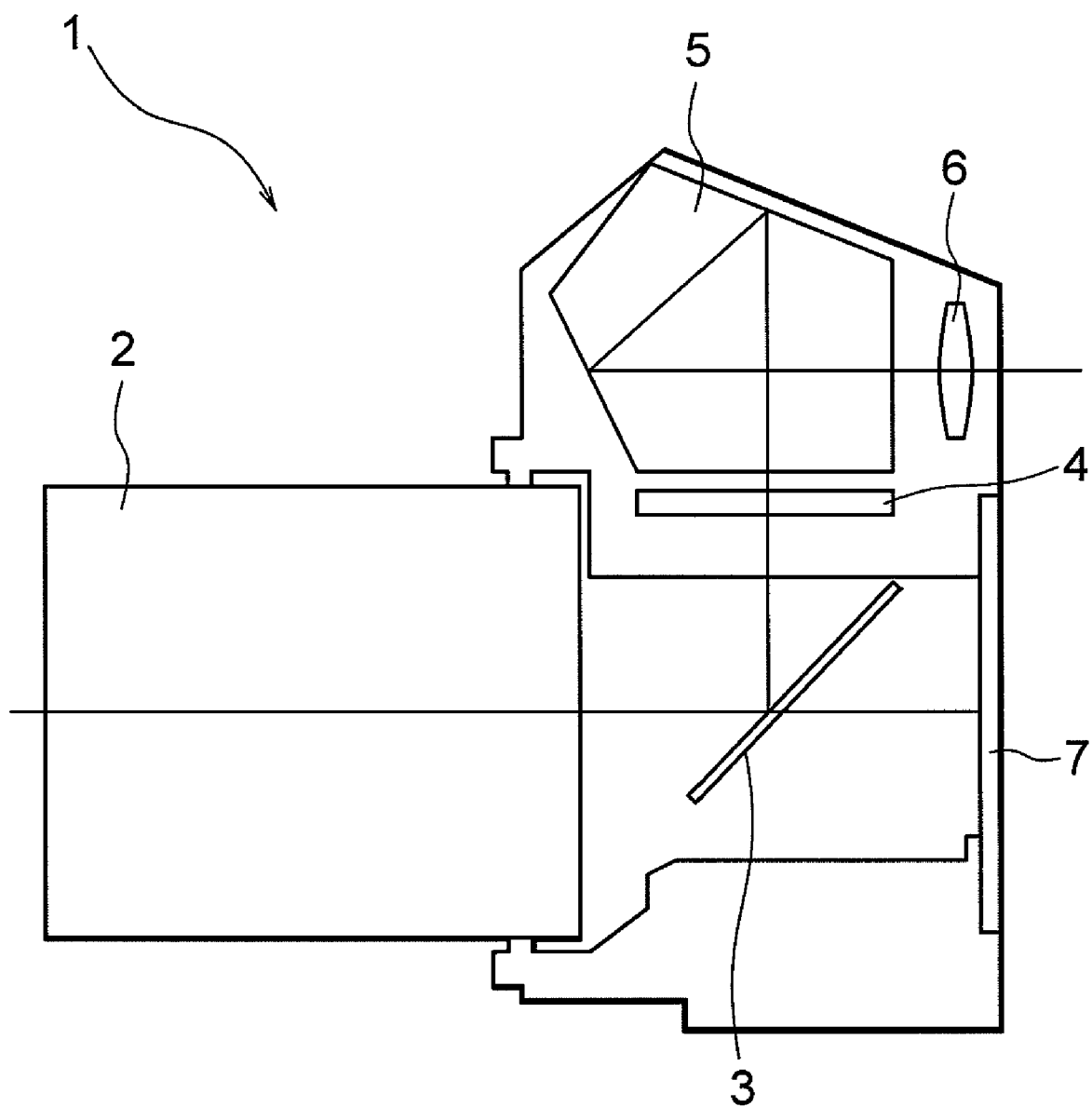
FIG. 29 is a sectional view showing a single-lens reflex digital camera equipped with the zoom optical system according to the present application.

FIG. 29 is a sectional view showing a camera equipped with the zoom optical system according to the present application.

As shown in FIG. 29, the camera 1 is a single-lens reflex digital camera 1 equipped with the zoom optical system according to Example 1 of the present application as an imaging lens 2.

In the camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light from the unillustrated object forms an object image on an imaging device 7. Accordingly, the light emitted from the object is captured by the imaging device 7, and stored in an unillustrated memory as a photographed image of the object. In this manner, the photographer can take a picture of an object by the camera 1.

With this construction, the camera 1 equipped with the zoom optical system according to Example 1 of the present application as an imaging lens 2 makes it possible to realize excellent optical performance. Incidentally, it is needless to say that a camera equipped with the zoom optical system according to any one of Example 2 through 7 as an imaging lens 2 can perform the same effect as the above-described camera 1.

Incidentally, the following description may suitably be applied within limits that do not deteriorate optical performance.

Although a zoom optical system with a five-lens-group configuration or a six-lens-group configuration is shown as each numerical example of a zoom optical system according to the present application, the present application is not limited to this, and other lens configurations (for example, a seven-lens-group configuration) may be possible. Specifically, a lens or a lens group may be added to the most object side or the most image side of a zoom optical system according to the present application. Incidentally, a lens group is a portion that is composed of at least one lens and separated by air spaces that vary upon zooming.

Moreover, in a zoom optical system according to the present application, a portion of a lens group or the whole of a lens group or a plurality of lens groups may be moved as a focusing lens group along the optical axis upon focusing from infinity object to a close range object. In particular, at least a portion of the first lens group or at least a portion of the fifth lens group is suitable for a focusing lens group. In this case, the focusing lens group can be used for auto focus, and is suitable for being driven by a motor such as an ultrasonic motor.

Moreover, in a zoom optical system according to the present application, any lens group or a portion of a lens group may be moved as a vibration reduction lens group in a direction including a component perpendicular to the optical axis or tilted within a plane including the optical axis (rocking motion), thereby correcting an image blur caused by a camera shake.

Moreover, in a zoom optical system according to the present application, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the image plane is shifted, deterioration in optical performance is small, so that it is desirable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Moreover, in a zoom optical system according to the present application, although an aperture stop S is preferably disposed in the third lens group or in the vicinity of the third lens group, the function may be substituted by a lens frame without disposing a member as an aperture stop.

Moreover, in a zoom optical system according to the present application, an antireflection coating having high transmittance over a broad wavelength range may be applied to each lens surface to reduce flare or ghost images, so that high optical performance with a high contrast can be attained.

Moreover, in a zoom optical system according to the present application, a zoom ratio is about three to ten.

Moreover, in a zoom optical system according to the present application, the first lens group preferably includes two positive lens components. The second lens group preferably includes two negative lens components. The third lens group preferably includes three positive lens components and one negative lens component. The fourth lens group preferably includes one negative lens component. The fifth lens group preferably includes one positive lens component and one negative lens component.

What is claimed is:

1. A zoom optical system comprising, in order from an object side:
  a first lens group having positive refractive power;
  a second lens group having negative refractive power; and
  a rear lens group having positive refractive power;
  the rear lens group including at least a third lens group that is disposed to the most object side and has positive refractive power,
  the third lens group including at least four positive lenses and at least one negative lens,
  at least a portion of a lens group disposed to an image side of the first lens group being movable as a vibration reduction lens group in a direction including a component perpendicular to an optical axis, and
  the following conditional expression being satisfied:

$$0.10 < Lf/Lr < 0.45$$

where Lf denotes a total length of the third lens group, and Lr denotes a total length of the rear lens group in a wide-angle end state.

2. The zoom optical system according to claim 1, wherein upon zooming from the wide-angle end state to a telephoto end state, a distance between the first lens group and the second lens group increases, a distance between the second lens group and the rear lens group decreases, and respective distances of lenses composing the third lens group are constant.

3. The zoom optical system according to claim 1, wherein the vibration reduction lens group has negative refractive power.

4. The zoom optical system according to claim 1, wherein the vibration reduction lens group includes at least one negative lens and at least one positive lens, and an object side lens surface of a positive lens having the shortest focal length in the vibration reduction lens group is a concave surface facing the object side.

5. The zoom optical system according to claim 1, wherein the vibration reduction lens group is in the rear lens group and disposed to the image side of the third lens group.

6. The zoom optical system according to claim 1, wherein the following conditional expression is satisfied:

$$-7.00 < fr/fvr < -1.00$$

where fr denotes a combined focal length of whole lens groups disposed between the vibration reduction lens group and an image plane in a telephoto end state, and fvr denotes a focal length of the vibration reduction lens group.

7. The zoom optical system according to claim 1, wherein the at least one negative lens in the third lens group satisfies the following conditional expression:

$$1.85 < N3n$$

where N3n denotes a refractive index at d-line (wavelength $\lambda$=587.6 nm) of the at least one negative lens in the third lens group.

8. The zoom optical system according to claim 1, wherein the at least one negative lens in the third lens group satisfies the following conditional expression:

$$22.00 < v3n < 40.00$$

where v3n denotes an Abbe number at d-line (wavelength $\lambda$=587.6 nm) of the at least one negative lens in the third lens group.

9. The zoom optical system according to claim 1, wherein the following conditional expression is satisfied:

$$0.30 < Rs/RL < 1.00$$

where Rs denotes a radius of curvature of one surface whose absolute value is smaller than that of the other surface of a positive lens having the shortest focal length in the vibration reduction lens group, and RL denotes a radius of curvature of the other surface of the positive lens having the shortest focal length in the vibration reduction lens group.

10. The zoom optical system according to claim 1, wherein an aperture stop is disposed in the vicinity of the third lens group or in the third lens group.

11. The zoom optical system according to claim 1, wherein the rear lens group includes a fourth lens group to the image side of the third lens group, and the vibration reduction lens group is composed of at least a portion of the fourth lens group.

12. The zoom optical system according to claim 1, wherein the rear lens group includes a fourth lens group to the image side of the third lens group, and a distance between the third lens group and the fourth lens group varies upon zooming from the wide-angle end state to a telephoto end state.

13. The zoom optical system according to claim 1, wherein a lens surface composing the zoom optical system is a spherical surface or a plane surface.

14. An optical apparatus equipped with the zoom optical system according to claim 1.

15. A zoom optical system comprising, in order from an object side:
a first lens group having positive refractive power;
a second lens group having negative refractive power; and
a rear lens group having positive refractive power;
the rear lens group including at least a third lens group that is disposed to the most object side and has positive refractive power,
at least a portion of a lens group disposed to an image side of the first lens group being movable as a vibration reduction lens group in a direction including a component perpendicular to an optical axis,
the vibration reduction lens group including at least one negative lens and at least one positive lens, and
the following conditional expressions being satisfied:

$$1.90 < Np$$

$$0.10 < |RNs/fvr| < 0.95$$

where Np denotes a refractive index of a positive lens having the highest refractive index at d-line (wavelength λ=587.6 nm) in the vibration reduction lens group, RNs denotes a radius of curvature of one surface whose absolute value of the radius of curvature is smaller than that of the other surface of a positive lens satisfying 1.90<Np in the vibration reduction lens group, and fvr denotes a focal length of the vibration reduction lens group.

16. The zoom optical system according to claim 15, wherein upon zooming from a wide-angle end state to a telephoto end state, a distance between the first lens group and the second lens group increases, and a distance between the second lens group and the rear lens group decreases.

17. The zoom optical system according to claim 15, wherein the following conditional expression is satisfied:

$$0.80 < (RNs+RNL)/(RNL-RNs) < 20.00$$

where RNs denotes a radius of curvature of one surface whose absolute value of the radius of curvature is smaller than that of the other surface of a positive lens satisfying 1.90<Np in the vibration reduction lens group, and RNL denotes a radius of curvature of the other surface of the positive lens satisfying 1.90<Np in the vibration reduction lens group.

18. The zoom optical system according to claim 15, wherein the following conditional expression is satisfied:

$$-40.00 < vn-vp < -15.00$$

where vn denotes an Abbe number of a negative lens having the largest Abbe number at d-line (wavelength λ=587.6 nm) in the vibration reduction lens group, and vp denotes an Abbe number at d-line (wavelength λ=587.6 nm) of the positive lens satisfying 1.90<Np in the vibration reduction lens group.

19. The zoom optical system according to claim 15, wherein the following conditional expression is satisfied:

$$-7.00 < fr/fvr < -1.00$$

where fr denotes a combined focal length of lens groups disposed between the vibration reduction lens group and an image plane in a telephoto end state, and fvr denotes a focal length of the vibration reduction lens group.

20. The zoom optical system according to claim 15, wherein the third lens group includes at least one negative lens, and the following conditional expression is satisfied:

$$1.85 < N3n$$

where N3n denotes a refractive index of the at least one negative lens in the third lens group at d-line (wavelength λ=587.6 nm).

21. The zoom optical system according to claim 15, wherein the third lens group includes at least one negative lens, and the following conditional expression is satisfied:

$$22.00 < v3n < 40.00$$

where v3n denotes an Abbe number of the at least one negative lens in the third lens group at d-line (wavelength λ=587.6 nm).

22. The zoom optical system according to claim 15, wherein the following conditional expression is satisfied:

$$0.30 < RNs/RNL < 1.00$$

where RNs denotes a radius of curvature of one surface whose absolute value of the radius of curvature is smaller than that of the other surface of a positive lens satisfying 1.90<Np in the vibration reduction lens group, and RNL denotes a radius of curvature of the other surface of the positive lens satisfying 1.90<Np in the vibration reduction lens group.

23. An optical apparatus equipped with the zoom optical system according to claim 15.

24. A method for manufacturing a zoom optical system including, in order from an object side, a first lens group having positive refractive power, a second lens group having negative refractive power, and a rear lens group having positive refractive power, the method comprising steps of:
disposing at least a third lens group having positive refractive power to the most object side in the rear lens group;
disposing at least four positive lenses and at least one negative lens in the third lens group;
disposing the third lens group with satisfying the following conditional expression:

$$0.10 < Lf/Lr < 0.45$$

where Lf denotes a total length of the third lens group, and Lr denotes a total length of the rear lens group in a wide-angle end state; and
decentering at least a portion of a lens group disposed to an image side of the first lens group as a vibration reduction lens group in a direction including a component perpendicular to an optical axis.

25. The method according to claim 24, further comprising a step of:
disposing lens groups with satisfying the following conditional expression:

$$-7.00 < fr/fvr < -1.00$$

where fr denotes a combined focal length of whole lens groups disposed between the vibration reduction lens group and an image plane in a telephoto end state, and fvr denotes a focal length of the vibration reduction lens group.

26. The method according to claim 24, further comprising a step of:
disposing lens groups with satisfying the following conditional expression:

$$1.85 < N3n$$

where N3n denotes a refractive index at d-line (wavelength λ=587.6 nm) of the at least one negative lens in the third lens group.

27. The method according to claim 24, further comprising a step of:

disposing lens groups with satisfying the following conditional expression:

$$22.00 < \nu 3n < 40.00$$

where ν3n denotes an Abbe number at d-line (wavelength λ=587.6 nm) of the at least one negative lens in the third lens group.

28. The method according to claim 24, further comprising a step of:

disposing lens groups with satisfying the following conditional expression:

$$0.30 < Rs/RL < 1.00$$

where Rs denotes a radius of curvature of one surface whose absolute value is smaller than that of the other surface of a positive lens having the shortest focal length in the vibration reduction lens group, and RL denotes a radius of curvature of the other surface of the positive lens having the shortest focal length in the vibration reduction lens group.

29. A method for manufacturing a zoom optical system including, in order from an object side, a first lens group having positive refractive power, a second lens group having negative refractive power, and a rear lens group having positive refractive power, the method comprising steps of:

disposing at least a third lens group having positive refractive power to the most object side in the rear lens group;

decentering at least a portion of a lens group disposed to an image side of the first lens group as a vibration reduction lens group in a direction including a component perpendicular to an optical axis;

disposing at least one negative lens and at least one positive lens in the vibration reduction lens with satisfying the following conditional expressions:

$$1.90 < Np$$

$$0.10 < |RNs/fvr| < 0.95$$

where Np denotes a refractive index of a positive lens having the highest refractive index at d-line (wavelength λ=587.6 nm) in the vibration reduction lens group, RNs denotes a radius of curvature of one surface whose absolute value of the radius of curvature is smaller than that of the other surface of a positive lens satisfying 1.90<Np in the vibration reduction lens group, and fvr denotes a focal length of the vibration reduction lens group.

30. The method according to claim 29, further comprising a step of:

disposing lens groups with satisfying the following conditional expression:

$$0.80 < (RNs+RNL)/(RNL-RNs) < 20.00$$

where RNs denotes a radius of curvature of one surface whose absolute value of the radius of curvature is smaller than that of the other surface of a positive lens satisfying 1.90<Np in the vibration reduction lens group, and RNL denotes a radius of curvature of the other surface of the positive lens satisfying 1.90<Np in the vibration reduction lens group.

31. The method according to claim 29, further comprising a step of:

disposing lens groups with satisfying the following conditional expression:

$$-40.00 < \nu n - \nu p < -15.00$$

where νn denotes an Abbe number of a negative lens having the largest Abbe number at d-line (wavelength λ=587.6 nm) in the vibration reduction lens group, and νp denotes an Abbe number at d-line (wavelength λ=587.6 nm) of a positive lens satisfying 1.90<Np in the vibration reduction lens group.

* * * * *